(12) United States Patent
Wood

(10) Patent No.: US 8,651,235 B2
(45) Date of Patent: *Feb. 18, 2014

(54) CONTROLLED DESCENT SYSTEM WITH AN INCREASED RECOVERY RANGE

(76) Inventor: Norman E. Wood, Keyser, WV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/564,662

(22) Filed: Aug. 1, 2012

(65) Prior Publication Data

US 2013/0037347 A1 Feb. 14, 2013

Related U.S. Application Data

(63) Continuation-in-part of application No. 13/474,431, filed on May 17, 2012, and a continuation-in-part of application No. 12/384,812, filed on Apr. 9, 2009, now abandoned, and a continuation-in-part of application No. 12/317,601, filed on Dec. 26, 2008, now abandoned.

(51) Int. Cl.
*A62B 1/00* (2006.01)

(52) U.S. Cl.
USPC .................................. 182/5; 182/3; 182/191

(58) Field of Classification Search
USPC .......... 182/3, 5, 70, 191–193; 188/65.1, 65.4, 188/65.5
See application file for complete search history.

(56) References Cited

U.S. PATENT DOCUMENTS

| | | | | |
|---|---|---|---|---|
| 553,190 | A * | 1/1896 | Fowler | 182/191 |
| 1,908,156 | A * | 5/1933 | Kalish et al. | 182/3 |
| 2,290,218 | A * | 7/1942 | Vosseller | 244/143 |
| 2,323,883 | A * | 7/1943 | Wiley | 182/191 |
| 2,585,876 | A * | 2/1952 | Thoennes | 182/236 |
| 3,419,236 | A * | 12/1968 | Weber | 244/151 R |
| 3,424,134 | A * | 1/1969 | Rosenblum | 182/3 |
| 3,586,257 | A * | 6/1971 | Zelinskas | 242/129 |
| 3,701,395 | A * | 10/1972 | Theobald | 182/3 |
| 3,757,744 | A * | 9/1973 | Pravaz | 182/3 |
| 3,973,643 | A * | 8/1976 | Hutchinson | 182/3 |
| 4,177,877 | A * | 12/1979 | Gallinati | 182/3 |
| 4,662,517 | A * | 5/1987 | Wirth | 206/388 |
| 5,107,956 | A * | 4/1992 | Constantinis et al. | 182/5 |
| 5,145,036 | A * | 9/1992 | Omalia | 188/65.5 |
| 5,611,085 | A * | 3/1997 | Rasmussen | 2/102 |
| 5,970,517 | A * | 10/1999 | Jordan | 2/69 |
| 6,095,282 | A * | 8/2000 | Sadeck | 182/6 |
| 6,128,782 | A * | 10/2000 | Young et al. | 2/69 |
| 6,131,697 | A * | 10/2000 | Bassett | 182/5 |
| 6,134,713 | A * | 10/2000 | De Rosa et al. | 2/94 |
| 6,275,994 | B1 * | 8/2001 | Lewis et al. | 2/94 |

(Continued)

*Primary Examiner* — Alvin Chin Shue
*Assistant Examiner* — Daniel Cahn
(74) *Attorney, Agent, or Firm* — Gary P. Topolosky

(57) ABSTRACT

A lightweight safety harness comprises adjustable belt sections for the upper chest, waist and upper thighs. In one of two shoulder straps, there is stored a primary release pin and secondary brake strap. The shoulder straps criss-cross to form a soft, triangular shaped panel on the harness wearer's back. A spine brace divides that triangle in two. Near the top of that spine brace is a rack having at least one aperture wrapped with Kevlar® webbing. A long, thin composite rope serpentines back-and-forth, between sets of elastic loops running down opposed legs to the triangular panel before being threaded through the rack in a preferred pattern. At the base of that triangular panel, there is attached one end to a reserve suspension relief strap (RSRS). A cover extends the triangular panel but can be removed for inspection before every use.

18 Claims, 36 Drawing Sheets

(56) References Cited

U.S. PATENT DOCUMENTS

| | | | | |
|---|---|---|---|---|
| 6,487,725 B1* | 12/2002 | Jordan | | 2/94 |
| 6,516,920 B1* | 2/2003 | Schafler | | 182/70 |
| 6,820,721 B1* | 11/2004 | Henson | | 182/5 |
| 6,971,476 B2* | 12/2005 | Wolner et al. | | 182/3 |
| 7,648,126 B2* | 1/2010 | Lipke | | 254/389 |
| 2003/0172431 A1* | 9/2003 | Allen | | 2/69 |
| 2005/0230184 A1* | 10/2005 | Ansaldo | | 182/3 |
| 2006/0113147 A1* | 6/2006 | Harris, Jr. | | 182/3 |
| 2006/0175128 A1* | 8/2006 | Vonblon | | 182/3 |
| 2007/0023231 A1* | 2/2007 | Gorman et al. | | 182/3 |
| 2007/0272484 A1* | 11/2007 | Helms | | 182/3 |
| 2008/0156583 A1* | 7/2008 | Meeks | | 182/9 |
| 2009/0038884 A1* | 2/2009 | Helms | | 182/3 |
| 2009/0071750 A1* | 3/2009 | Simard et al. | | 182/5 |
| 2010/0025157 A1* | 2/2010 | Casebolt | | 182/231 |

* cited by examiner

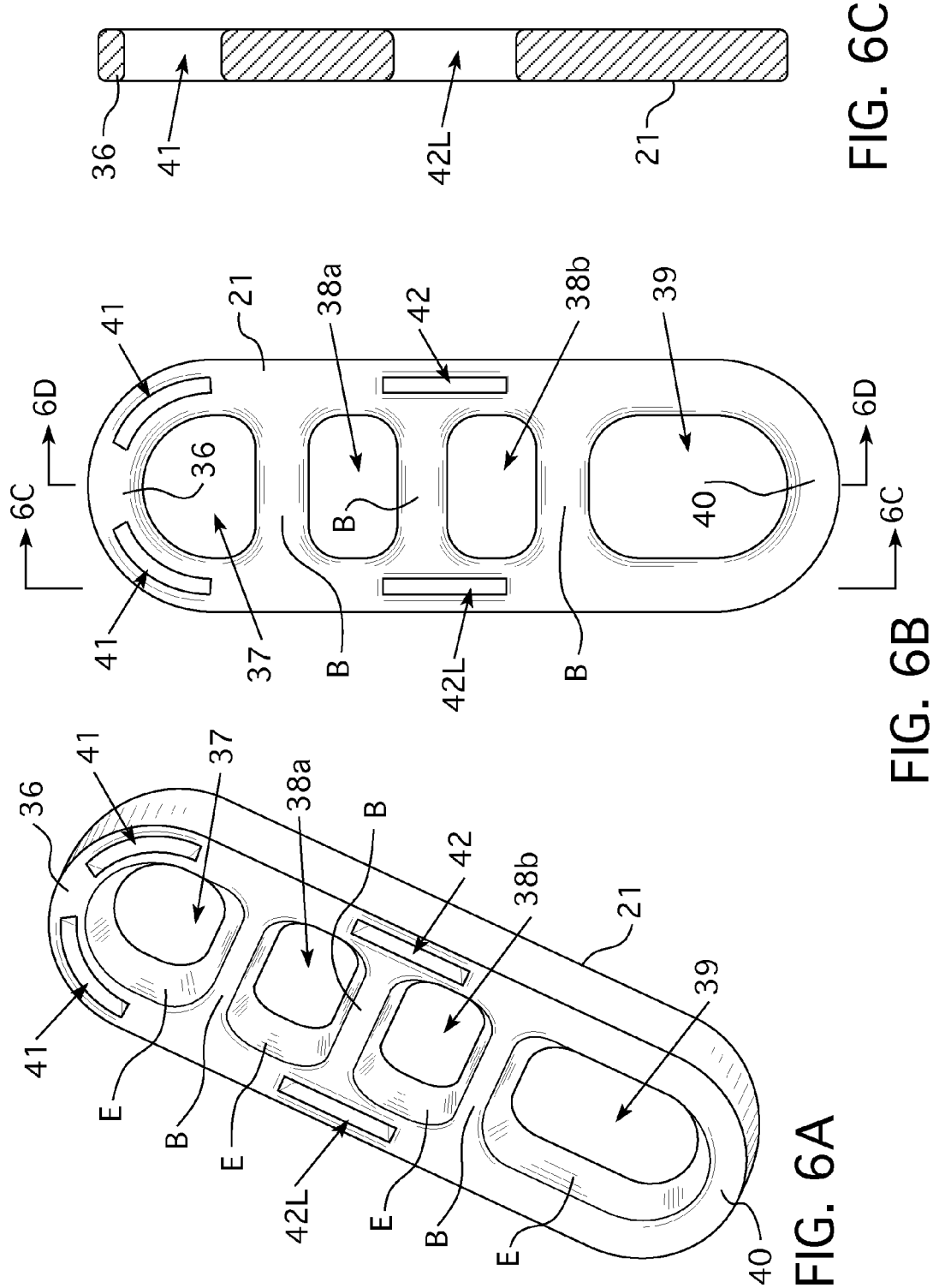

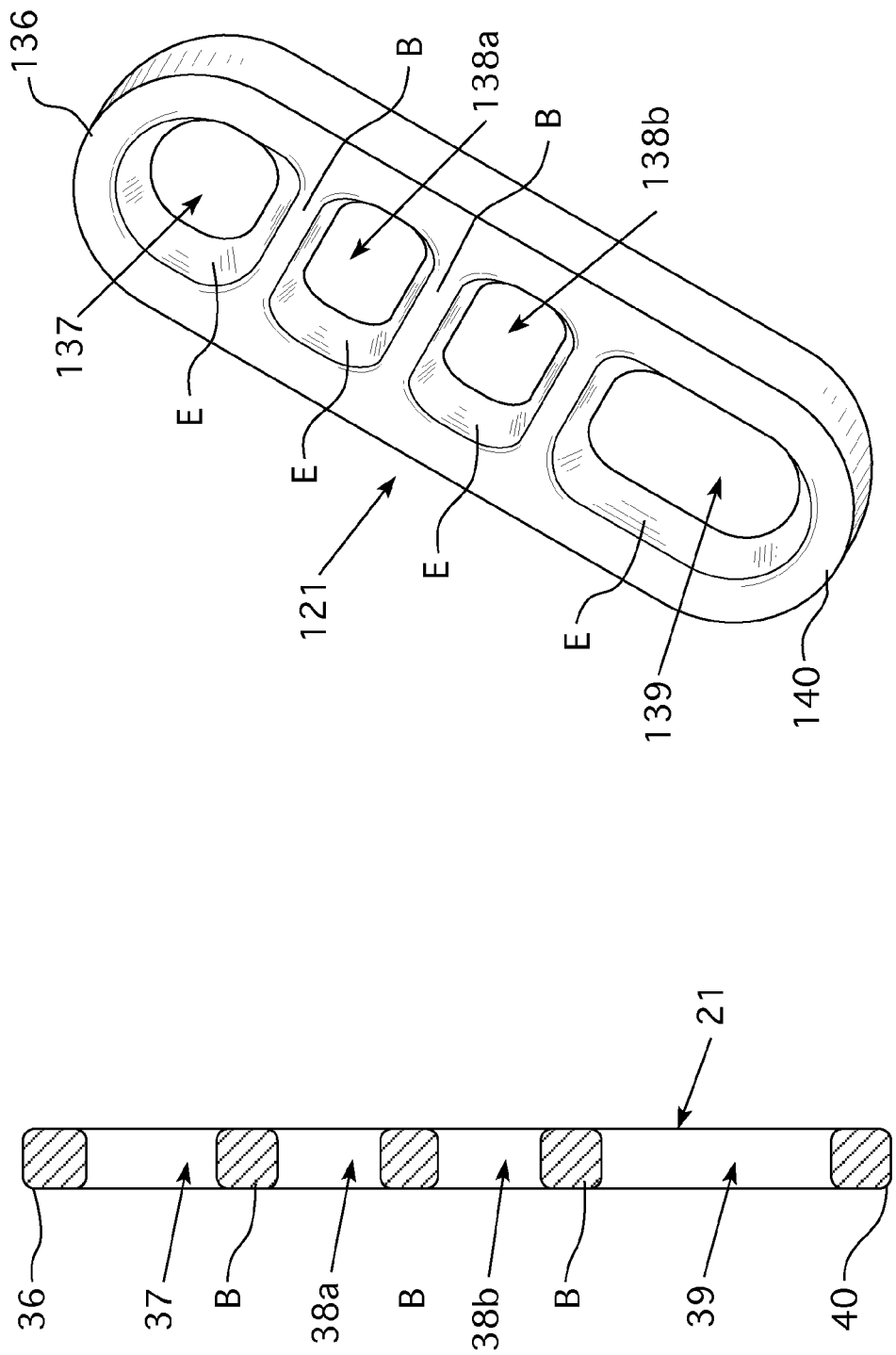

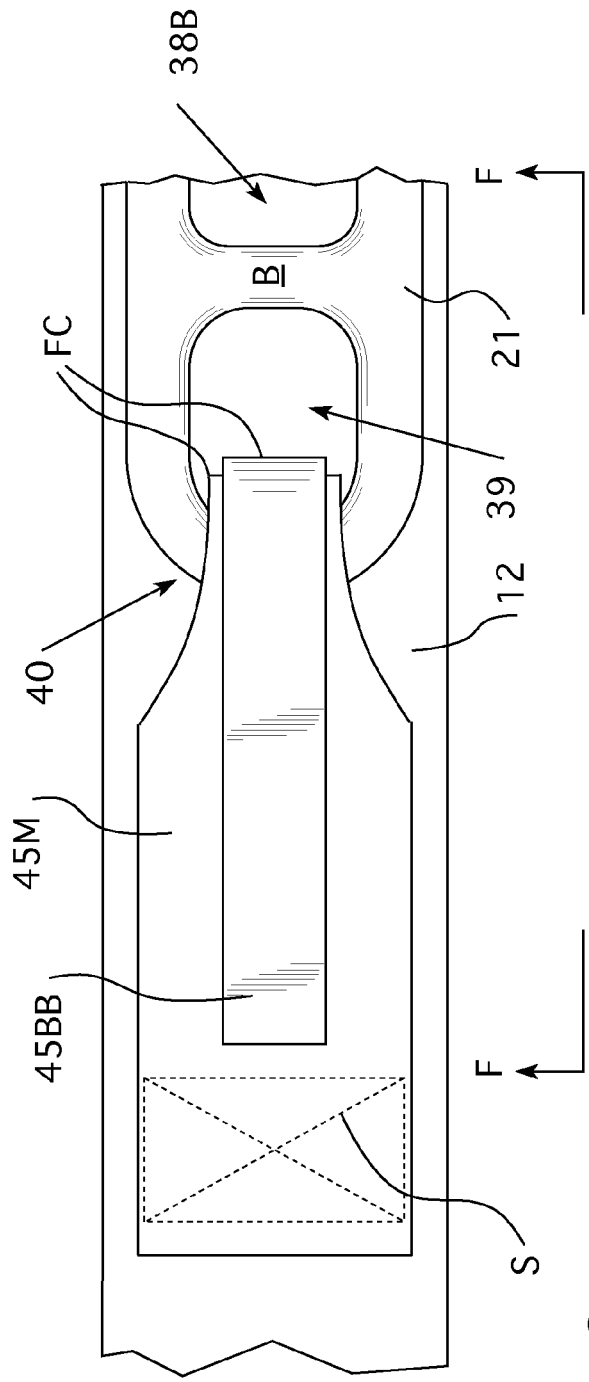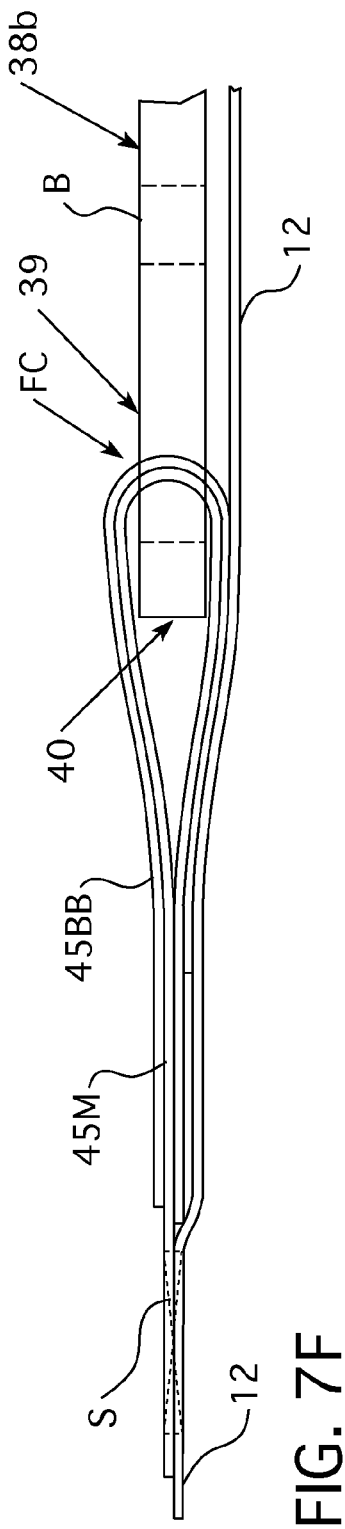
FIG. 7E
FIG. 7F

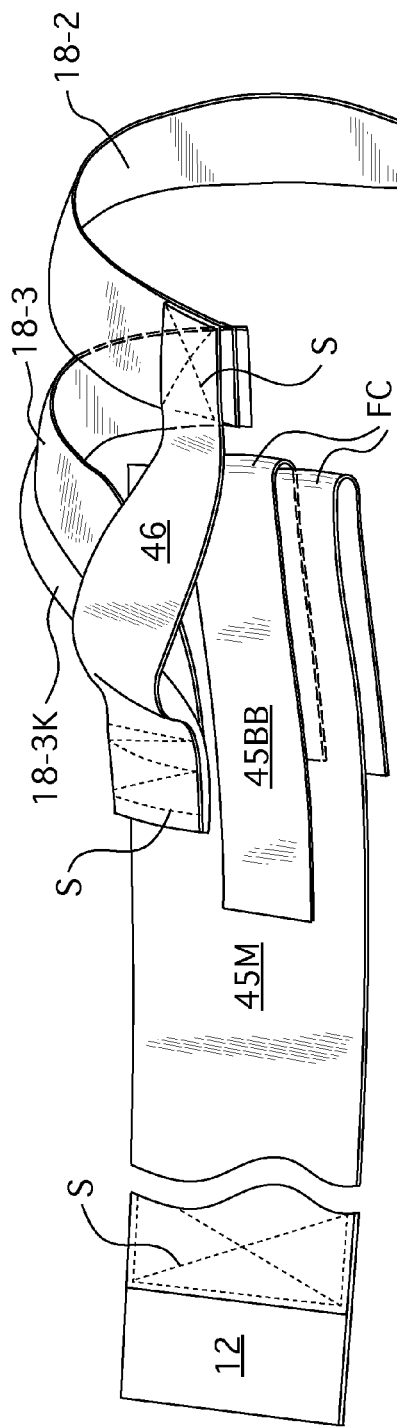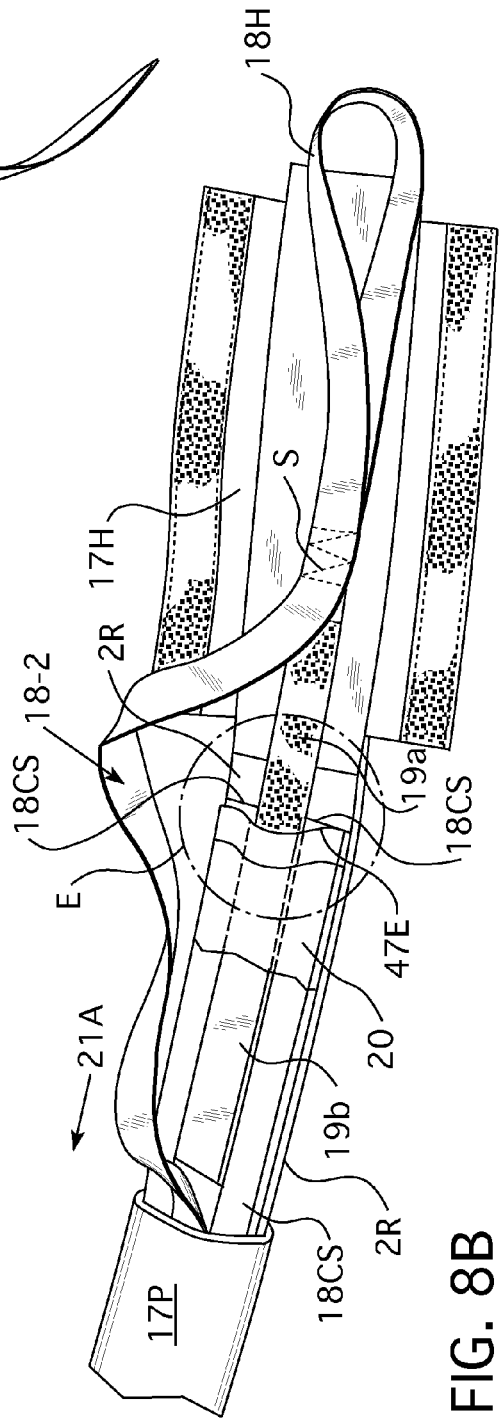

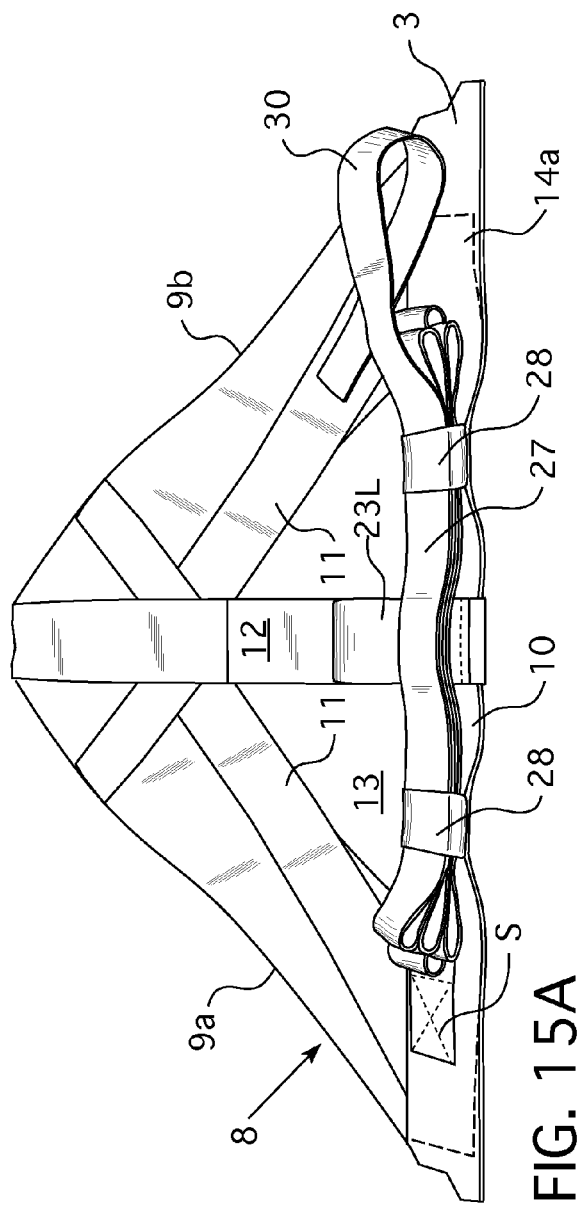
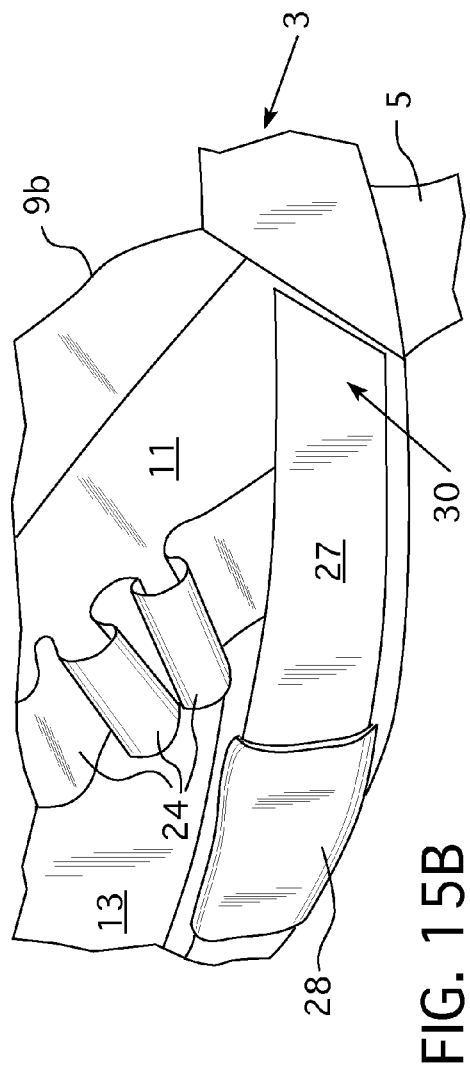

CONTROLLED DESCENT SYSTEM WITH AN INCREASED RECOVERY RANGE

CROSS-REFERENCE TO RELATED APPLICATION

This application is a continuation-in-part of application Ser. No. 12/384,812, filed on Apr. 9, 2009, itself a continuation-in-part of application Ser. No. 12/317,601, filed on Dec. 26, 2008, now abandoned in favor of application Ser. No. 13/474,431, filed on May 17, 2012, all three disclosures of which are fully incorporated by reference herein.

BACKGROUND OF INVENTION

1. Field of the Invention

The invention generally relates to safety equipment. More specifically, this invention relates to an improved fall protection harness with controlled descent, said harness having an integral Reserve Suspension Relief Strap (RSRS). It is especially suited for hunters to wear while in a tree stand. With the extended range of the latest improvements, this invention may be worn by many industrial workers, including wind turbine blade repair personnel who perform services about 200 feet or more above ground level.

2. Background

As reported by Richard Holdcraft in his 2004 article entitled "Safety Harnesses: Self-Recovery/Self-Rescue", a then recent Consumer Product Safety Commission (CPSC) report estimated that 6,410 injuries attributed to tree stand use were treated in U.S. hospitals nationwide in 2001. That was based on a review of their National Electronic Injury Surveillance System (NEISS). Their data sources further indicated that there were 137 incidents involving tree stands from 1980 through 2001. Included in these statistics were 62 deaths, 55 injuries, 17 incidents not involving death or injury, and 3 incidents in which the outcome is unknown. Of the 137 incidents, 54 mentioned tree stand failures resulting in 6 of the deaths, 40 injuries, and 8 incidents without injury. There were eight incidents involving hanging or traumatic asphyxiation by a safety belt around the waist or chest that resulted in death. These are only the incidents reported by hospitals; they do not include statistics for incidents that are misclassified but still tree stand related.

The CPSC estimates there may be at least 11 million tree stands in use by hunters. The estimated annual shipments of all manufactured tree stand types could exceed 1.4 million units. The total annual retail sales of all manufactured tree stand types range from $75 million to $150 million. The use of tree stands for hunting has increased dramatically in the past few years. Along with the increase in their use comes an increase in the number of serious or fatal injuries. While firearms related incidents has declined tremendously since mandatory hunter education courses were instituted and blaze orange laws were passed, the number of tree stand related incidents has increased significantly. During 2003, North Carolina Wildlife Resources Commission reported that 75% of their hunting fatalities were due to tree stand accidents.

Tree stands are used by hunters who prefer to hunt from elevated positions to increase their field of view and to decrease the likelihood of detection by game animals on the ground. A tree stand is basically a seat and footrest unit that is either strapped to a tree or its branches, or is part of a freestanding tower design. Several styles of tree stands are available, such as an integral ladder and platform stand, fixed-position stands; and self-climbing stands. Unique features distinguish each style.

Hunters have a variety of features to choose from when selecting tree stands. Key features include portability, bars, chains, straps and rails that affix the seating device to the tree, gun rests, bow rests, outward facing stands, forward facing stands, and multiple-occupancy stands that include a tree stand with a seating capacity for four individuals.

A non-statistical survey conducted by *Deer and Deer Hunting* magazine in 1993 and again in 1999, concluded that the most common reason for falls from elevated hunting positions was due to some type of structural failure. These types of failures included rotted wood, loose nails, nails pulled through boards, broken bands, bolts, ropes, or other attaching devices. There were no statistics presented regarding failures of commercially manufactured tree stands.

Hunters are encouraged through informational and educational campaigns to use fall protection devices to prevent death and serious injuries from falls while hunting from tree stands. A fall protection device is comprised of various components such as straps, belts, buckles and other hardware configured for the purpose of arresting a fall from an elevated position.

Fall protection devices are also referred to as fall restraint systems or fall arrest systems. Fall protection devices work as a system because each component of the device is dependent on other components for operational integrity. The term arrest and restraint can carry nuances of meaning. Instructions provided by one tree stand manufacturer have a warning that states that a full-body harness that is included with the purchase of the tree stand is not intended to arrest a fall, but is intended to restrain a fall. For purposes of this article, a fall protection device is used as an inclusive term for the various types of straps and harnesses worn by hunters to arrest, or stop, a fall. Furthermore, the purpose of a fall protection device is understood to be the stoppage of a fall, not the prevention of a fall.

A safety belt is a single strap or rope, worn either around the waist or chest, with a lanyard that secures the device to an anchor on the tree. The safety belt is sometimes described as a waist belt, chest belt, body belt, safety strap, single strap, or fall arrest belt. While a number of manufacturers include full-body harnesses with the purchase of their tree stands, a few may still provide safety belts with their stands. Safety belts can be purchased separately as an accessory item. Safety belts are among the simplest and least expensive of fall protection devices sold to hunters. Hunters are subject to serious injury using a device around the waist or chest and can become inverted. They can lose consciousness in less than 2-3 minutes. When hunters fall with a belt around the waist or chest, self-recovery or self-rescue may become impossible. In January 1998, the Occupational Safety and Health Administration (OSHA) prohibited the use of safety belts as a personal fall arrest system. The decision to prohibit safety belts around the waist was based on extensive studies showing the hazardous effects of the initial fall impact forces and the pressure exerted on the body by these restraints.

A chest and shoulder harness is basically a safety belt with shoulder straps. Instead of being worn around the waist, it rides across the chest and under the arms. If the hunter lifts their arms above their heads during self-recovery/self-rescue, they are subject to sliding out of the harness. During a fall, static loads in excess of several thousand pounds are placed against the chest which could cause ribs to break and penetrate the lungs or heart causing a fatality. The potential for asphyxiation associated with safety belts, straps, or ropes around the waist or chest is the greatest hazard to hunters.

A full-body or parachute style safety harness includes straps for the pelvic and thigh areas in addition to the shoulder straps. A full-body harness fastens around the hunter in a manner designed to contain the torso and distribute fall arrest forces over the upper thighs, pelvis, chest and shoulders, with means for attaching it to other components or subsystems. It is often referred to as a safety harness, or four-point safety harness. Typically, they include a harness, lanyard, anchorage means and connecting hardware. When properly adjusted and worn, it is nearly impossible for the hunter to be ejected from same. Full-body harnesses are generally more expensive, however.

Many individuals hunt alone in secluded areas and would most likely have to rescue themselves if suspended by a fall restraint system. Recently developed guidelines recommend that hunters immediately attempt a self-recovery or self-rescue when suspended after a fall arrest. Step-by-step procedures for self-rescue are usually included in instructions provided by tree stand and fall restraint systems manufacturers. A video produced by the National Bowhunter Education Foundation and the Treestand Manufacturers Association included with some manufacturer's tree stands suggests that hunters carry a knife to cut themselves out of a harness when suspended after a fall. They also state that once the hunter's body weight is off the harness, he/she should "bear hug" the tree and carefully climb down. That maneuver requires considerable physical coordination and strength, however. Additionally, hunters may not be able to react quickly enough to perform a self-recovery or self-rescue maneuver, as in the instance of a tree stand collapse where no handholds are available.

Advising hunters to cut themselves out of a harness may not adequately address another issue of post-fall rescue. Cutting or loosening the straps or otherwise trying to slip out of the fall restraint system is illogical as it introduces another serious hazard. Such straps can slip up the torso and incapacitate the hunter by pinning their arms against the body or cause asphyxiation by exerting pressure on the hunter's chest or neck. In a panic, the hunter could even loosen the straps completely and fall from the harness to the ground.

Some hunters elect to attach a long, ¾ to 1 inch thick line from their hunting height to the ground using a Prussic knot. The Prussic knot is attached to that line so as to allow sliding along its length. A full-body harness then attaches to the long line with a tether or anchor line. When pressure is applied to the knot during a fall, it grips the line and holds the hunter in place. This is a redundant system yet it gives the hunter another option for self-recovery or self-rescue.

Regardless of which type of safety harness the hunter uses while hunting from a tree stand, they should be aware of a condition medical practitioners describe as orthostatic intolerance. Orthostatic intolerance may be defined as "the development of symptoms such as light-headedness, palpitations, tremulousness, poor concentration, fatigue, nausea, dizziness, headache, sweating, weakness and occasionally fainting during upright standing". While in a sedentary position, blood can accumulate in the veins which are commonly called "venous pooling," and cause orthostatic intolerance.

An accumulation of blood in the legs reduces the amount of blood in circulation. The body reacts to this reduction by speeding up the heart rate in order to maintain sufficient blood flow to the brain. If blood supply is significantly reduced, that reaction will not be effective. The body will abruptly slow the heart rate and blood pressure in the arteries will diminish. During severe venous pooling, the reduction in quantity and/or quality (oxygen content) of blood flowing to the brain causes fainting. This reduction also can have an effect on other vital organs such as the kidneys. The kidneys are quite sensitive to blood oxygen. Renal failure can occur with excessive venous pooling. And if these conditions persist, very serious repercussions may develop.

Orthostatic intolerance may still be experienced by hunters using certain fall arrest systems. Following a fall, the hunter may remain suspended in a harness. Sustained immobility may lead to unconsciousness. Depending on the length of time a suspended hunter is unconscious and immobile, and the level of venous pooling, the resulting orthostatic intolerance may lead to serious consequences. While not common, such incidents are often referred to as "harness-induced pathology" or "suspension trauma."

Prolonged suspension in fall arrest systems can cause orthostatic intolerance, which, in turn, leads to serious physical injury. Research indicates that suspension in a fall arrest device can result in more serious consequences in less than 30 minutes. To reduce the risk associated with prolonged suspension, hunters should initiate self-recovery/self-rescue as soon as possible after a fall arrest.

All tree stand safety courses should train hunters to use fall arrest systems and other personal protective equipment correctly. Hunters, who wear fall arrest devices while hunting, and those who may perform rescue activities, should also be trained in: (i) how to ascertain whether their harness is properly fitted and worn, so that it performs as intended; (ii) how orthostatic intolerance/suspension trauma may occur; (iii) the factors that may increase a hunter's risk; (iv) how to recognize the signs and symptoms identified above; and (v) the appropriate rescue procedures and methods to diminish risk while suspended.

The use of belts, straps or ropes around the waist or chest alone is not preferred. A full-body safety harness reduces the likelihood of serious, traumatic injury to hunters. In the not so distant future, devices that just wrap around the hunter's waist or chest may be prohibited with full-body safety harnesses being the only type permitted to save lives.

Safety harness use by hunters has experienced a sharp rise in recent years with the rise in popularity of climbing-type tree-stands. Approximately 90% of deer hunters have hunted from an elevated stand at one time or another. One of the most popular types of stands attaches by a cantilever to the trunk of a tree. It lets its user ascend the tree, often to heights of 35 feet, by alternately moving upper and lower sections of the stand in a sit-and-stand, "ratchet-type" action. Such climbing tree stands depend on their cantilever design to impinge on and grip the tree trunk. Unfortunately, such stands have been prone to sudden and unexpected slippage or upset causing them to fall rapidly down the tree or abruptly shift positions and often causing the stand occupant to lose his or her balance and fall to the ground.

At other times, hunters fall out of their stands after falling asleep, during the climbing operation, or when stepping from a fixed ladder onto the platform of another stand type known as a "lock-on" tree stand. Many hunters who use elevated tree stands, will experience a fall at one time or another. And a large number of those who fall sustain serious, often catastrophic injuries, including broken bones, ruptured spleens, internal bleeding, severed arteries, paralysis from spinal injuries, even death.

The use of a safety harness to arrest one's fall from an elevated position is well known. Fall-arresting harnesses are commonly used and even mandated by law in certain commercial and industrial applications, especially for individuals working at elevated heights like ironworkers, arborists, window washers, sign installers, roofers, and others. In recreational sports, including deer hunting, full-body safety harnesses, as well as chest-harnesses, and safety waist-belts, are used as fall-arresting protective devices. However, traditional harnesses lack any provision for the wearer who experiences a fall to gradually and safely descend to the ground or other level of safety. Once suspended by a safety harness, only the most athletic and fit of hunters would have an ability to re-enter their tree stand, or "hug the tree" and shimmy down its trunk. That procedure requires the victim to cut the tether from which he/she is suspended, an incredibly dangerous action that can lead to serious injury or death. Remaining suspended from the tree in a safety harness offers no better long-term survival prospects for the victim, however, due to the considerable danger and risk from suspension trauma that is likely to occur very quickly after a fall.

In the case of belt harnesses, it is not uncommon for asphyxiation to occur less than one hour after becoming suspended. With chest harnesses, the survival time can be a bit longer. While full-body safety harnesses were thought to be safer than belt or chest varieties, the constriction of blood flow to one's lower extremities as a result of suspension in such a harness can lead to serious injury or even death in an amazingly short period of time, in some cases as little as 15 to 30 minutes. Even if a hunter is fortunate enough to be discovered by rescuers in a short period after falling and has not succumbed to the effects of suspension trauma, the danger to both victim and rescuers in getting that individual back down to the ground presents a daunting challenge.

If a person falls in a remote location and finds himself suspended in a harness with no controlled descent capability, the impact of a fall may be prevented. But the victim may still be exposed to a critical, life-threatening emergency situation. Accordingly, there is need for a simple, reliable, yet lightweight and economical emergency descent system for a fall-arresting or other type safety harness. Such a system could be used by hunters, rock climbers, recreational tree climbers, as well as numerous industrial applications like billboard installers, steel erectors, tower constructors, maintenance personnel, roofers, arborists, and the like. Such a system could further provide controlled descent in the event one needs to escape under emergency circumstances from an elevated building location, the upper floor of a multi-story home or office.

Relevant publications to the present invention include the rescue apparatus of Henson U.S. Pat. No. 6,820,721, assigned to American Escape Systems, Inc. Therein, a device with a stand alone "descender" was mounted on the chest portion of a harness. A preferred embodiment included a camshaft in the descender for accommodating body weight differences of the wearer.

Brda U.S. Pat. No. 4,580,658 showed a device for lowering individuals on a rope. With a friction cylinder, this device arrests further movement along the rope. A control lever (element 19) is situated within reach of the wearer.

Bell U.S. Pat. No. 5,878,833 disclosed a fall prevention and lowering system in which the lowering device, element 300, could be stored in a compartment on the harness until needed.

Another series of references show clamps for rope lowering apparatus. Bowker U.S. Pat. No. 4,678,059, for example, replaced a Figure 8-shaped device with one having an oval ring that fits over a three-sectioned clasp for mountain climbing. In Steffen U.S. Pat. No. 4,311,218, its ladder-like concept was described as a braking device with a first embodiment having four crossbars (element 26) with three braking bars (element 32) situated there between. An alternate element (FIG. 8) used a fourth braking bar.

A rappel tool was the subject of Sadeck U.S. Pat. No. 6,095,282, assigned to the U.S. Army. Alternate ways for weaving rope through and about that device were shown in its FIGS. 3 through 7. A similar friction wrap was shown for top ladder 116 per FIG. 9 of Ostrobrod U.S. Pat. No. 6,962,238.

Numerous other safety harnesses patent protect their material selection, relative weight and/or other advantages over the art. In both Fisk et al. U.S. Pat. No. 5,203,829 and Zeissler et al. U.S. Pat. No. 6,874,596, devices with front D-rings were shown.

Finally, a pending U.S. Application by Harris published Jun. 1, 2006 as No. 2006/113147, showed a combined fall arrest harness with controlled descent through a friction release mechanism in a shoulder strap of that harness. That combination employed rope, line or webbing in a backpack addition to the rear of said harness. Various embodiments included encasing the webbing/rope in a hard, metallic box or other heavy, bulky or awkward external connector. Unfortunately, with the manner in which webbing or rope is wrapped by Harris, the wearer may not necessarily survive a head first fall. The means for configuring line in its backpack makes the Harris device more prone to internal tangling and/or improper fall stoppage.

SUMMARY OF THE INVENTION

Both the original invention and this present improvement to same comprise a lightweight controlled descent safety (CDS) harness with snap around belt sections for the wearer's upper chest, waist and upper thighs. In one of two shoulder straps to this harness, there is stored a primary release pin and secondary brake handle or strap. Continuations of the two shoulder straps form a soft, triangular panel on the wearer's back. Additional reinforcing straps criss-cross and overlap the legs to that triangular panel. Another strap, the spine brace, divides that triangular panel in two, from top to bottom. Sets of elastic loops run down the opposed legs to that triangle on either side of the spine brace. At or near the bottom of that spine brace, there is a loop for affixing one end of an elongated nylon rope. The rope is interwoven or serpentines back and forth, from side-to-side and from top-to-bottom, for securing in the elastic loops of the triangular panel legs until needed.

At or near the top of that spine brace, there is positioned a rack having multiple apertures with Kevlar® webbing wrapped about its lowest most aperture. An alternate embodiment includes Kevlar wrappings about each rack aperture. A soft loop is affixed on the spine brace at a slight offset for holding an upper loop of nylon rope before that rope is threaded through the rack in a preferred pattern. More particularly, the rope is intertwined with a limiter strap for the harness' secondary brake and then pulled partially into the rack's lowest, elongated aperture. The rope then continues outside of and over the rack's third aperture before entering its second aperture from the rack exterior. That rope then descends one level, exits the rack's third aperture and reenters the rack by passing into and through its uppermost aperture. Eventually, the fully threaded, free end of that rope is fitted with a clamp, clasp or other known anchor. At the base of that triangular panel, there is affixed one end to an integral reserve suspension relief strap (or RSRS). A removable cover then extends over and attaches about the triangular panel portions of this CDS harness.

With the foregoing rack and preferred threading pattern, the original CDS harness, and this latest improvement to same, each achieve a pair of directional torques that essentially offset one another when the rope is deployed to affect a wearer's controlled descent. The CDS rack as shown will generate a clockwise directional torque while application of the secondary frictional brake causes a counter-clockwise torque as rope spools outwardly from alternating elastic loops of the triangular panel on the wearer's back for a "near net zero" torsional effect. Together, this rack and frictional brake combination eliminate the problems with other rope-based safety harnesses in which unbalanced torque forces may cause the rope to tangle or otherwise knot up within and stop proper rope deployment from same.

One embodiment of the original harness includes about thirty feet of interwoven nylon rope. For higher elevation end uses, such as certain industrial applications, one or two extension packs with cross-hatched, elastic loops may be inserted before the final, removable cover is installed over everything. In the latest improvement, a sturdy yet thinner and lighter weight rope or line, is made from a high strength aramid fiber, like the Technora® line sold by Blue Water Ropes. Lines such as an 8 mm Technora product sold by the name "Canyon Extreme" enable a tighter back-and-forth winding within the primary CDS pack. That particular aramid derivative, in a 5/16" (8 mm) diameter thickness, preferably via a braided weave, can achieve tensile strengths of over 5000 pounds, more preferably about 5800 pounds. At those levels, this latest product line improvement achieves levels in excess of current ANSI Standard Z 359 without too much lateral arrest force.

With such tighter winding, and thinner, lighter line/rope, a one-panel pack will enable fall recoveries from as much as seventy-five (75) feet. With supplemental (i.e. one or two) extension packs added, the relative rescue range for this improved CDS model can be increased to about two hundred (200) feet or more thus enabling self-recoveries by industrial workers like those installing, repairing or servicing the wind turbines used to generate electrical power. In any event, these improved distance harnesses are intended to supplement a breakaway tether configuration as is well known in the art. Such tethers, which can range in length from 1 to 5 or 6 total feet, are not intended to serve a significant shock absorbing function. Rather, they are intended as a backup, partial tearaway means for supplementing while still attaching to the line of this improvement and providing the harness wearer with some initial recovery assistance after he/she first realizes that their fall has been arrested and that they must now implement their own elevated self recovery plans.

For both versions of this CDS harness, the fully installed rope configuration can and should be visually inspected before every use. And while wearing same, one individual can operate the first and second braking mechanisms from the front since all necessary "hardware" for controlling gradual descent after a fall is safely, yet unobtrusively situated on the harness wearer's back. When a full recovery (i.e., climbing back up into the tree stand) is not possible or practical, the wearer of this CDS harness may peel back the cover over his/her one shoulder pocket and accessing the primary and secondary brake controls for this invention. With the fabric strap held firmly, the wearer can pull down on that strap to then pull out the primary brake pin. The wearer then slightly releases pressure on the brake strap, further relaxing pressure on the rope and causing a gradual, yet easily controlled, frictional unwinding of rope from side-to-side, and from the top of the triangle to its base, or until the wearer has reached a safety point on the ground or elsewhere.

The original and present inventions further relate to a CDS harness for use with an anchor line or other climb assist. In the unlikely event of a total malfunction, there is included at the lower end of this triangular back pack a redundant Reserve Suspension Relief Strap (or RSRS) for the wearer to use if still suspended to relieve pressure from their groin area that a typical harness leg strap creates. For that emergency contingency situation, the harness wearer would first reach to the right rear bottom of their triangular pack or panel and extract from a slot in same an elongate strap of nylon webbing roughly 8.5 feet long by 1 inch wide. The fully extracted strap can then be lowered in front of the harness wearer and firmly reattached by tying to an opposite loop (sometimes called "a lineman's loop") on the harness' left waist strap. This RSRS must be duly secured before the wearer takes turns standing with one or both feet on the looped strap, and possibly even sitting on that loop, for sufficient periods of time to relieve musculature pressure on the harness wearer's legs and pump venous blood back to their heart for helping to prevent suspension trauma.

One controlled descent harness per the original and present inventions comprises an adjustable belt extending around the wearer's upper chest with another adjustable belt for the wearer's waist. There is also included a pair of adjustable straps for around the wearer's upper thighs or legs. Two shoulder straps extend from that waist belt over the wearer's shoulders before criss-crossing on the wearer's back to form a triangular panel (which also serves as a "spreader assist" to keep these shoulder straps properly separated). An elongated rope is interwoven back and forth, between a plurality of elastic rope holder bands which extend along opposed legs of that triangular panel. The rope then passes through a purposefully shaped rack, in a preferred set pattern, before ending with an elevated anchor connector. A removable panel then covers this fully packed triangular back panel.

Aspects of the original invention address the need for a lightweight, i.e. less than about ten (10) pounds, controlled descent system (or "CDS"). More preferably, a fully assembled CDS harness weighs about 5-6 pounds for the most common applications using about 30 feet of nylon rope within. That rope passes through a multi-apertured, fixed rack before being loaded, from side-to-side and from top-to-bottom, on the wearer's back, unobtrusively out of the way. A first and second braking mechanism prevents the harness wearer's free fall, then lets that same wearer control a gradual, low speed descent to the ground by operational controls located on the front of said harness. For the latest improvement that uses a thinner, lighter weight rope/line, the overall packed CDS weight is about 2-3 pounds lighter than the original invention, or about 4-5 pounds for a harness that enables self-recovery from up to 75 feet with just one packed/ woven inner panel. For the same relative "packed" weight, the overall rescue range of the present invention can be increased by about 2.5 times or more. And with two or more pack inserts, the relative rescue range for this latest improvement can easily meet or exceed heights of about 200 feet or more.

In other aspects, the original and present inventions relate to a controlled descent system that comprises: a harness with an upper chest, waist and upper thigh straps that can be worn by a hunter while in a tree stand. An elongate rope attaches directly to the tree or other permanent structure. The other end of that rope secures to a loop on the harness waist belt, then serpentines up and from side-to-side, between rows of elastic fabric loops to fairly firmly hold the potentially life-saving rope in place, free of tangling and/or knotting. At the top of that rope interweave, it passes through the brake mechanisms of this harness, then through a CDS rack having a preferred design and a preferred threading pattern there through. When that rope is controllably unwound, to spool through that rack and out the top rear of this harness and affect the wearer's controlled descent thereby, directional torque forces from the rack and a secondary brake wrapping with said rope offset one another thereby further preventing rope tangling and potentially non-deployment from the harness proper.

Other aspects and advantages of the original invention, and the present improvement to same, will be apparent from the following description and appended claims.

BRIEF DESCRIPTION OF THE DRAWINGS

Further features, objectives and advantages of the original and present inventions will become clearer when referring to the detailed description of preferred embodiments made with reference to the drawings in which:

FIGS. 6A-D are close-up views of one embodiment of CDS rack having a lowest most aperture around which Kevlar® tape is applied before nylon rope is threaded there through: FIG. 6A being a perspective view of the rack on its vertical axis rotated slightly clockwise; FIG. 6B being a top plan view of said rack; FIG. 6C being a cross-sectional view taken along lines 6C-6C of FIG. 6B; and FIG. 6D being a cross-sectional view taken along lines 6D-6D of FIG. 6B;

FIG. 6E is a close up, perspective view showing an alternate embodiment of CDS rack according to this invention;

FIG. 7E is a top view of the main attachment strap after it is passed through the lowest aperture of the CDS rack and reconnected to the spine brace;

FIG. 7F is a right side schematic view taken along lines F-F of FIG. 7E;

FIG. 8A is a close up, top perspective view showing the brake limiter, friction brake strap and secondary straps affixed to the main CDS rack attachment strap during harness assembly;

FIG. 8B is a top perspective sectional view showing a further extension of said secondary brake strap, with Velcro® connectors, as positioned within one shoulder strap of this CDS harness;

FIG. 15A is a top plan view showing an underlying framework of the main triangular panel with a reserve suspension relief strap incorporated into its base;

FIG. 15B is a right side close up of the reserve suspension relief strap at the base of the triangular panel with the cover removed for better viewing;

DETAILED DESCRIPTION OF PREFERRED EMBODIMENTS

Figure 1A:
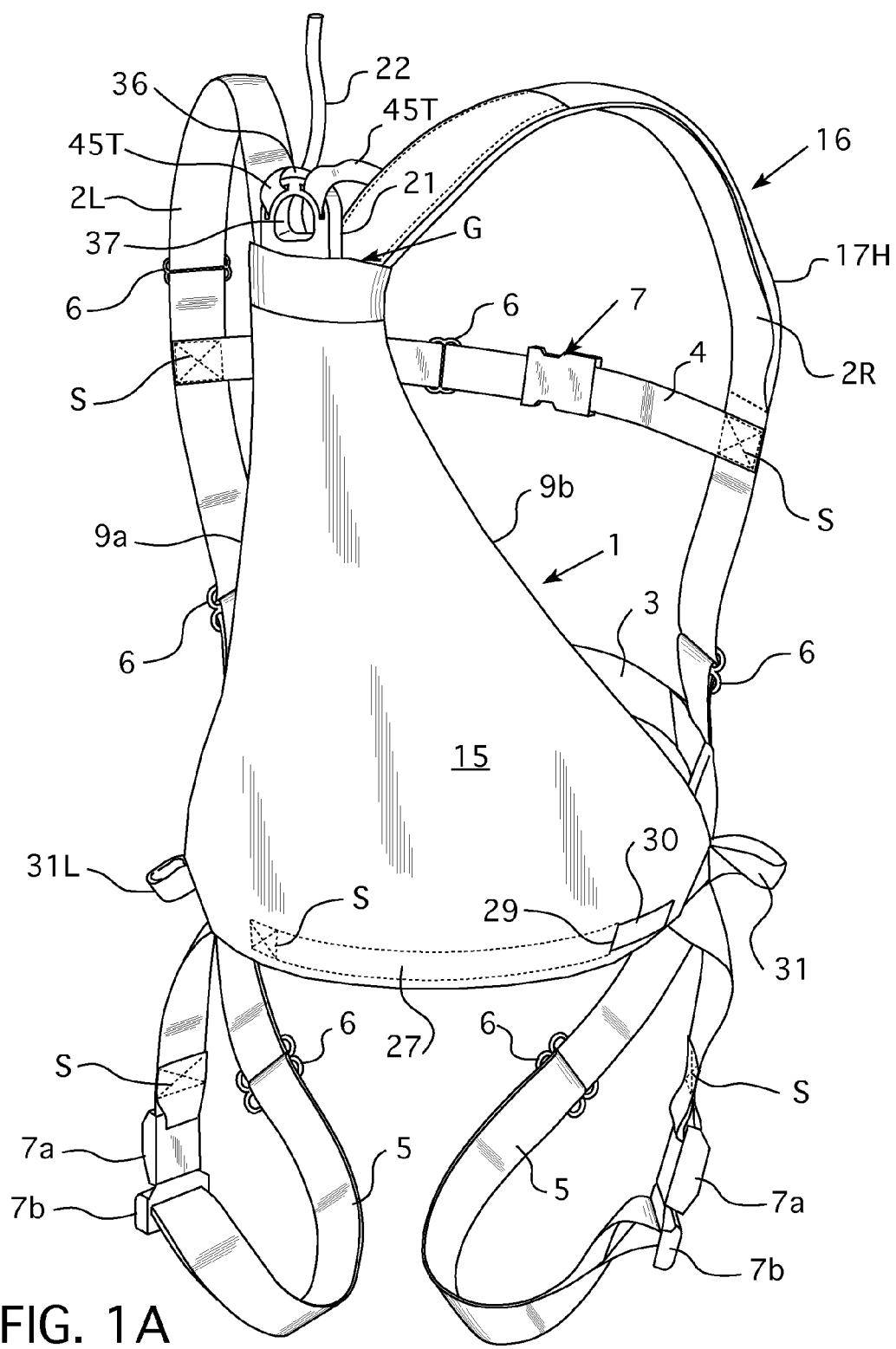
FIG. 1A is a right rear perspective schematically showing a controlled descent system (CDS) with the rear cover in place as it would appear when worn by a user with the upper chest, waist and upper thigh straps buckled together.

A primary object of the original and this present invention is to provide a system which provides its wearer with the ability to safely descend from an elevated height to the ground, or some intermediate safety point, in a gradual, controlled manner. The system should be operable with minimal wearer involvement, and no necessary third party involvement.

A further object of both inventions is to provide a lightweight, fall-arresting harness that is not too bulky, yet easy for the wearer to: (a) pre-inspect before every use, (b) install on one self; (c) use for a controlled descent after a fall arrest; and/or (d) deploy an integral RSRS, if needed.

A further object of both inventions is to provide a CDS (controlled descent system) that provides its wearer with the ability to safely, gradually descend to the ground after a fall arrest for minimizing wearer exposure to prolonged suspension in a harness and obviate serious injury or death from same.

A further object is to provide an improved fall protection system for a hunter, worker, or other person engaging in various elevated location activities. In the event this harness wearer is unable to affect a full self-recovery, he/she can operate the two part braking mechanism built into the system and control their own gradual descent to the ground.

A further object of both inventions is to provide a safety harness which can provide fall protection and controlled descent self-recovery capabilities for persons on elevated platforms such as tree stands, ladders, or the like, i.e. the types of platforms encountered in many hunting, commercial and/or industrial applications.

A still further object is to provide this CDS harness with a built-in, "back up" reserve suspension relief strap (RSRS) in the event of a primary system failure.

The original and present inventions are both directed to an emergency CDS harness that provides a safe, gradual, and controlled descent from an elevated position back to the ground or some intermediate safety point after a fall arrest.

These inventions are further directed to an improved lightweight harness that can be worn by hunters or by persons working at elevated heights, said harness being configured for greater simplicity and convenience than conventional harnesses to: put on, adjust, wear and use.

In general, these inventions include a carefully stored length of high tensile strength nylon line or rope. Alternate embodiments may use rope made from a high strength, synthetic polymer or composite. This rope is contained in a soft, lightweight, unobtrusive pack on the wearer's back that can and should be visually inspected before every use. At a minimum, such visual inspections should affirm that the brake pin is properly positioned through the intertwined secondary brake components and rope before passing into its assigned brake pin strap grommet. Alternate embodiments include a second, or second and third extension pack of interwoven rope. To deploy rope from the top of this backpack, there is included a first and second, friction-induced braking mechanism. There is further included an integral reserve suspension relief strap at the bottom of said pack.

One end of rope from this CDS should be attached directly to a tree, pole, or other secure elevated anchor point. And like most any safety harness, this CDS should be used with a stand alone anchor line or other similar attachment.

In one configuration, this CDS comprises several main elements including an adjustable upper chest strap and an adjustable waist belt. Two adjustable shoulder straps extend upwardly from the front of that waist belt, over the wearer's shoulders, and criss-cross one another before reconnecting to attachment points on the rear of that same waist belt. In the area of shoulder belt criss-cross, these straps form on the wearer's back a triangularly-shaped panel section, roughly in the upper-center of his/her back. That rear panel serves as the main area for rope storage and from which the rope will deploy. Together, this panel and two shoulder straps give the harness "body" and definition as a garment. They also better facilitate how the CDS device of this invention should be first donned and worn.

The aforementioned harness is further equipped with a pair of upper thigh or leg straps which extend downwardly from that waist belt at the lower sides of the harness. Each such strap, also adjustable, passes between the wearer's legs, and back up to a buckle or parachute-type connector at or near the waist belt in either the harness front or side. Such leg straps may be equipped with padding or widened/enlarged to minimize constriction on wearer blood flow, increase wearer comfort in the event of a fall, and extend potential survival time by suspension after a fall.

With the aforementioned combination of upper chest, waist, shoulder and upper thigh straps, this harness provides sufficient security and comfort while also minimizing the chance its wearer could, in any way, fall out regardless of his/her relative physical orientation during or after the fall. All the buckles of this harness are metal rather than plastic. They meet or exceed all U.S. safety standards for use regardless of weather conditions, i.e. too hot or too cold.

With the foregoing CDS design, and rack for same, this invention satisfies all known requirements for a typical harness including: (a) withstanding more than a six foot drop with 200 weight pounds; (b) accommodating at least a six foot drop with an individual weighing at least about 300 lbs; and (c) coming to a full stop within 42 inches (or 3.5 feet) of a fall with a total generated force of less than 1800 lbs.

It should be noted that common features in the different views of the original invention are shown with the same reference numeral(s). For alternate embodiments of the same component, there is consistent numbering though in the next hundred series. When referring to any numerical ranges herein, it should be noted that all numbers within the range, including every fraction or decimal between its stated minimum and maximum, are considered to be designated and disclosed by this description. As such, disclosing a preferred strap width ranging from 1 to 3 inches, expressly covers strap sizes of 1.1, 1.25 and 1.5 inches . . . and so on, up to about 2.75, 2.8 and 2.99 inches. The same applies for every other quantitative range herein.

In many of the accompanying FIGURES, references are made to preferred stitching patterns of adjacent components/elements. For some parts, safety harness assembly rules dictate a particular zigzag or rectangle and criss-cross stitching, for full weight and/or stress load reinforcement. In the FIGURES, these stitches (regardless of pattern) are designated with an "S". It should be understood, however, that numerous other means exist for interconnecting adjacent component parts than the precise pattern so shown.

Referring to FIGS. 1A through 2A, there is shown a first embodiment CDS harness, generally 1, that includes two adjustable shoulder straps 2L, 2R attached to and extending upwardly from an adjustable waist belt 3 toward the front of harness 1. In the FIGURES, these straps are shown as being made from 2 inch wide, nylon webbing. Other materials may also be used for same.

Both shoulder straps 2L, 2R extend over the wearer's shoulders on either side of their neck before criss-crossing midway down the wearer's back and returning to the waist belt 3 towards the rear of harness 1. With that configuration, the CDS achieves a "spreader back" arrangement which provides sufficient shape to the harness to ease in a novice wearer's first time try on. These shoulder straps and the back panel section they outline (or define) give the harness more of a vest-like look and feel.

Another strap 4 runs horizontally, across the wearer's front upper chest between shoulder straps 2L, 2R. Two separate straps 5 extend downwardly from waist belt 3 for wrapping about the wearer's upper thighs (or legs) before reconnecting to that same waist belt. Every strap herein, i.e. both shoulder straps 2L, 2R, waist strap 3, upper chest strap 4 and upper thigh strap 5, includes an adjustable slide buckle 6 for extending or shortening its effective strap length to the comfort of the wearer. And for other than the shoulder straps, all other adjustable straps, particularly waist strap 3, upper chest strap 4 and both upper thigh straps 5 are fitted with an interconnecting fastener 7, divided into matching fastener pairs 7a and 7b, that reconnect to one another after wrapping about a particular body part of the wearer, i.e., the waist, upper chest and upper thigh, respectively. These fastener pairs 7a and 7b are made from metal assemblies, rather than plastic or rubber-coated variations, so as to better resist the brittleness from outdoor temperature extremes, i.e. using this harness when too hot or too cold. In some cases, these fasteners consist of a male component on one strap end and a matching female component on the other strap element.

While harness 1 is adaptable, it is preferred that the device be made in a variety of sizes, i.e. small, medium, large and extra-large (2×, 3×, even 4×), for the wearer's personal comfort. Similarly, the design configuration shown in these FIGURES is specific for a wearer to operate his/her harness using the right hand to affect a gradual controlled descent. For those reasons, the braking mechanisms for this harness are stored in a compartment in the upper right shoulder strap, 2R. For hunters who are right handed, this arrangement allows for greater flexibility and range of motion, especially when using a bow, either compound or recurve. Should the hunter prefer a left-handed set up, one will be made available with the relative direction of certain key components being reversed and provided as mirror images of what is shown herein.

Near the middle of the harness wearer's back, shoulder straps 2L, 2R criss-cross one another to define a main rear body panel 8. As shown, rear body panel 8 is predominantly triangularly shaped with a pair of slanted side legs 9a, 9b and lowermost triangular base 10 that would be horizontal, or substantially horizontal, during harness use. As shown, triangular base 10 is a separate element from the rear side of waist belt 3. In alternate embodiments (not shown), triangular base 10 may be made integral with, or otherwise overlap waist belt 3 for further structural reinforcement of the overall harness.

Figure 15C:
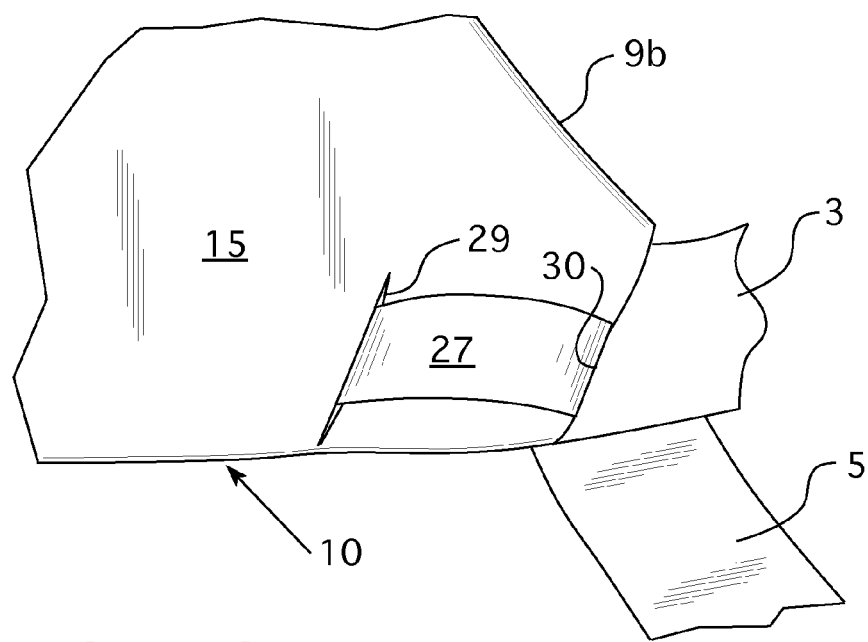
FIG. 15C is a right side close up showing the right side of the reserve suspension relief strap partially protruding beyond the removable cover.
Figure 15D:
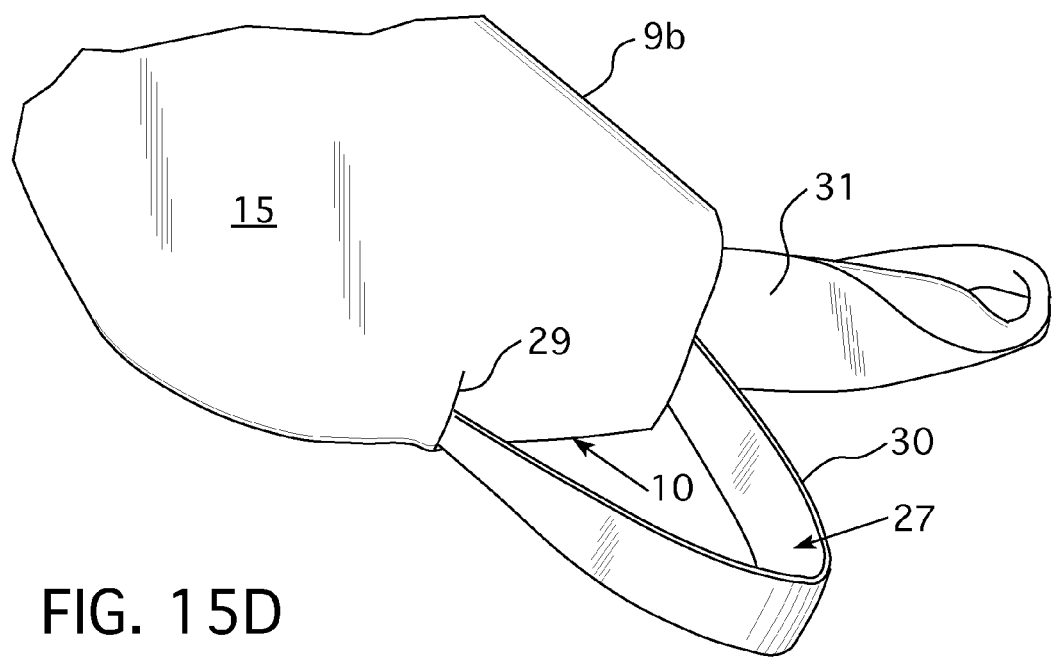
FIG. 15D is a right side close up view showing the reserve suspension relief strap from FIG. 15C partially extracted from the CDS harness.

Preferably, additional reinforcement straps are provided for rear body panel 8. In FIG. 15A, for example, there is shown a pair of reinforcement straps 11 which also criss-cross one another before connecting to opposed shoulder straps 2L, 2R. That collection of straps is overlaid with a reinforcing spine brace strap 12 that runs substantially perpendicular to waist belt 3. Spine brace 12, made from 2 inch wide nylon webbing as shown, divides rear body panel 8 into two half triangles, both having adjoining right angles nearest triangular base 10. On a preferred basis, all of these panel straps are affixed to a common soft fabric backing 13. That backing provides the panel with some body, definition and shape. In one embodiment, backing 13 is made with material having a printed or otherwise-applied camouflage pattern.

On the reverse or interior side of fabric backing 13 (i.e., the non-rope holding and deploying side closest to the harness wearer's back), there are situated several strips of hook and loop fastening (or Velcro®) tape 14a. They are positioned on the reverse/interior side of backing 13, along the outer edges to triangular side legs 9a, 9b and triangular base 10. For that reason, these Velcro® strips are shown in silhouette (or with dashed outlines) for where they would appear when seen from the front views of rear body panel 8, and more especially backing 13.

An outer cover 15 is removably situated over most of backing 13. Preferably, outer cover has elongate flaps 15F that are meant to overlap and wrap around the outer edges to the triangularly-shaped rear body panel 8. On the interiors of these elongate flaps 15F, there are positioned corresponding sections of Velcro® tape 14b for matching up with the other tape sections 14a around the perimeter of the reverse/interior side of backing 13. When outer cover 15 is in place, and the harness worn, the wearer's back provides additional means for securing said outer cover by normally pressing against these elongate flaps 15F. Additional cross angled sections of Velcro® tape 14c extend diagonally from the lower corners of rear body panel 8, on the actual exterior (or rope holding and deploying) side of backing 13 where left triangle leg 9a meets triangular base 10 and also where right triangle leg 9b meets base 10. They assist in securing the lower, outermost corners of the outer cover 15 during normal use.

Outer cover 15 is especially configured for repeated fastening and removal so that the inner workings of rear body panel 8 may be inspected (at least visually) before every use. Such inspections should detect any tampering or unexpected wear on main components, including the nylon rope and its corresponding loop holders. More importantly, with each visual inspection, the harness wearer should readily determine that the brake mechanism components, particularly its primary pull pin (discussed below), is properly situated in and through its appropriate pin-holding grommet.

Like its inner counterpart (backing 13), outer cover 15 can be made from a camouflage patterned material so as to be less readily visible to game, and not unnecessarily alarm game animals. For other recreational activities, and most industrial, commercial, or other applications for this CDS harness, backing 13 and outer cover 15 may be made of brightly colored fabric, such as a high-visibility, fluorescent chartreuse or safety-orange for increased visibility. For additional nighttime safety and visibility to other hunters, backing 13, or at least portions of outer cover 15, may include one or more patches of retro-reflective material, such as 3M's Scotch Brite®, or Reflexite®.

Figure 2A:
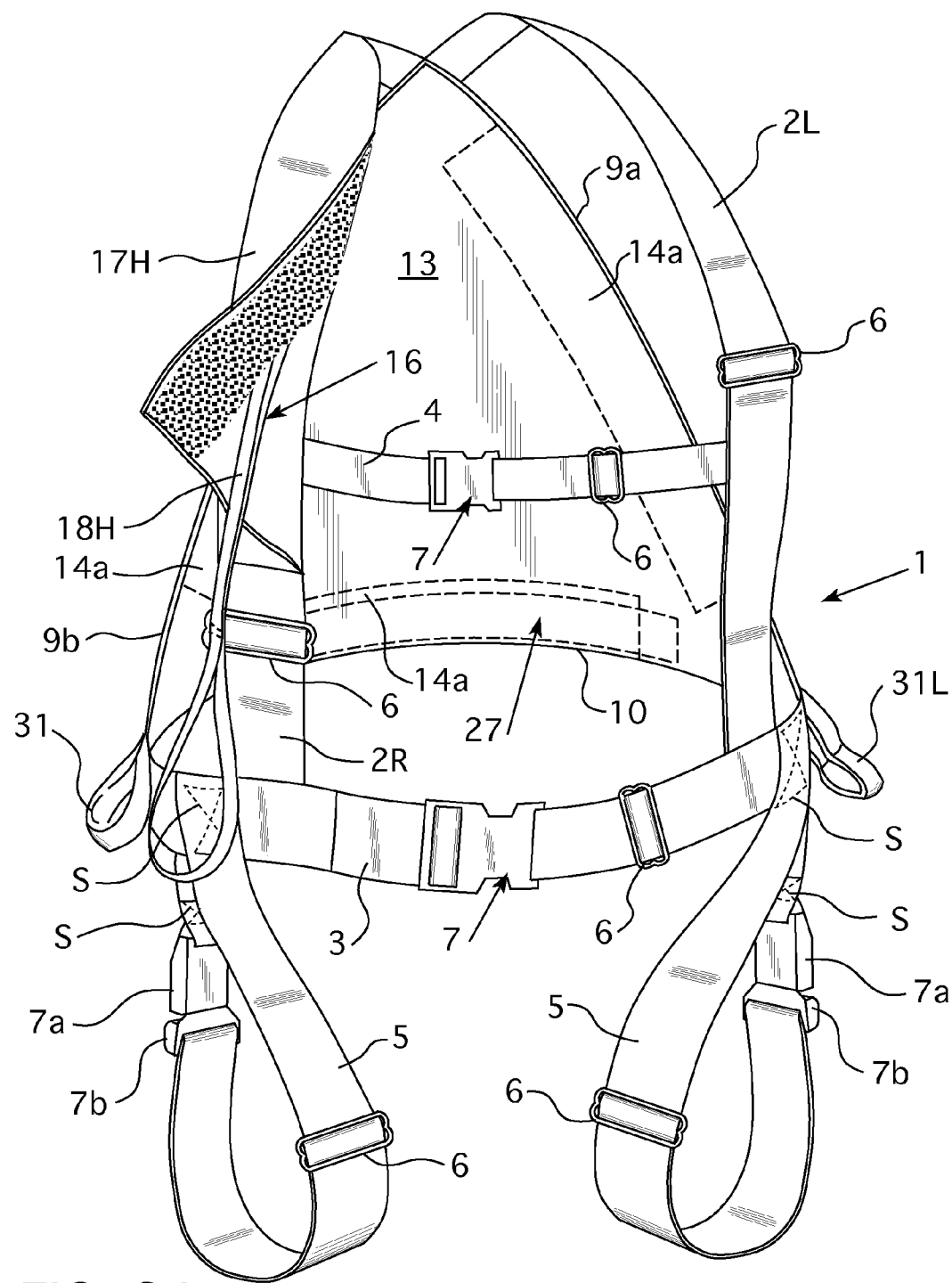
FIG. 2A is a left front schematic of the CDS from FIG. 1A with its upper chest, waist and upper thigh straps fastened together.
Figure 2B:
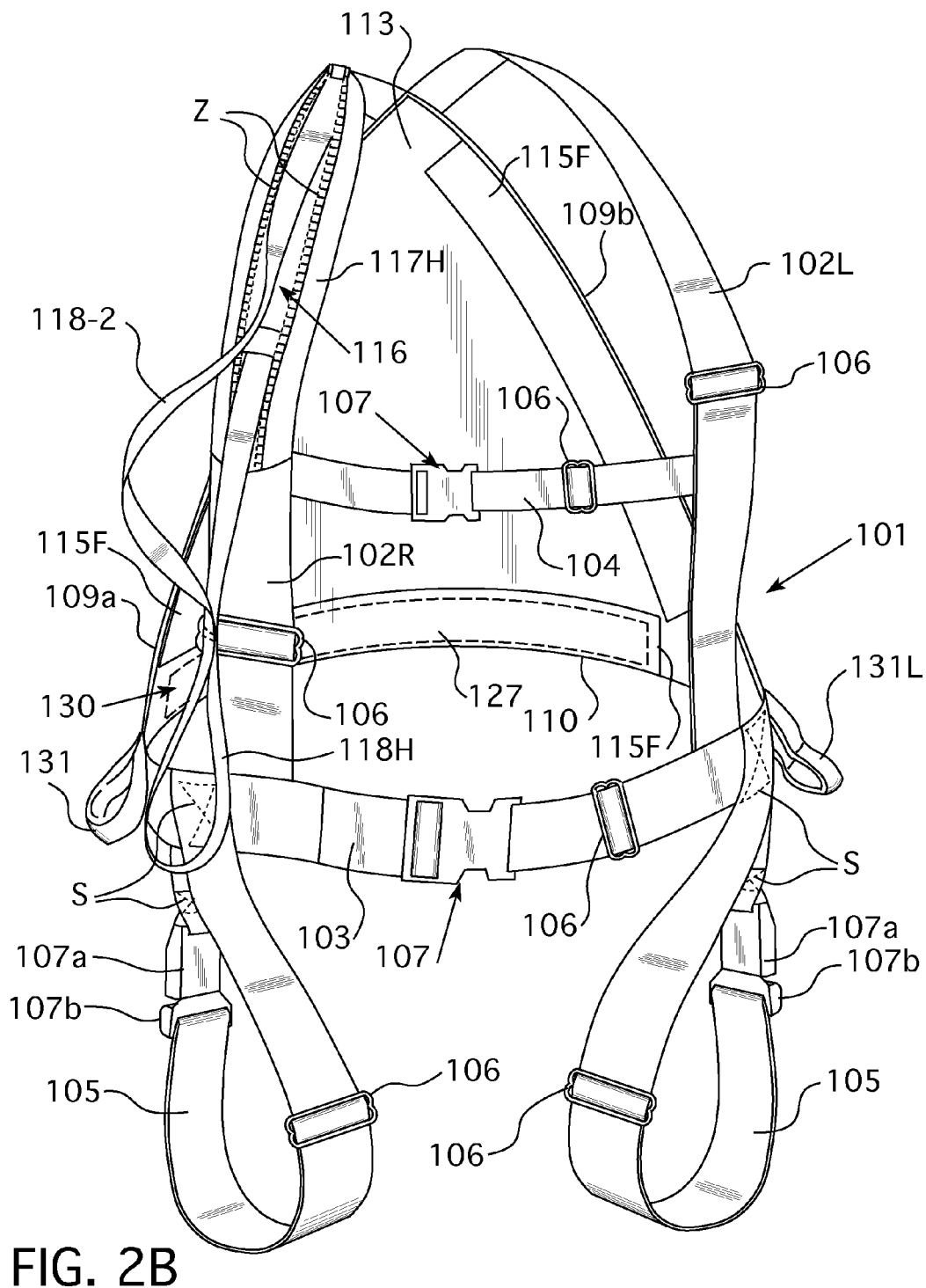
FIG. 2B is a left front schematic perspective of an alternate CDS harness with a zippered cover for the shoulder strap housing the braking mechanism.

In right shoulder straps 2R, there is included a compartment 16 protected by its own Velcro-taped, handle cover 17H. As best seen in FIG. 2A, compartment 16 is generally located in the upper portions of strap 2R, closest to the harness wearer's upper right arm, or shoulder. It is to be understood, however, that in an alternate configuration (not shown), the same compartment can be located in the opposite shoulder strap 2L, closer to the wearer's left arm. For FIG. 2B, an alternate arrangement for the right shoulder strap 102R to its harness 101 includes a cover 117H (with zipper component Z) over its brake mechanism compartment 116.

After a fall arrest, the wearer of harness 1 should peel away the outer flap to cover 17H (or unzip alternate embodiment cover 117H) exposing the contents of compartment 16/116. Within that compartment, there is an elongate fabric strap that serves as a control handle or brake handle strap (or "BHS") 18H. As shown, BHS 18H is made from ⅝ inch wide nylon webbing. Preferably, BHS 18H has corresponding sections of Velcro® tape, 19a and b, affixed to its inner sides to enable secure folding of BHS 18H onto itself as best seen in accompanying FIGS. 8B and C. BHS 18H is but one component to the primary and secondary braking mechanisms of this harness. Other components will be described in more detail hereafter.

Figure 1B:
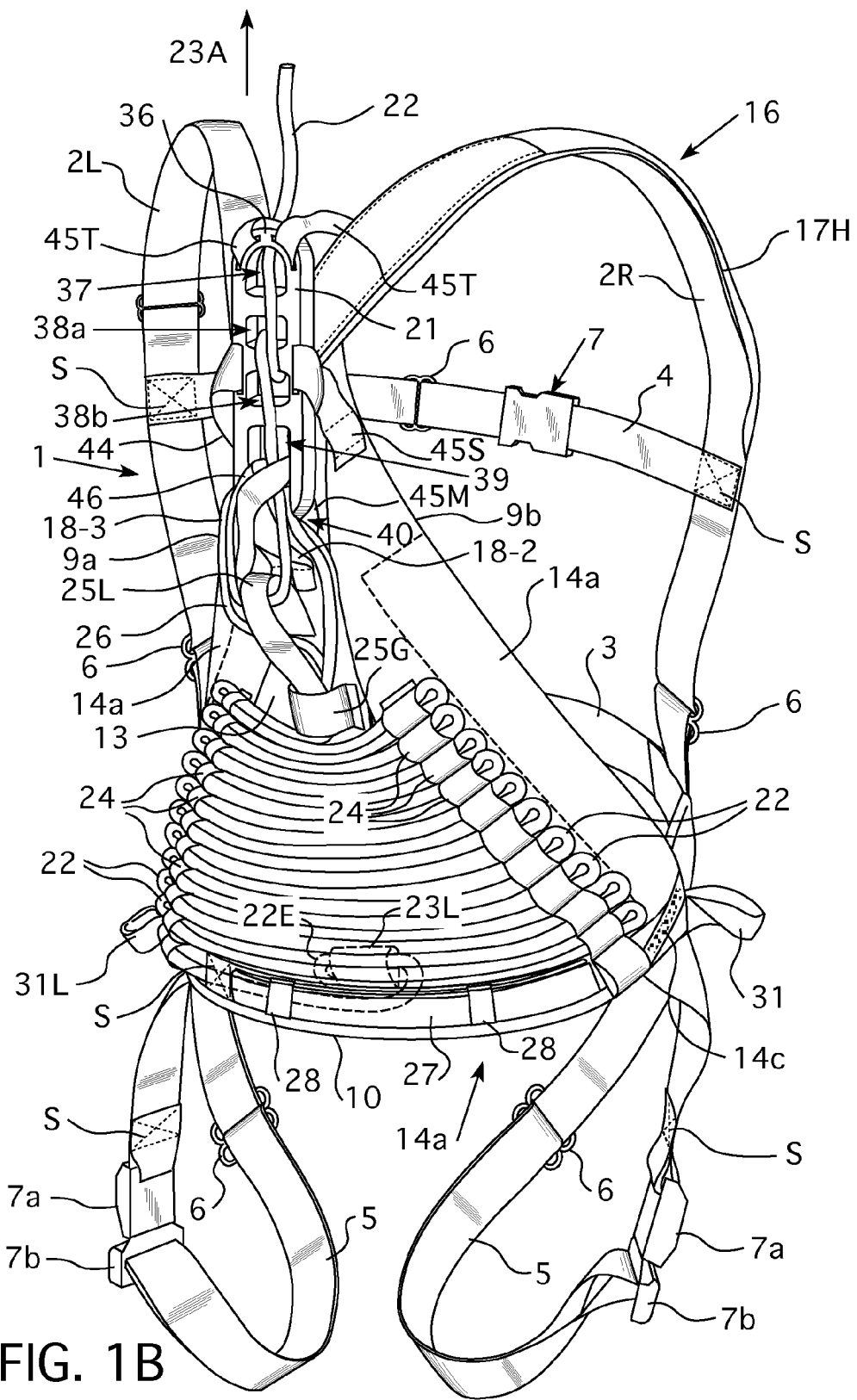
FIG. 1B is a right rear perspective schematic of the CDS from FIG. 1A with the rear cover removed for better viewing.
Figure 1C:
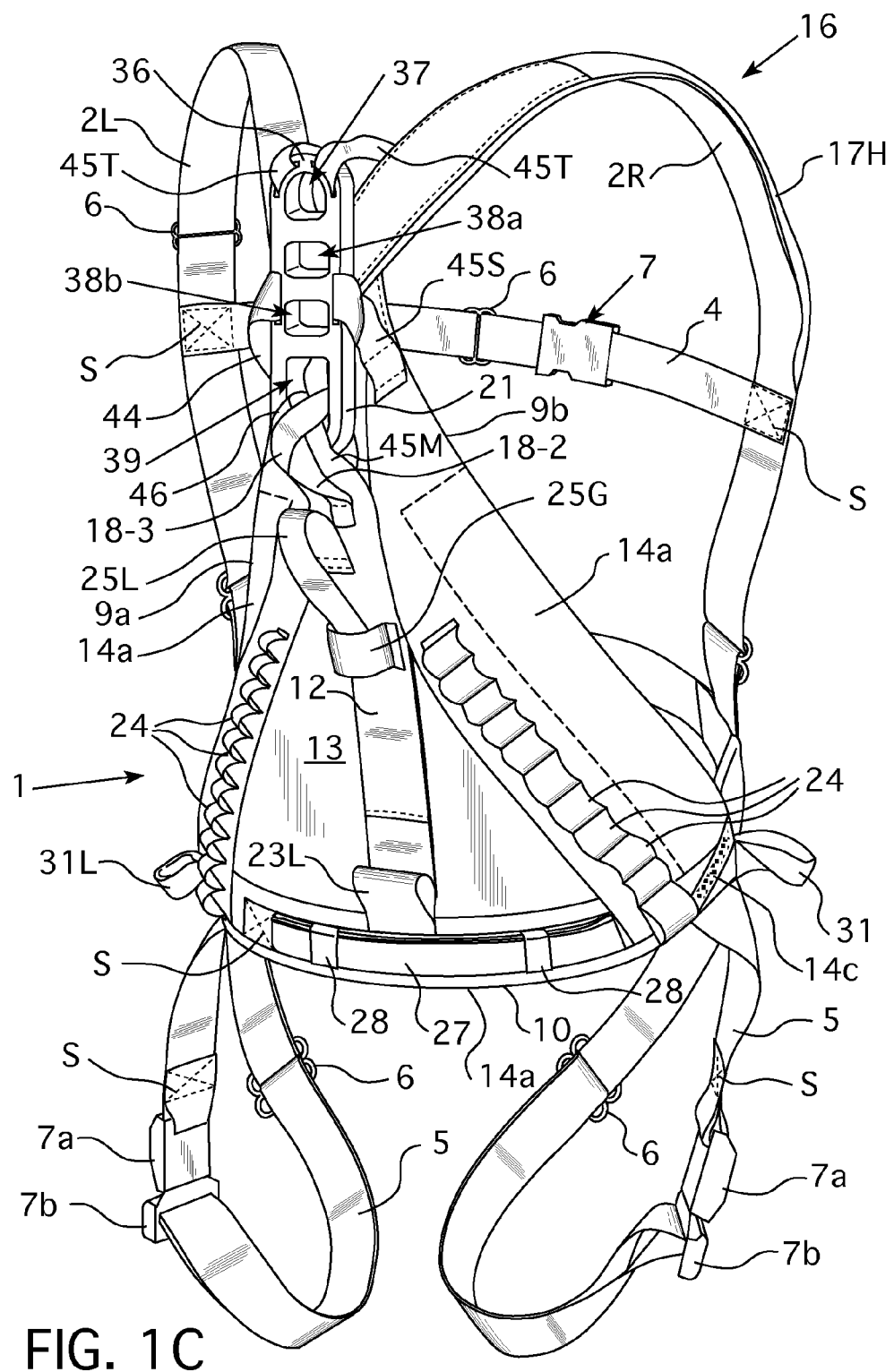
FIG. 1C is a right rear perspective schematic of the CDS from FIG. 1B, with the interwoven rope removed for better viewing.

In FIGS. 1A through C, nearest the top of outer cover 15, there is shown a CDS rack 21 through which an elongate section of rope 22 is intentionally threaded in a precise pattern described hereinafter. As used herein, rope 22 is made from nylon, about ½ inch in diameter and roughly thirty feet in total length. (For other embodiments described hereafter with regard to FIGS. 5A and B, longer sections of rope are employed for extending the relative rescue ranges for higher recreational and/or certain industrial end use applications.)

A lowest most end 22E of rope 22 secures to a fabric loop 23L immediately above and partially overlapping a central area of triangular base 10. Alternate embodiments (not shown) may replace fabric loop 23L with a plate, hook or other permanent internal anchoring means affixed to the middle rear of waist belt 3, spine brace 12, or combinations thereof.

Figure 10A:
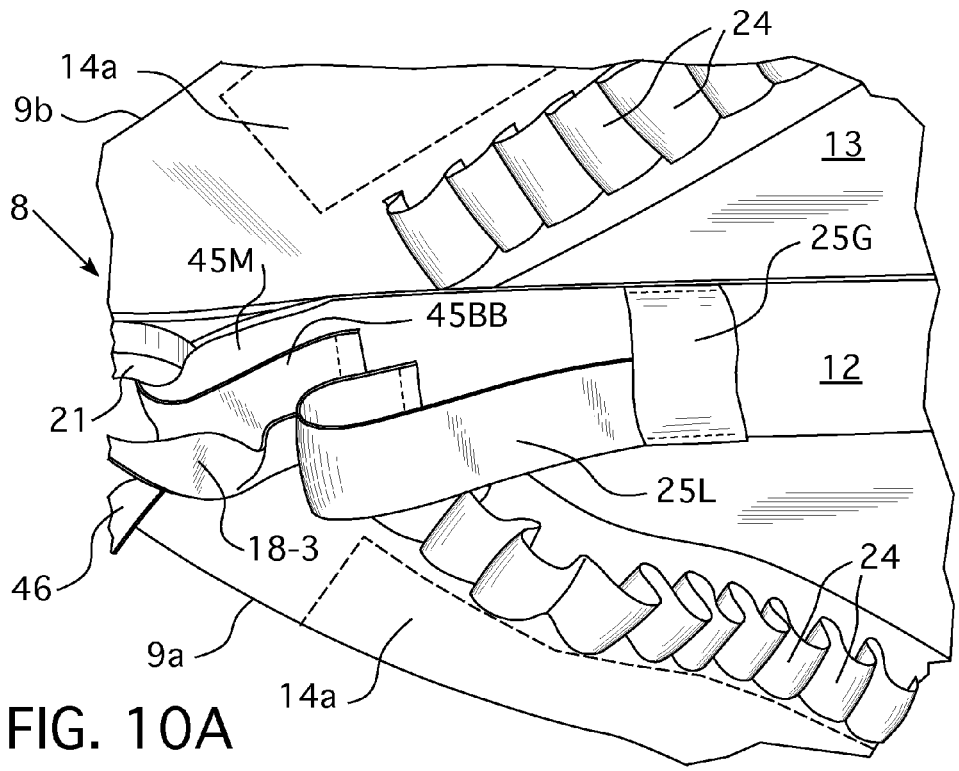
FIG. 10A is a top perspective view of the rope loop guide and spine strap rope guide affixed offset to the left interior edge of the spine brace according to one embodiment of this invention.
Figure 14:
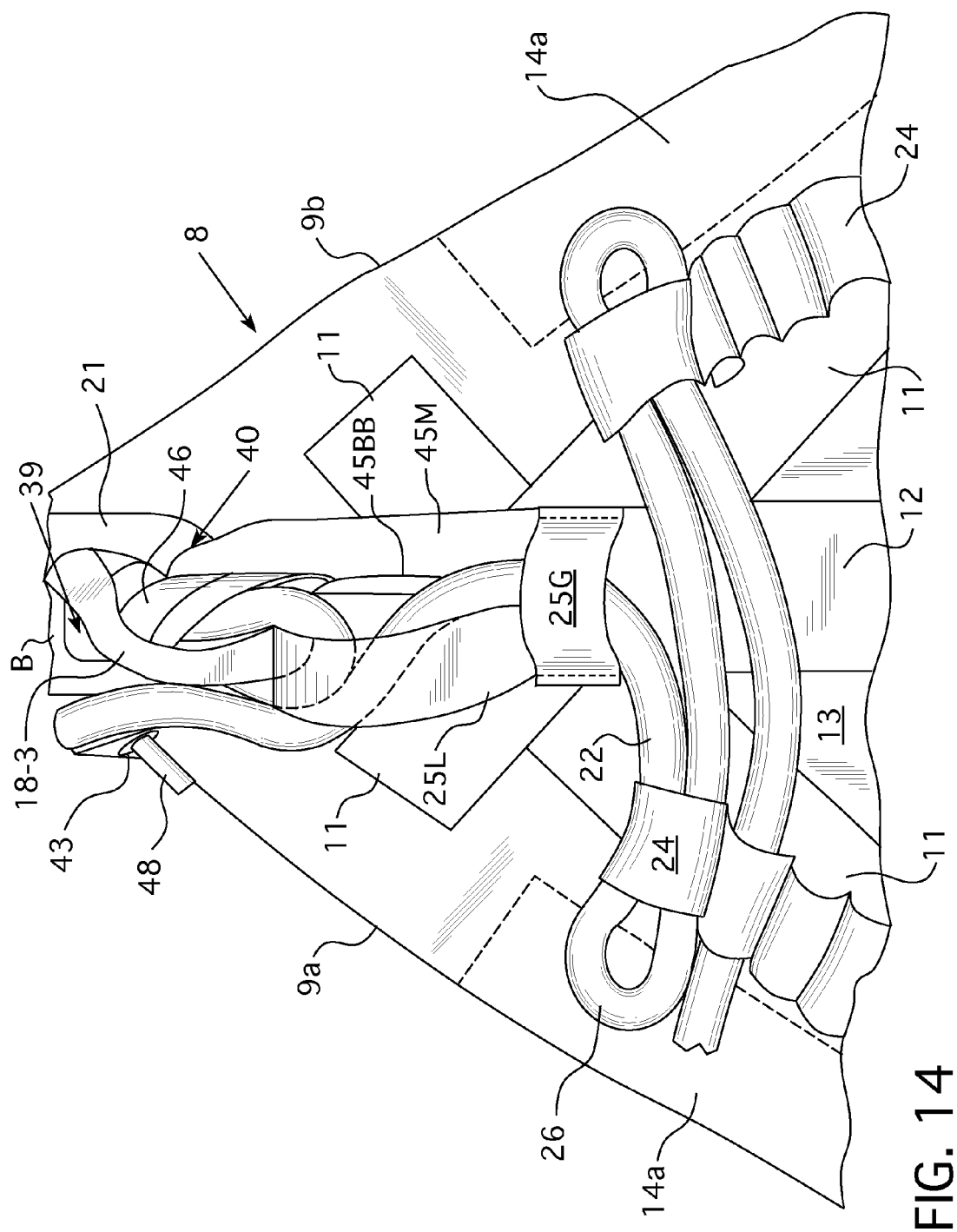
FIG. 14 is a top plan view showing the start of nylon rope serpentining within the elastic loops on the triangular panel legs.

Nylon rope 22 serpentines back and forth and from side to side of rear body panel 8, then up through CDS rack 21 in a preferred, preset pattern. After exiting outer cover 15 of harness 1, nylon rope 22 terminates at its opposite end in a fixed clamp, clasp or other known high elevation anchor 23A. To best secure nylon rope 22 to rear body panel 8 in an interwoven, non-tangling pattern for unspooling, there is provided a plurality of elastic loop fasteners 24 running along (either up or down) most of the length of triangular side legs 9a and 9b. For a typical harness that houses roughly 30 feet of rope when fully deployed, both sets of fabric fasteners 24 along side legs 9a and 9b would require at least ten (10) spaced loops, connected in an adjoining manner, as best seen in FIGS. 10A and 14.

After being interwoven up the triangular sides to rear body panel 8, nylon rope 22 passes through a rope guide 25G affixed substantially perpendicular to spine brace 12 and then through rope loop guide 25L nearer the middle of spine brace 12. The latter loop guide 25L runs parallel to the spine brace 12, but is slightly offset (i.e. along the left perimeter of same) as best seen in FIGS. 10A and B. Such offsetting imparts a balanced fulcrum of resistance to the pressures stored by the primary brake pull pin and the pressures exerted by the rope being pulled up and through the CDS rack. In other words, the offset placement of rope guide 25G applies equal stresses to both side edges, the left edge of same being under the primary pull pin 48 and the right edge being under CDS rack 21.

During installation in the harness 1, rope 22 is bent or otherwise folded onto itself to form a hairpin loop 26 before proceeding in a precise, preferred pathway through rack 21 and out the upper gap G between fabric backing 13 and outer cover 15.

A reserve suspension relief strap (or RSRS) 27 is secured at one end of the waist belt 3 with stitching S or other means before being folded back-and-forth, onto itself and held in place with at least two securing straps 28 to the interior of triangular base 10. A slit 29 is provided in outer cover 15. A section 30 of RSRS 27 passes through that slit 29 for the wearer to reach back and access in the event of total CDS harness failure. Once fully extracted from outer cover 15, the free end of RSRS 27 is tied to a lower loop 31L (sometimes called a "lineman's loop") on the opposite side of waist belt 3. (For possible reverse hand installations, there is an unused loop, element 31 on waist belt 3 nearer the wearer's other hip.) In an alternative embodiment (not shown), the free end of RSRS 27 may be fitted with a clasp, clamp or other anchor for securing to a metal eyehook adjacent to or integral with lower loop 31L.

Figure 16A:
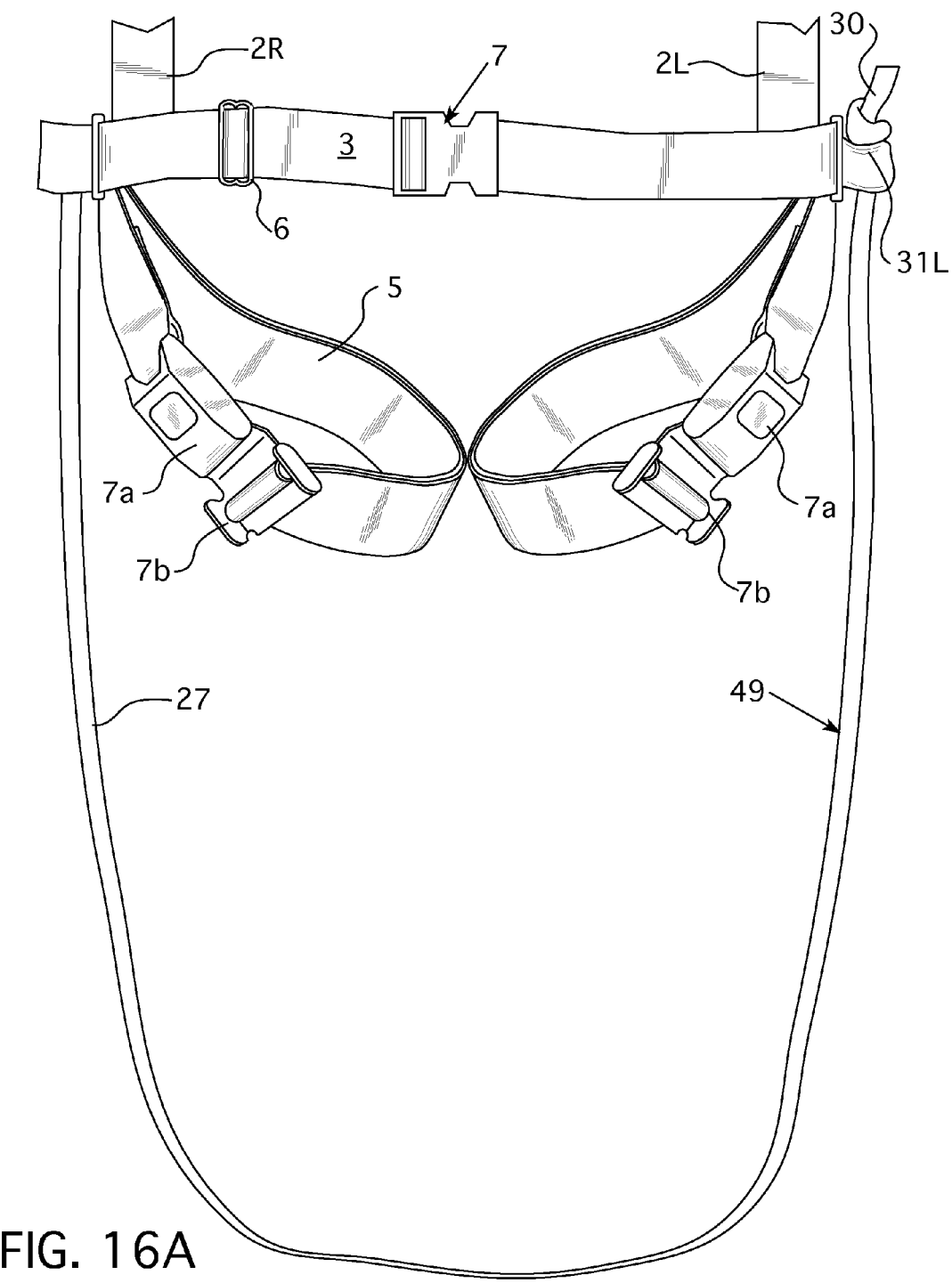
FIG. 16A is a front perspective view showing a fully deployed reserve suspension relief strap RSRS connected to a waist loop on the harness, said strap creating a swing on which the wearer may sit or stand to rest his/her legs from time to time.
Figure 16B:
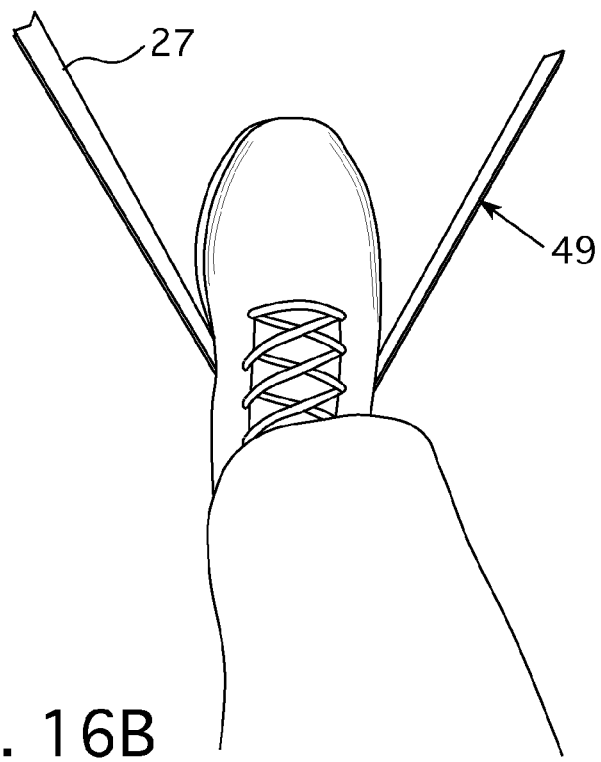
FIG. 16B is a front perspective view showing one foot of the harness wearer resting in the RSRS loop.
Figure 16C:
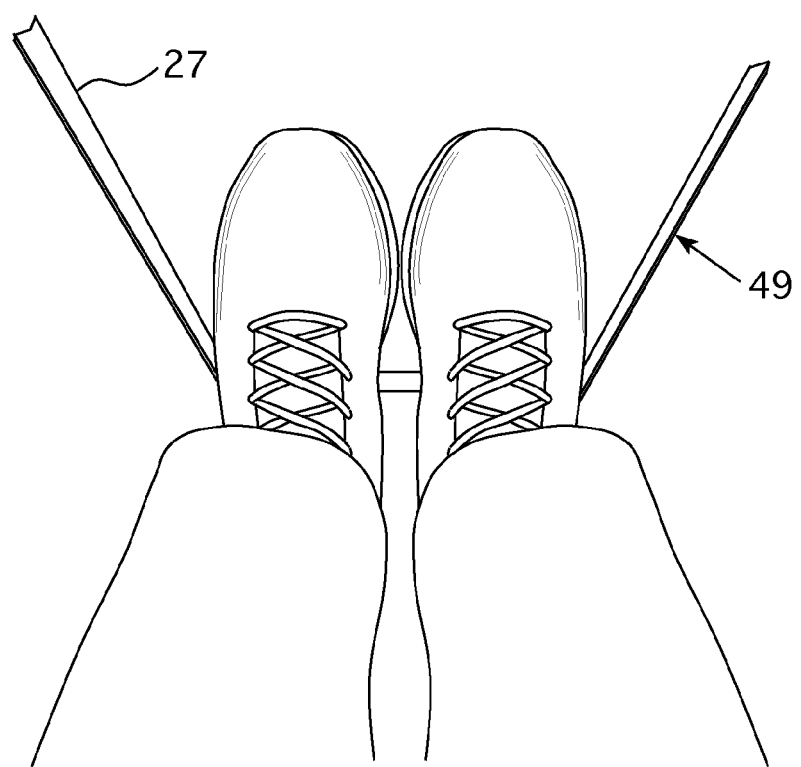
FIG. 16C is a front perspective view showing both feet on the RSRS loop.

After securing, a fully deployed RSRS 27 forms a sling-like rest or swing 49 that dangles in front of the harness wearer. To relieve pressure on the wearer's legs while otherwise suspended, swing 49 provides a rest area on which to sit and/or rest one or both feet for short periods of time. See especially, FIGS. 16A through C.

It is a critical improvement of this invention to have an integrally connected RSRS. Should the wearer need their RSRS as a last resort, it is already affixed at one end and need only be extracted for connection and possible life-saving use. Some commercially available harnesses now include an emergency strap in a storage compartment. However, in a dire emergency, reaching back to a pocket for extracting an untethered strap may cause the wearer to panic and drop same to the ground before deployment. Harness 1 herein lets a wearer drop the freed RSRS end several times before reaching back to eventually connect same to connector loop 31L.

Figure 3A:
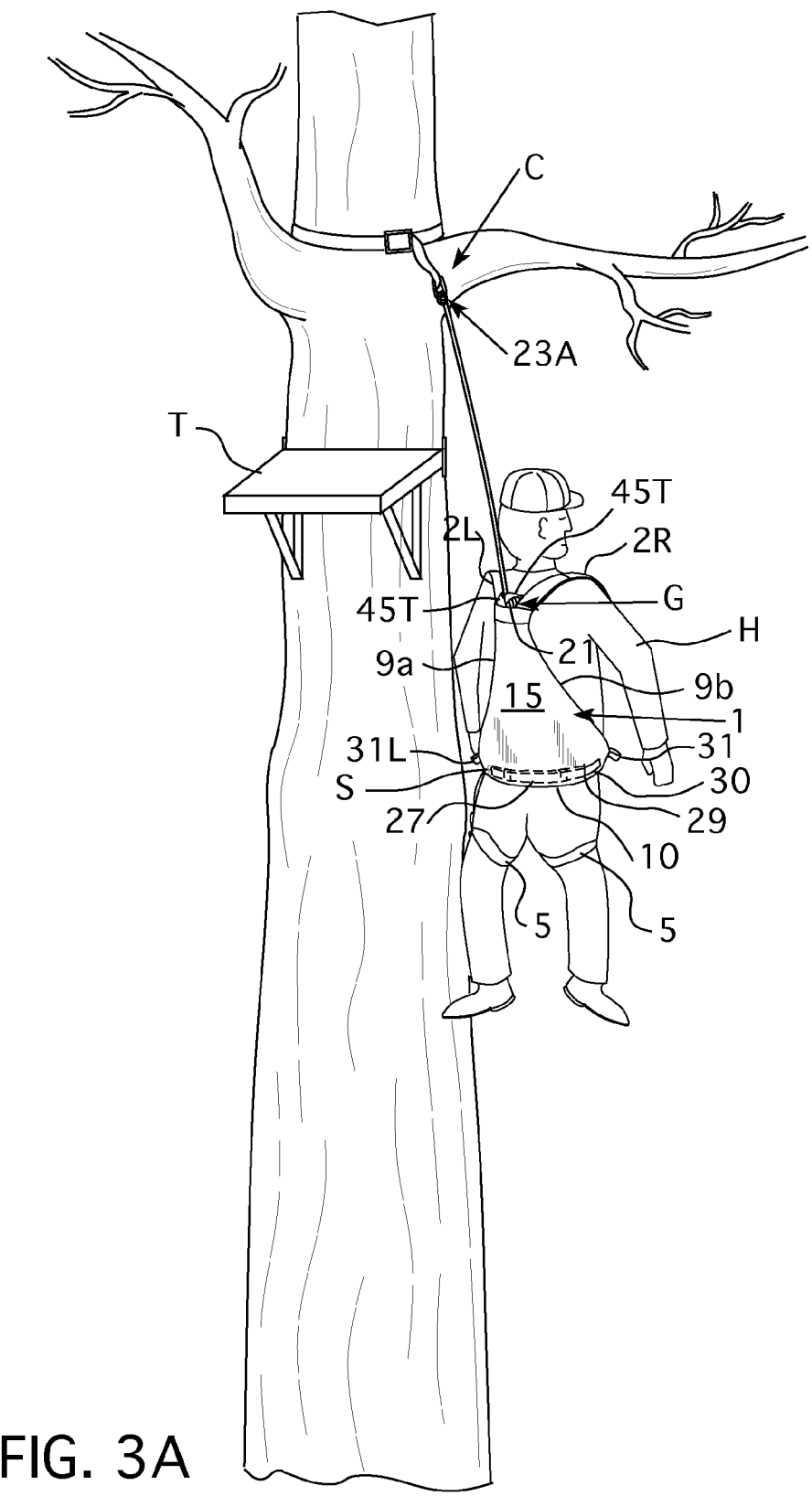
FIG. 3A is a rear perspective view showing a hunter wearing one embodiment of CDS harness and suspended after a fall arrest from his nearby tree stand.

Referring to FIGS. 3A and B, there is shown a representative deployment of CDS harness 1 by hunter H. In FIG. 3A, hunter H is shown after his fall from tree stand T has been arrested. The uppermost end 22E of rope 22 extending from the top of outer cover 15 was previously secured to the tree via connector C. That connector C may be any suitable attachment/anchoring device such as a belt, tether strap, cable, chain, rope, line, or cord. Optionally, that same rope end 22E may be fitted with a coupling or tensioner ratchet for tightly securing to the tree.

Figure 3B:
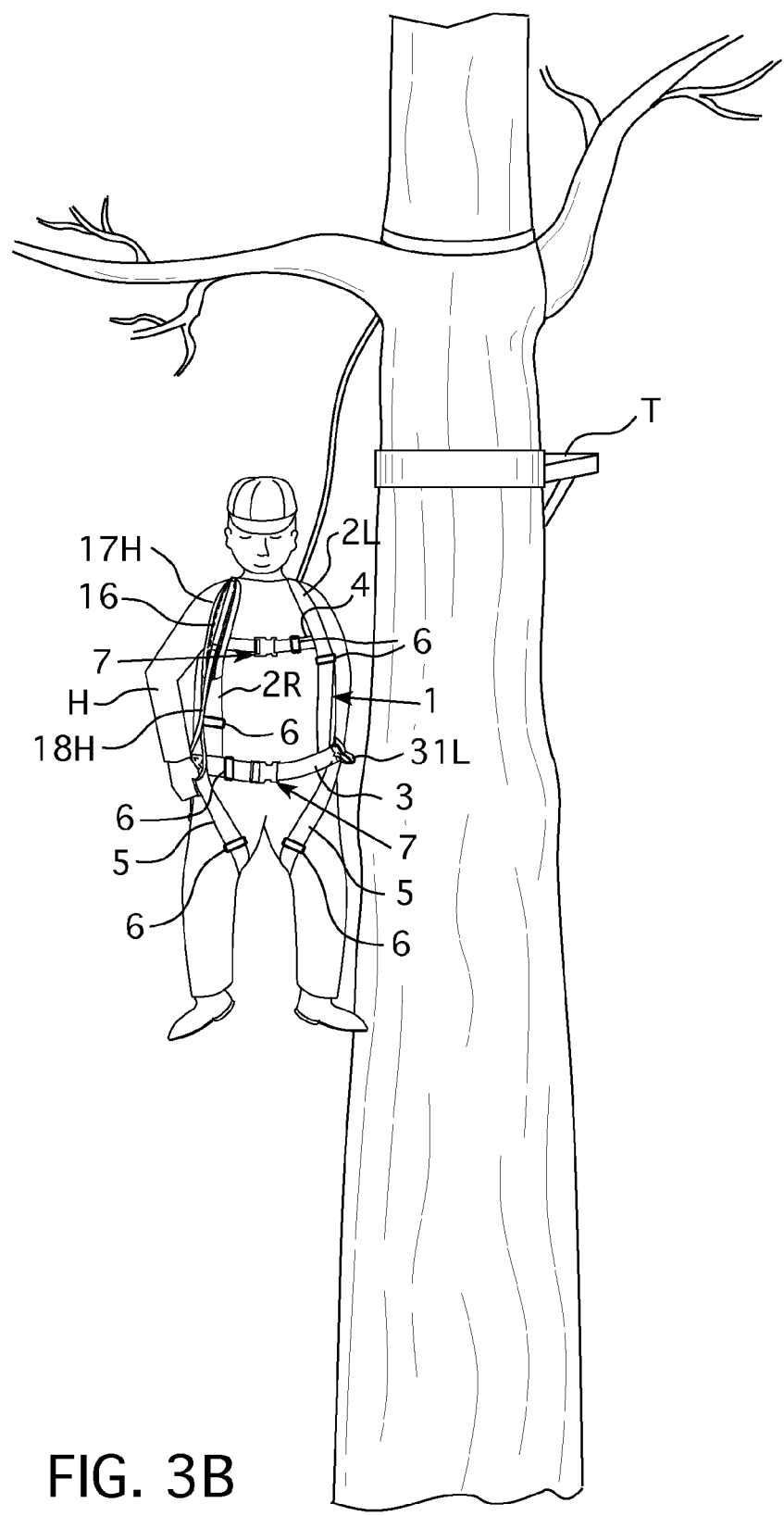
FIG. 3B is a front perspective view showing the FIG. 3A hunter after having removed the braking mechanism from the right shoulder strap to control his own gradual descent.

If hunter H was unable to affect a self-recovery back onto tree stand T, FIG. 3B shows that hunter H starting to affect his own controlled descent to the ground with harness 1. Particularly, hunter H pulls down brake strap cover 17H to access compartment 16 and removes brake handle strap 18H from his right shoulder strap 2R. As described later, BHS 18H includes an uppermost handle portion for hunter H to manually control his rate of descent. BHS 18H further includes an intermediate Secondary Brake Strap ("SBS"), element 18-2 below, and a Kevlar® Lined Frictional Brake (or "KLFB") component 18-3 for intentionally imparting some frictional resistance to the rope 22 passing there against during deployment. Finally, a low end of SBS 18-2 folds back onto itself to form Primary Brake Pin Strap (PBPS) 18-4

After first pulling on the BHS 18H to extract primary pull pin (not shown), hunter H actuates his harness' secondary brake by loosening his hold on BHS 18H. That releases a locking pressure on rope 22 allowing it to gradually deploy (with frictional assistance) by unwinding from top-to-bottom and from side-to-side, out the elastic loop fasteners 24 of rear body panel 8 and through CDS rack 21.

Figure 4A:
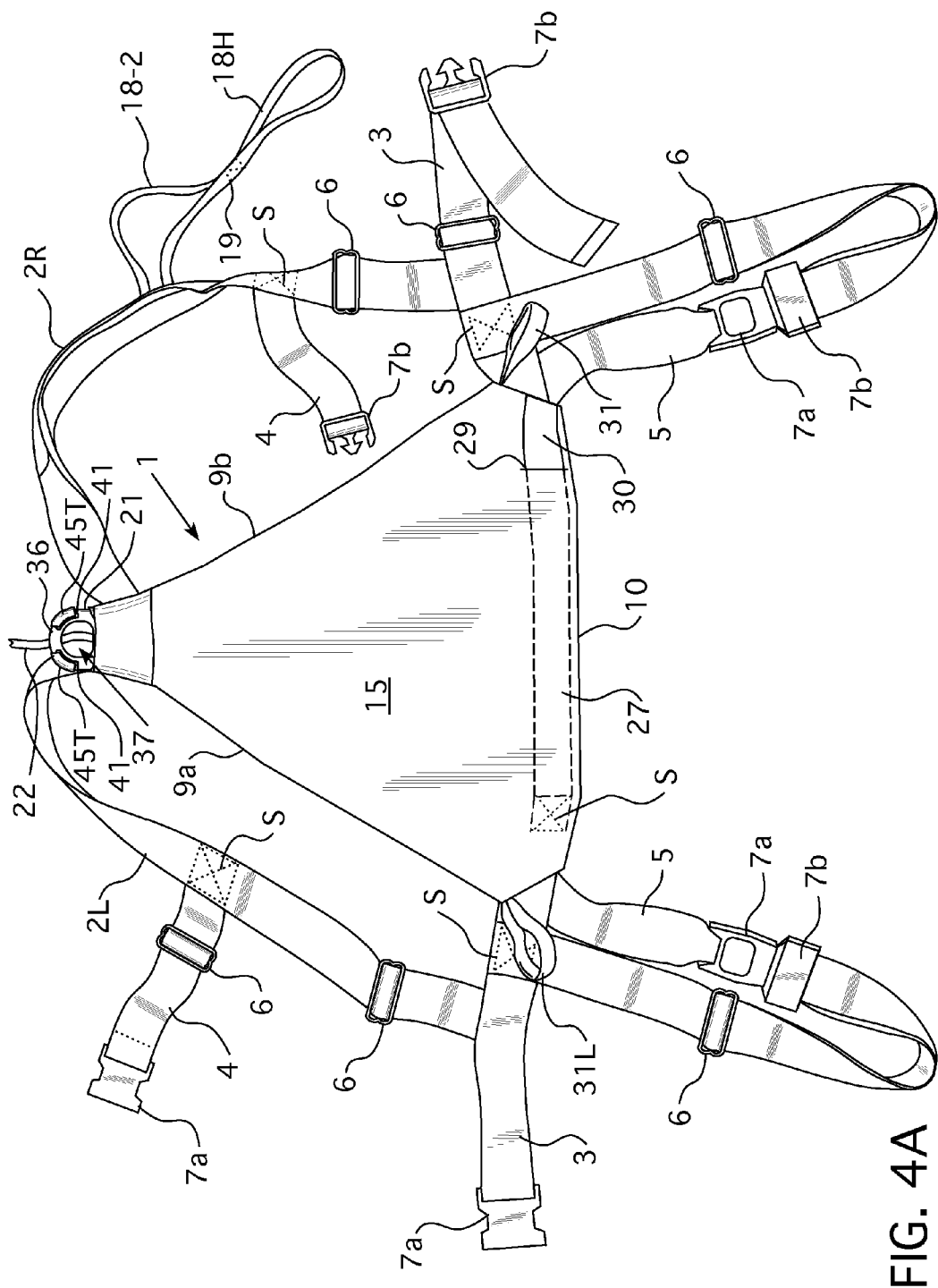
FIG. 4A is top plan view showing a flattened out CDS harness, face down, with the removable cover in place over the interwoven nylon rope.
Figure 4B:
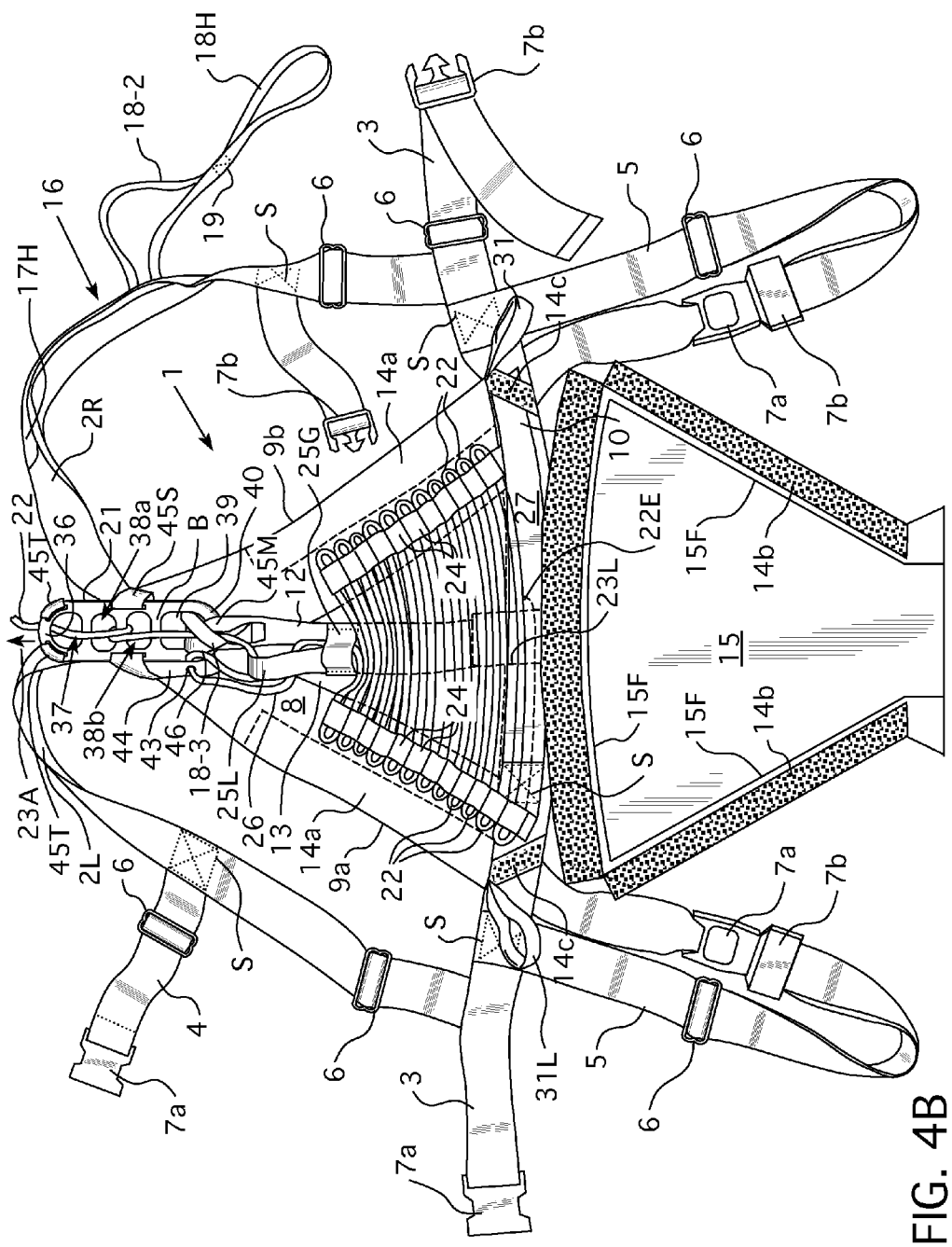
FIG. 4B is a top plan view of the FIG. 4A harness with the cover flipped down but not fully removed to expose the rope interwoven on its elastic loop panel there under.
Figure 4C:
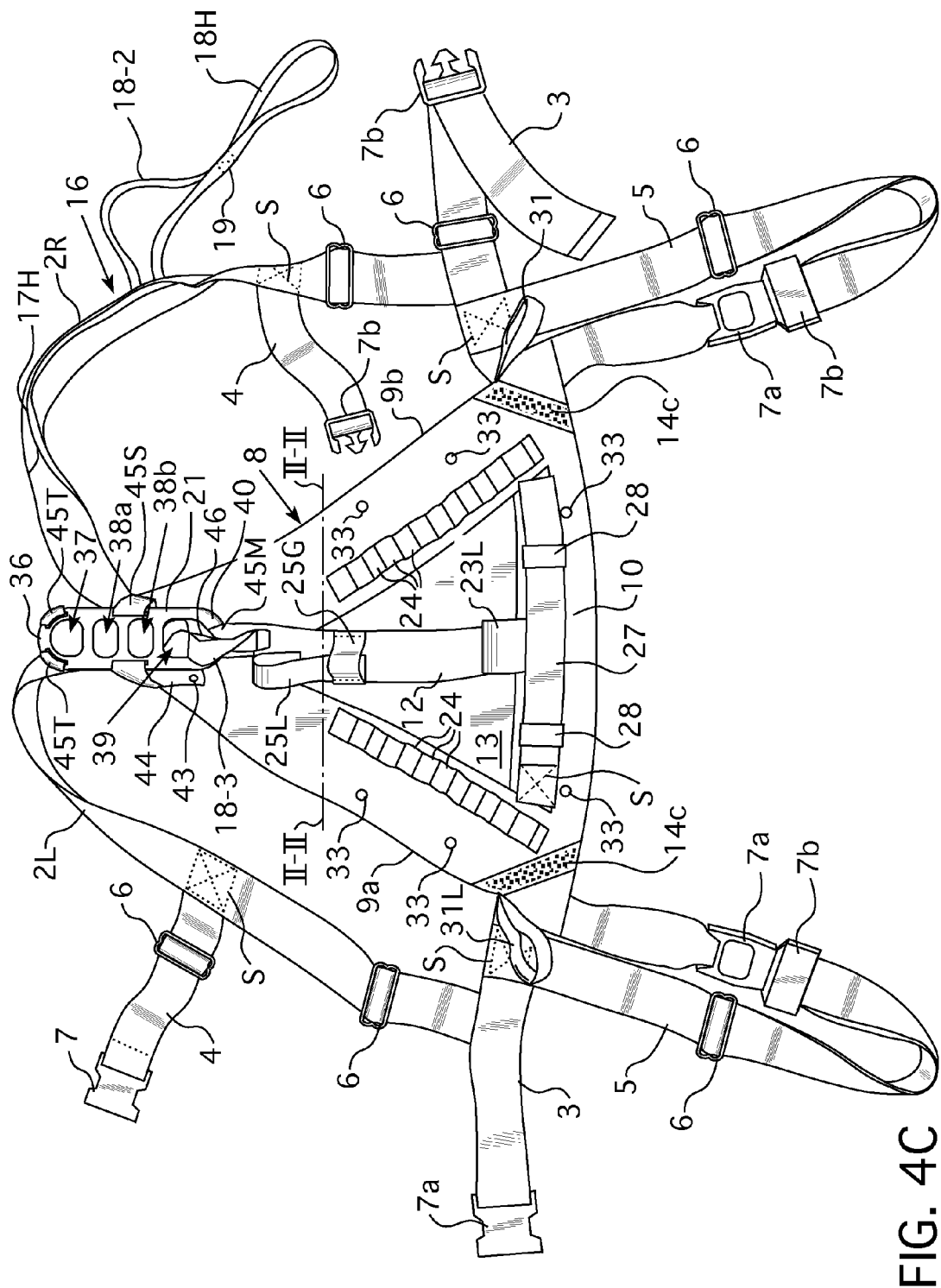
FIG. 4C is a top plan view of the FIG. 4B harness with the interwoven rope removed for better viewing.

FIGS. 4A through C show CDS harness 1 with its outer cover 15 in place (FIG. 4A); said outer cover flipped down (FIG. 4B); and said interweave of rope 22 removed for better viewing of other components there beneath (FIG. 4C). In FIG. 4B, one preferred method of outer cover attachment is shown in detail. It consists of matching corresponding sections of Velcro tape 14a and b on outer cover 15 and the reverse/inside edges to fabric backing 13. Additional corner sections of Velcro 14c are situated across the lower, outer corners of fabric backing 13 on the rope side of same.

One main application for this CDS is to assist hunters in tree stands. For that application, a total rope length of 30 feet should be sufficient. Most tree stands are situated at or near that elevation. Keep in mind that a hunter's body height may add another 6 feet of recovery length to any harness. If one were to hunt from a stand about 40-45 feet high, this CDS harness could still be useful in lowering one's height to a mere 10 feet or less before cutting free from the fully deployed nylon rope and dropping the remainder, a more palatable option to remaining suspended in a tree.

Figure 5A:
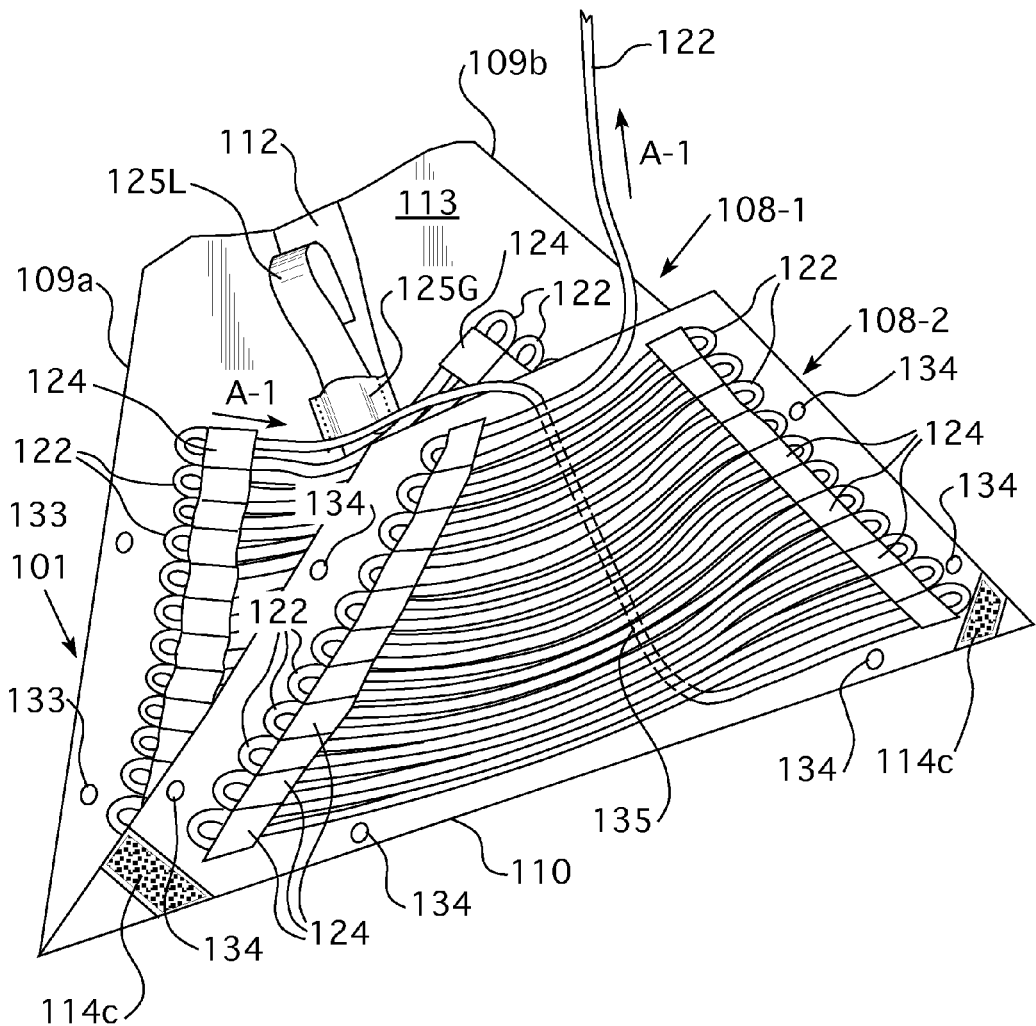
FIG. 5A is a left upper perspective view of one triangular panel variation with a second, outer panel connected to its base for adding another section of interwoven rope and extending the height range for this harness.

For still higher applications, internal panel extension components are shown in FIGS. 5A and B. Particularly, the full harness 101 of FIG. 5A would include a double length of rope 122 for extending its service range to about sixty feet total. For that reason, primary body panel 108-1 is supplemented with second panel 108-2, both panels being joined together along their respective triangular side legs 109a and b, and bases 110. As shown, main body panel 108-1 may be secured with screw rivets 133 duly aligned to connect to matching grommets 134 along the perimeter of second panel 108-2. Line II-II in FIG. 4C shows the maximum height for second panel 108-2 so as to not interfere with the operation of other harness components.

Arrows A-1 in FIG. 5A show the direction that rope would deploy from that two panel system. Particularly, after an arrested fall, rope 122 would first unspool from the top and from side-to-side of the furthest removed (or outermost) second panel 108-2. After extracting from all elastic loop fasteners 124-2 for second panel 108-2, rope 122 would deploy from an intra-panel rope return 135 (shown by dotted lines behind the rope of second panel 108-2) before continuing to unwind, as needed, from the top and from side-to-side of inner body panel 108-1.

Figure 5B:
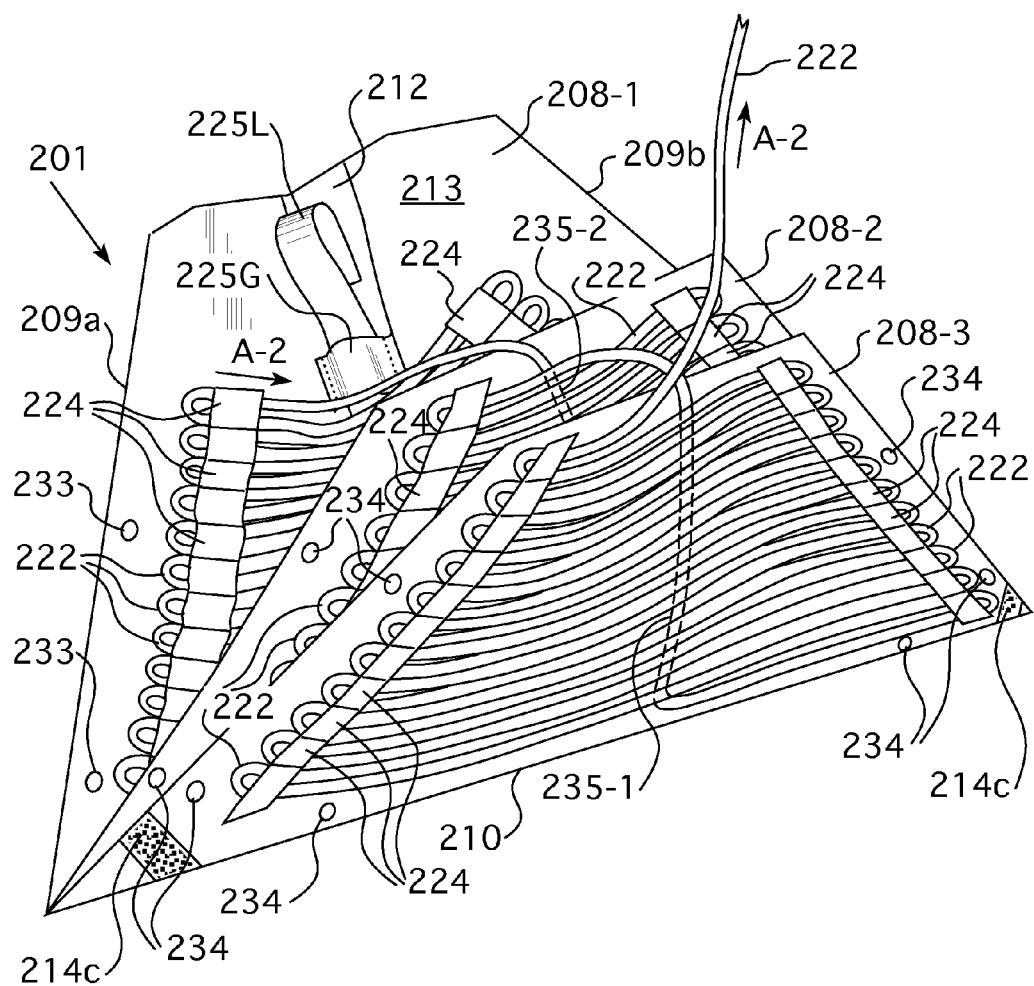
FIG. 5B is a left upper perspective view showing a primary triangular panel with two trapezoidal-shaped rope extensions joined together for unspooling from top-to-bottom and from outside-to-inside, still further extending the usable rescue range for this harness.

In FIG. 5B, a third body panel 208-3 is situated outside, and to the right, of first body panel 208-1 and second body panel 208-2 for that harness 201. As that additional panel extension would increase the harness wearer's recovery range another 30 feet, or up to 90 feet total, it is understood that the preferred path of rope deployment is, once more, from top to bottom, side to side, and from outermost panel inward. Arrows A-2 in FIG. 5B show this general route of rope deployment for a three panel system. More particularly, rope 222 would first unspool/deploy from outer third panel 208-3 and return to the top of second panel 208-2 via first rope return 235-1 (shown, in silhouette, passing under rope 222). Then, if still further unspooling was needed to lower that harness wearer to safety, rope 222 would continue unwinding from the bottom of second panel 208-2, via second rope return 235-2 and back up to the start of primary body panel 208-1.

FIGS. 6A through D show a first embodiment of CDS rack 21 for achieving a controlled descent when the rope deploys there through. In those FIGURES, rack 21 has a rounded top curve 36 to upper aperture 37 followed by two commonly sized intermediate apertures 38a and b, and its largest, lowermost aperture 39 ending with rounded base curve 40. In the embodiment shown, the overall rack dimensions are about 6½ inches long by about 2½ inches wide. Upper aperture 37 measures about 1 inch high at its peak and about 1⅜ inch wide. Both intermediate apertures 38a and 38b measure about ¾ inch long by about 1⅜ inch wide. The lowermost aperture measures about 1¾ inches long to the interior of rounded base curve 40 and about 1⅜ inch wide. All edges E to each rack aperture may be beveled to further assist with frictional movement of rope 22 through rack 21. But no mechanical or other moving parts are required for same. In other words, all bridges B between adjacent apertures (37-38a, 38a-38b and 38b-39) are fixed or permanent. Furthermore, all such bridges B should be rounded, i.e. with no potentially sharp edges, so as to not interfere with the rope 22 serpentining through same.

The four apertures of rack 21 are sized to generate a fixed series of surfaces for the serpentine path that rope 22 passes through during deployment (or unspooling from harness 1). Along that path, rope 22 will contact with and rub against one aperture side, then another, to generate a frictional drag for effectively controlling the rate at which rope will "pay out" during a descent. As mentioned earlier, the design of rack 21 imparts a clockwise rotational torque for the rope passing through. That torque counterbalances the counter-clockwise torque imparted by the KLFB 18-3 of brake handle strap 18H when properly pre-twisted around rope 22.

For securing rack 21 to spine brace 12 and/or other components of rear body panel 8, there is provided a pair of curved mounting apertures 41 above upper aperture 37, nearer to rounded curve 36. Top webbings 45T pass through these curved apertures 41 before reconnecting to shoulder straps 2L, 2R, or to a Y-shaped brace region of rear body panel 8 adjacent the harness wearer's upper back-lower neck regions. These top webbings 45T are necessary for keeping a worn harness from tilting too far backwards.

As shown, rack 21 includes two other slotted apertures 42, 42L midway between and outside both intermediate apertures 38a and b. The relative lengths and depths of these apertures 42, 42L are best seen in cross-section at FIGS. 6C and D. One segment of webbing passes through left slotted aperture 42L. That segment should be made from Kevlar®, or another friction-inducing material, and contain a brake grommet 43 for serving as the harness' primary brake pin strap 44 (described in more detail below). Since this rack design requires no additional friction-inducing components, the side connector strap 45S that passes through the other side slotted aperture 42 can be made from standard one inch wide nylon webbing just like both top connector straps 45T.

FIG. 6E shows an alternate embodiment of rack 121 having a rounded curve 136, upper aperture 137, two intermediate apertures 138a and b, and a lowest most aperture 139 before terminating at base curve 140. In this easier-to-cast design, rack 121 does not have curved mounting or slotted apertures, i.e. equivalents to elements 41, 42 and 42L in rack 21 above. But alternate rack 121 will need a more thorough wrapping through and about the inner sidewall edges E with Kevlar® webbing 145T-K, 145S-K for imparting frictional force to the rope (shown elsewhere) when deploying through same.

Figure 7A:
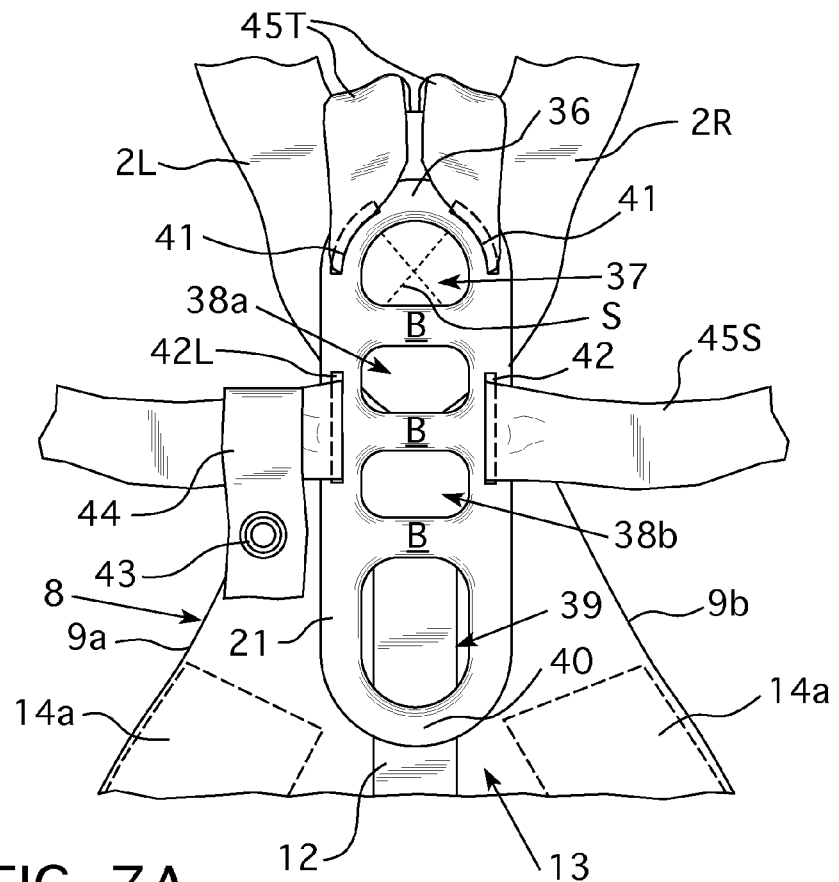
FIG. 7A is a top plan view of the rack from FIGS. 6A-D with Kevlar® webbing wrapped through its lowest most aperture before fastening to the triangular panel legs, additional webbing that need not be Kevlar-containing wraps in the upper curved and intermediate side apertures to further secure the rack to the harness.
Figure 7B:
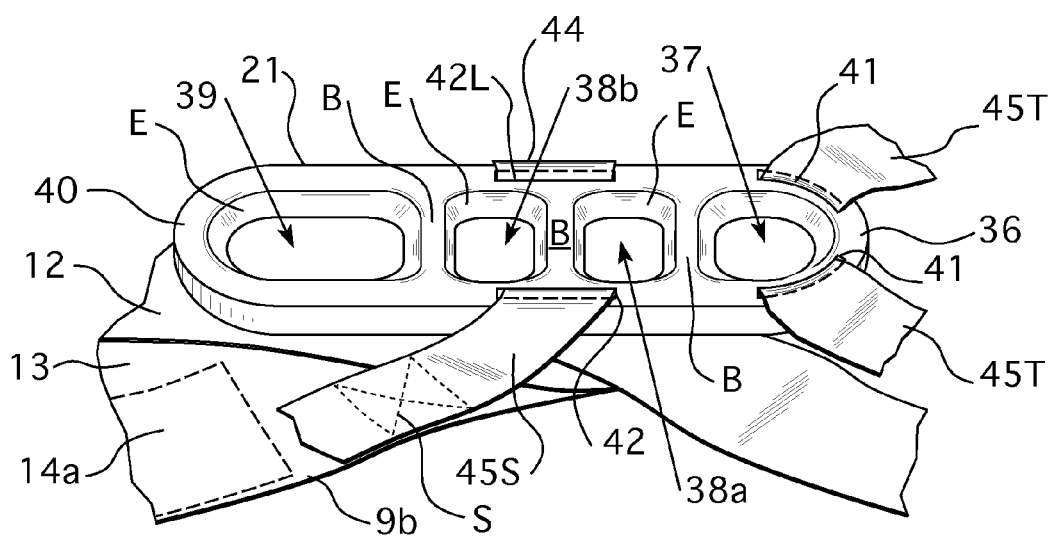
FIG. 7B is a tilted side perspective view of the rack from FIG. 7A after webbing is threaded through an intermediate side aperture for fastening to a triangular panel leg.

FIGS. 7A and B show the mounting of CDS rack 21, in mid-assembly, from two perspectives, before main attachment strap (shown elsewhere as element 45M) is passed through lowest aperture 39 and reconnected to spine brace 12. Once more, Kevlar® brake pin strap 44 is shown being threaded through left side aperture 42L before a primary pull pin is affixed through grommet 43 at the lower end of brake pin strap 44. Additional strips of webbing 45S, 45T pass through curved mounting apertures 41 and other side aperture 42 for further securing rack 21 to rear body panel 8. Additional strips, 45S and 45T, need not include separate Kevlar® coating components, however.

Figure 7C:
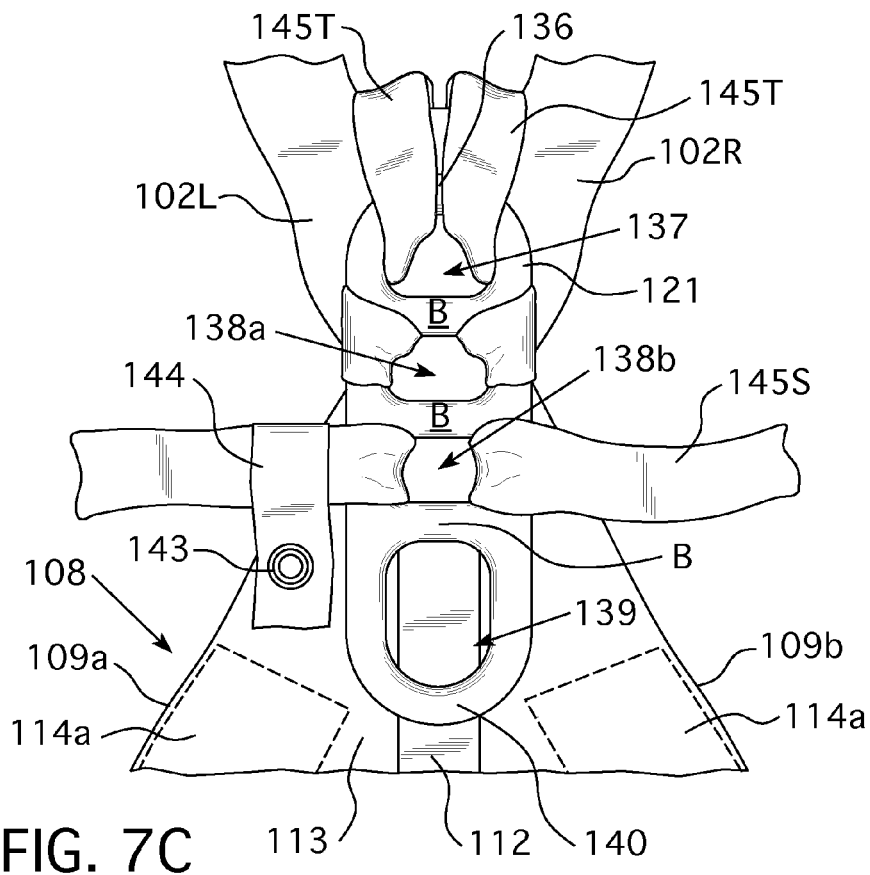
FIG. 7C is a top plan view of the alternate rack from FIG. 6E with Kevlar® webbing wrapped through its lower intermediate aperture before fastening to the triangular panel legs and additional Kevlar® webbing wrapped about the upper two rack apertures as well.
Figure 7D:
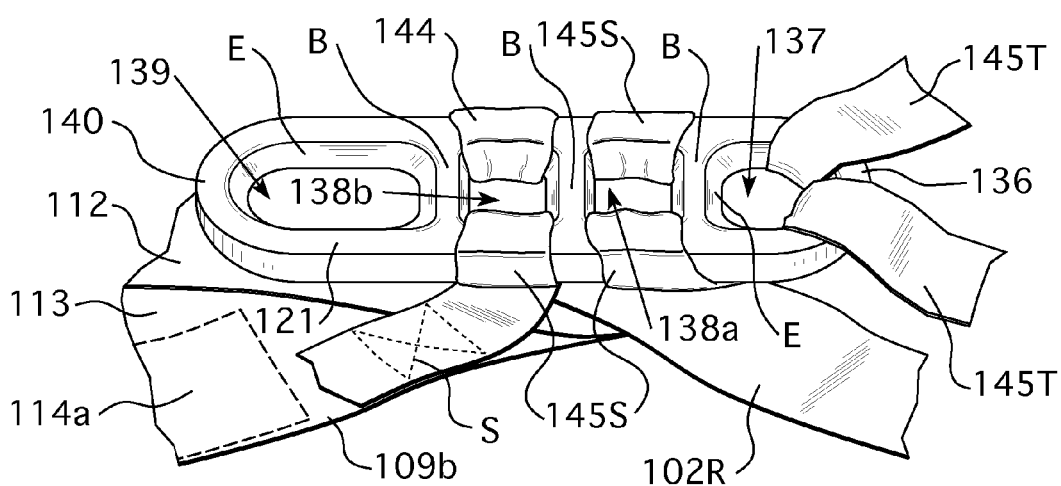
FIG. 7D is a slightly tilted, side perspective view of the rack from FIG. 7C.

FIGS. 7C and D show the mounting of alternate CDS rack 121 from FIG. 6E. Therein, one elongate section of Kevlar® webbing or tape 145T is threaded from the left edge of upper aperture 137 before being wrapped around about the left edge of intermediate aperture 138a. A second, separate section of webbing 145T is threaded from the right side edge of upper aperture 137 and then about the right side edge of the intermediate aperture 138a there below. Another section of Kevlar® webbing 145S-K secures to the right side of second intermediate aperture 138b while a third section, wrapped around the left edge of second intermediate aperture 138b serves as the brake pin strap 144 for this alternate rack design.

For either rack design, the primary means for attaching rack 21 (or 121) to the spine brace 12 (or 112) uses a main attachment strap 45M that passes through the lowest most rack aperture 39 (or 139) before being folded back onto itself and firmly affixed to the spine brace. FIGS. 7E and F show this attachment from a top (FIG. 7E) and right side (FIG. 7F) perspective.

FIG. 8A focuses on the main attachment strap 45M, spine brace 12 and a preferred burn barrier strap 45BB sewn down the middle of main attachment strap 45M. As shown, burn barrier strap 45BB consists of a 6 inch long strip of Kevlar® webbing. It is meant to stop rope 22 from burning main attachment strap 45M as that rope would deploy from this harness in an emergency. As the main brake handle strap 18H is pulled, the KLFS component 18-3 would tighten on rope 22 and pull that rope down and partially into lowest aperture 39 of rack 21. In doing so, rope 22 would be shoved against main attachment strap 45M whose uppermost end is noticeably looped through and around the bottom rack aperture before being folded back onto, and at least partially beneath itself as indicated by the fold curves FC for both main attachment strap 45M and burn barrier strap 45BB.

FIG. 8A also shows brake limiter 46 situated as a connecting strap over both ends of a lower end of KLFB strap 18-3 and secondary brake strap 18-2 after the former is twisted around rope 22, but before that rope 22 and KLFB strap 18-3 are passed over (but not fully through) lowest aperture 39. Limiter 46 limits the amount of untwisting or relaxing by KLFB strap 18-3 on the rope 22 intertwined therewith. An extended width of Kevlar webbing 18-3K is used to partially overlap said KLFB strap to some degree. So that full and complete relaxation of KLFB strap 18-3 never happens, there is always some tightness asserted on rope 22 by KLFB strap 18-3. This is meant as a safety backup so that if a wearer were to completely release slack on the braking mechanisms of harness 1, perhaps by letting go of BHS 18H in a panic, or for medical reasons, rope 22 would still be at least a little constrained. This also helps prevent too rapid of a descent by the wearer.

The purposeful twisting of KLFB strap 18-3 around rope 22 also produces a sufficient amount of counter-clockwise rotational force or torque as rope 22 deploys. That counter-clockwise rotation is offset by an opposite, or clockwise directional torque from the rack 21 before rope 22 exits the uppermost gap G to rear body panel 8. With these clockwise and counterclockwise forces essentially canceling each other, the deploying rope 22 does NOT unduly twist, knot or otherwise clog up while unspooling through the various contours of components for harness 1.

Figure 8C:
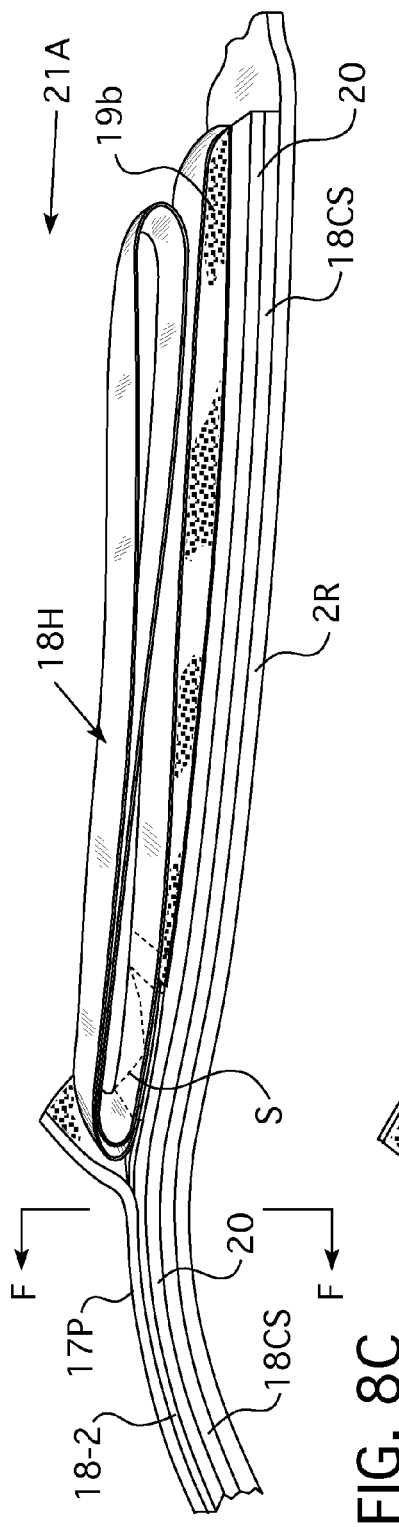
FIG. 8C is a left side view showing the secondary brake strap folded onto itself for more compact storage in a covered compartment on one of said shoulder straps.
Figure 8D:
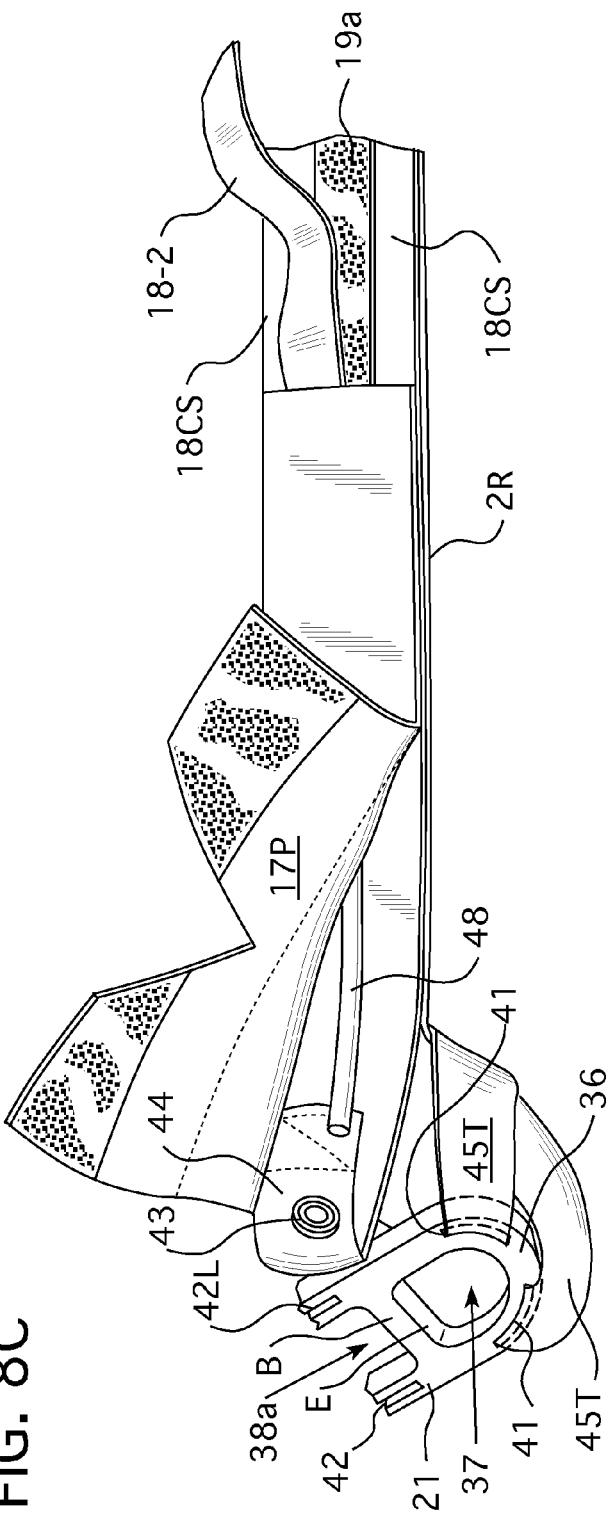
FIG. 8D is a top perspective sectional view showing the secondary brake with a pin strap cover partially removed to expose one end of pull pin there under.
Figure 8E:
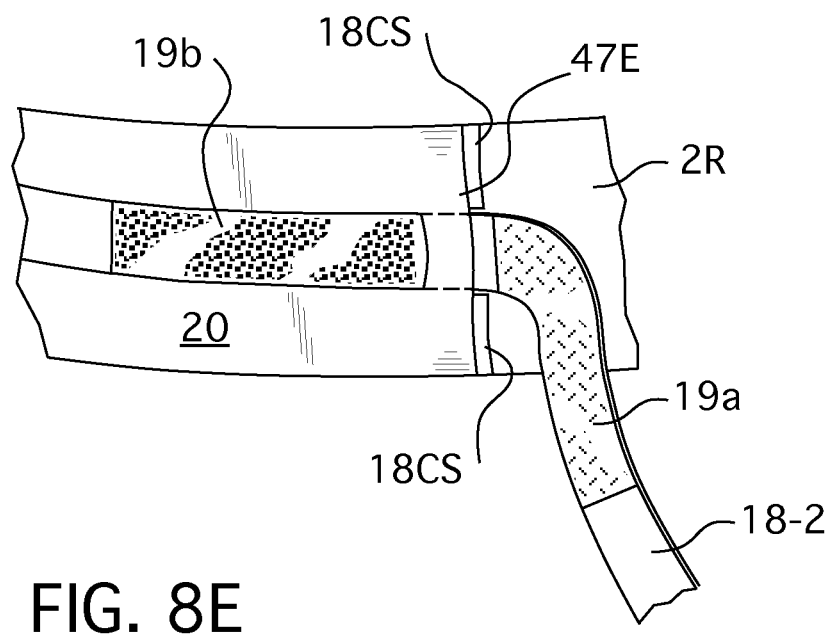
FIG. 8E is a close up, top view of the circled region from FIG. 8B.
Figure 8F:
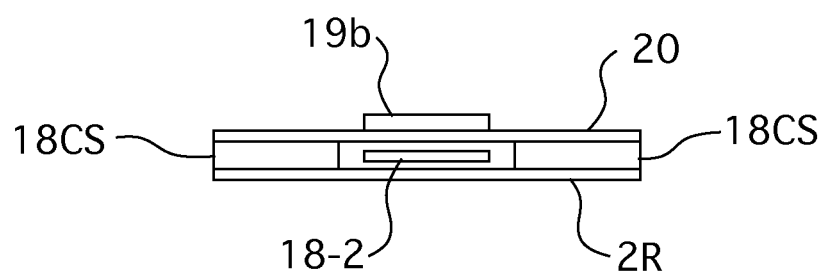
FIG. 8F is a front, sectional view taken along lines F-F of FIG. 8C.

FIGS. 8B and C show how the upper end of BHS 18H may be folded onto itself with corresponding sections of Velcro® tape, 19a and b, for more compact storage under cover 17H over compartment 16 of shoulder strap 2R when not needed. An arrow 21A shows the general direction in which the CDS rack 21 would be mounted with main attachment strap 45M to this harness assembly. Where BHS 18H transitions to become the Secondary Brake Strap (SBS) 18-2, it first passes under a forward folded end 47E of brake plate 20 as it enters a tunnel-like structure formed by a tunnel floor (shoulder strap 2R), two tunnel sidewalls made from a pair of spacer-like clearance strips 18CS, and the tunnel roof (brake plate 20). Other sectional views of that tunnel are shown in FIGS. 8E and F. FIG. 8E is an enlarged view of the circular region from FIG. 8B and FIG. 8F a side sectional view of several brake components as would be seen from lines F-F in FIG. 8C. The structure itself is designed to protect SBS 18-2 while still allowing for free lateral movement there under. The folded, front end 47E is purposefully added so that no sections of Velcro tape 19b on SBS 18-2 inadvertently hang up on, or otherwise stick to, the tunnel during SBS handle usage and eventual rope deployment with this harness.

As shown, these secondary braking mechanism components advance beneath the tunnel roof, namely brake plate 20, between clearance strips 18CS and atop shoulder strap 2R before exiting said tunnel at an area beneath CDS rack 21. These clearance strips 18CS can be made from Krylon® plastic as the latter material remains pliable in cold weather temperatures. Alternately, the braking mechanism spacer/spacing may be achieved by inserted a folded section of 1 inch wide nylon webbing at opposite edges for creating the aforementioned tunnel.

After exiting the braking mechanism tunnel area, the braking strap becomes the KLFB strap 18-3 that attaches with limiter 46 to the main attachment strap 45M. Elsewhere, a lower end of SBS 18-2 folds back onto itself to form the Brake Handle Strap 18H before transitioning into Primary Brake Pin Strap (PBPS) 18-4. That PBPS 18-4 then travels back on top of brake plate 20 to the primary pull pin 48 for the latter to extend through PBPS 18-4. This sub-assembly may be further protected by a separate Velcro® pin cover 17P. As seen in FIG. 8D, pin cover 17P is notched for better securing under the CDS rack 21 and around and under the shoulder strap 2R with its tunnel-like structure within.

Figure 9A:
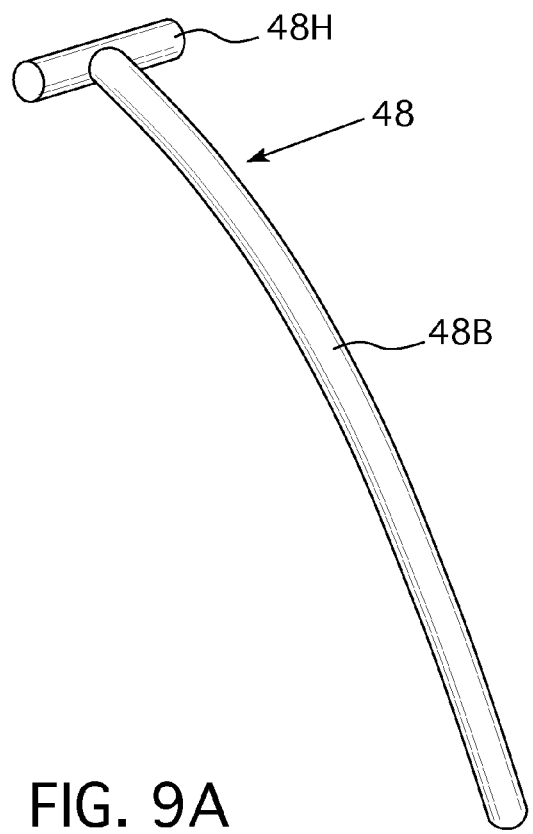
FIG. 9A is a top perspective view of one embodiment of pull pin with an eyehook end for connecting to its secondary brake strap.
Figure 9B:
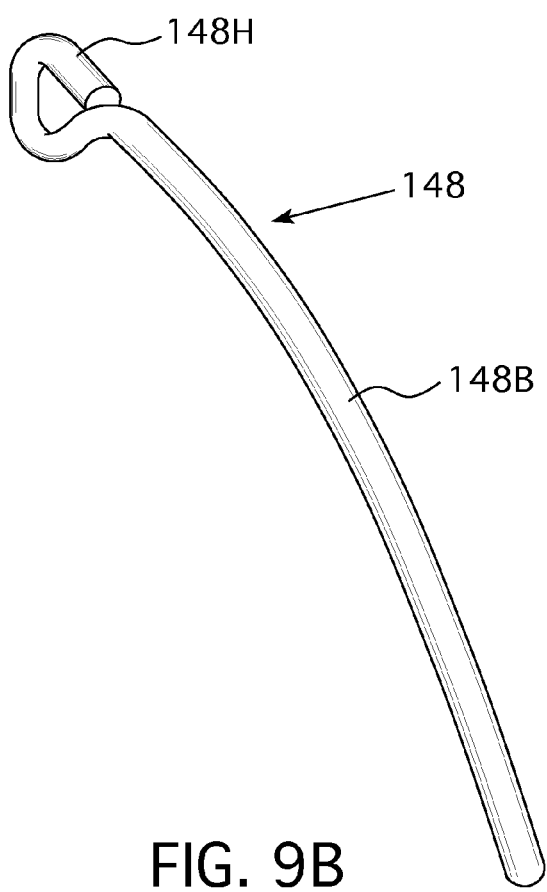
FIG. 9B is a top perspective view of an alternate embodiment of pull pin for the secondary brake strap.

Also in FIG. 8D, the upper head 48H of pull pin 48 can be secured to PBPS 18-4 by one or more means. FIGS. 9A and B show two representative primary brake pin approaches. Particularly, pull pin 48 of FIG. 9A includes a T-shaped, upper head 48H for passing through a plate, grommet or secured aperture on PBPS 18-4. Alternately, T-shaped head 48H may be riveted, or possibly spot welded, to a metal plate connection on PBPS 18-4. FIG. 9B shows an alternate pin 148 with eyehook head 148H. For relative sizing and material matters, these pull pins are preferably made from ¼ inch diameter stainless steel and extend about 5½ inches in total length. They have a slight curve or bow to main body 48B/148B for facilitating sliding of the pin when the brake handle strap 18H is pulled on during an emergency deployment.

As a further safety, the harness of this invention requires its wearer to purposefully, (i.e., intentionally) bounce some while dangling after their fall arrest, usually up and down though also from side-to-side to a degree. Such bouncing lets the wearer control the start of his/her descent after he/she first extracts pull pin 48 from grommet 43. A bouncing start requirement also precludes the harness wearer from being shocked by an unexpected and sudden drop, or rapid descent, after pin extraction.

Figure 10B:
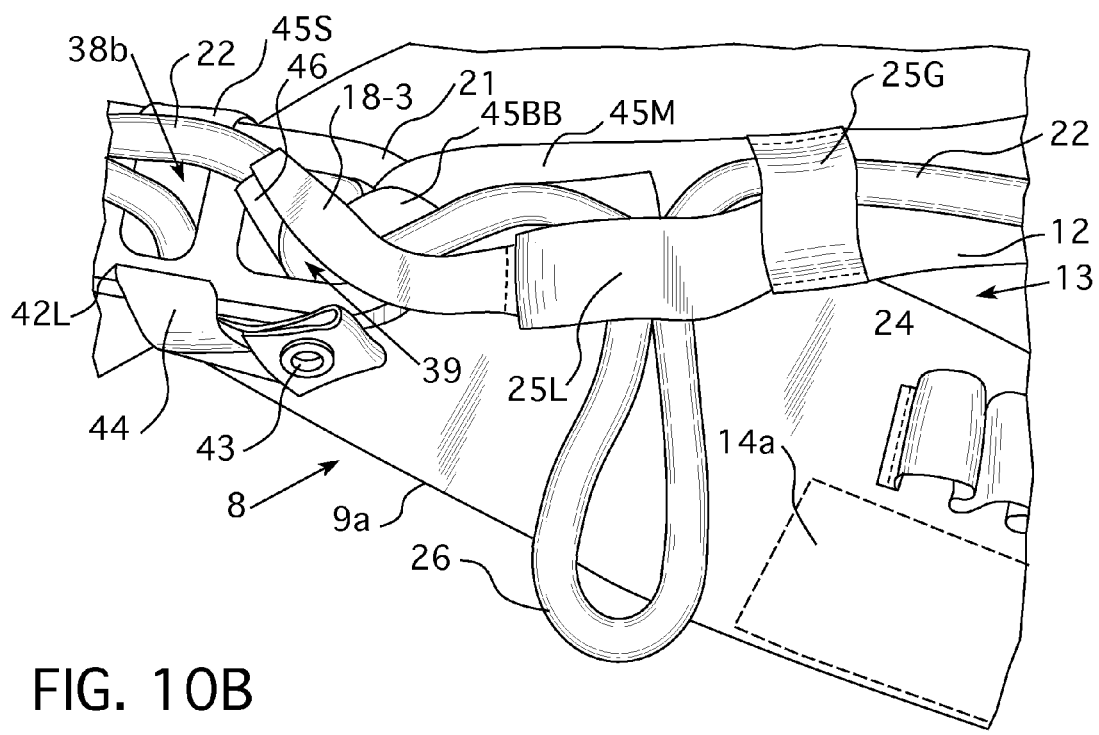
FIG. 10B is a top perspective sectional view showing the nylon rope beneath the spine brace rope guide after being looped in the offset rope loop guide from FIG. 10A.
Figure 11A:
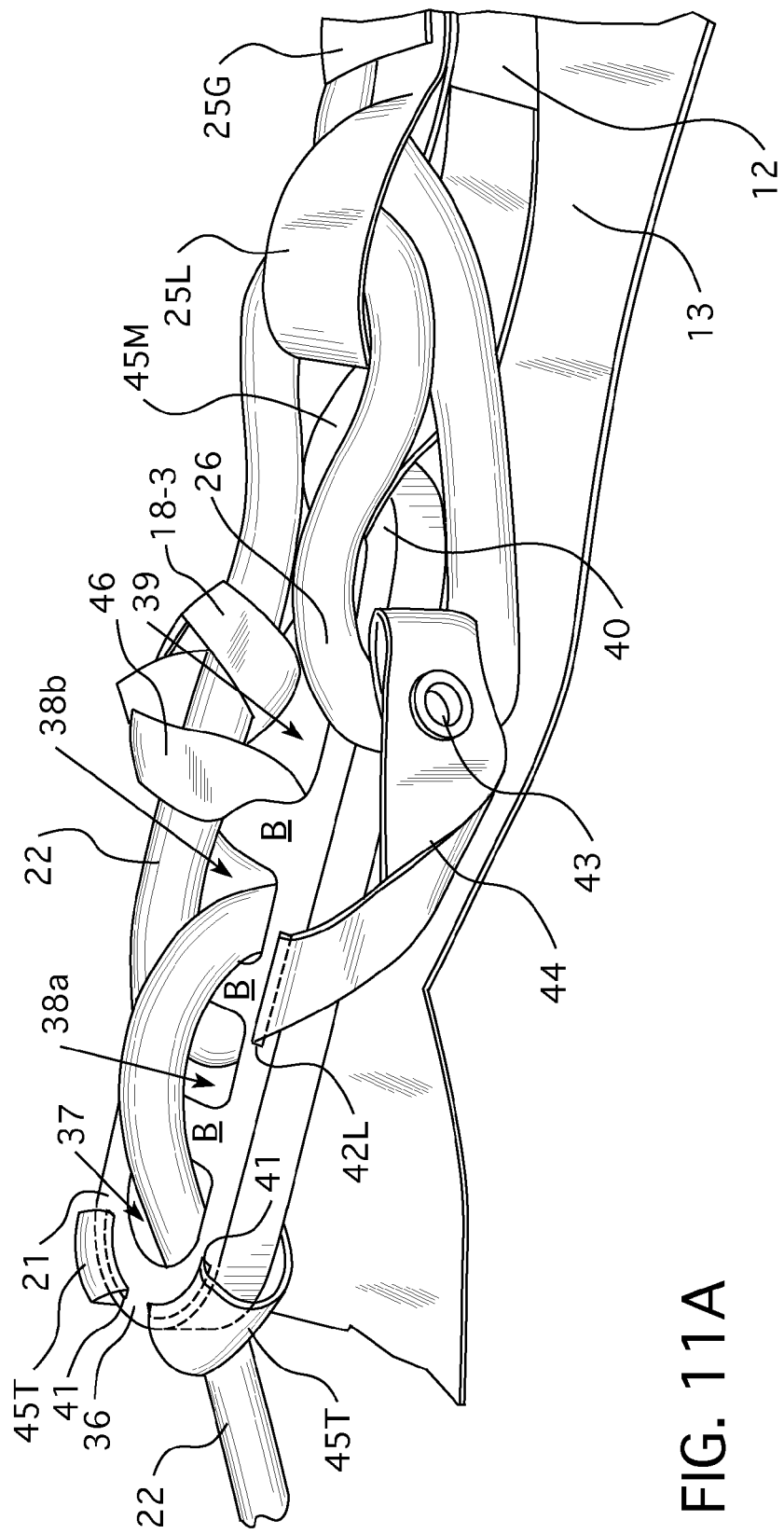
FIG. 11A is a left side perspective view showing the nylon rope in its offset rope loop guide and the secondary brake strap wrapped about before a pull pin is inserted into its primary pin grommet, said rope threading continuing outside a lowermost aperture of the rack; then into the rack's second aperture, out the third rack aperture and back up, into and through the rack's uppermost aperture.
Figure 11B:
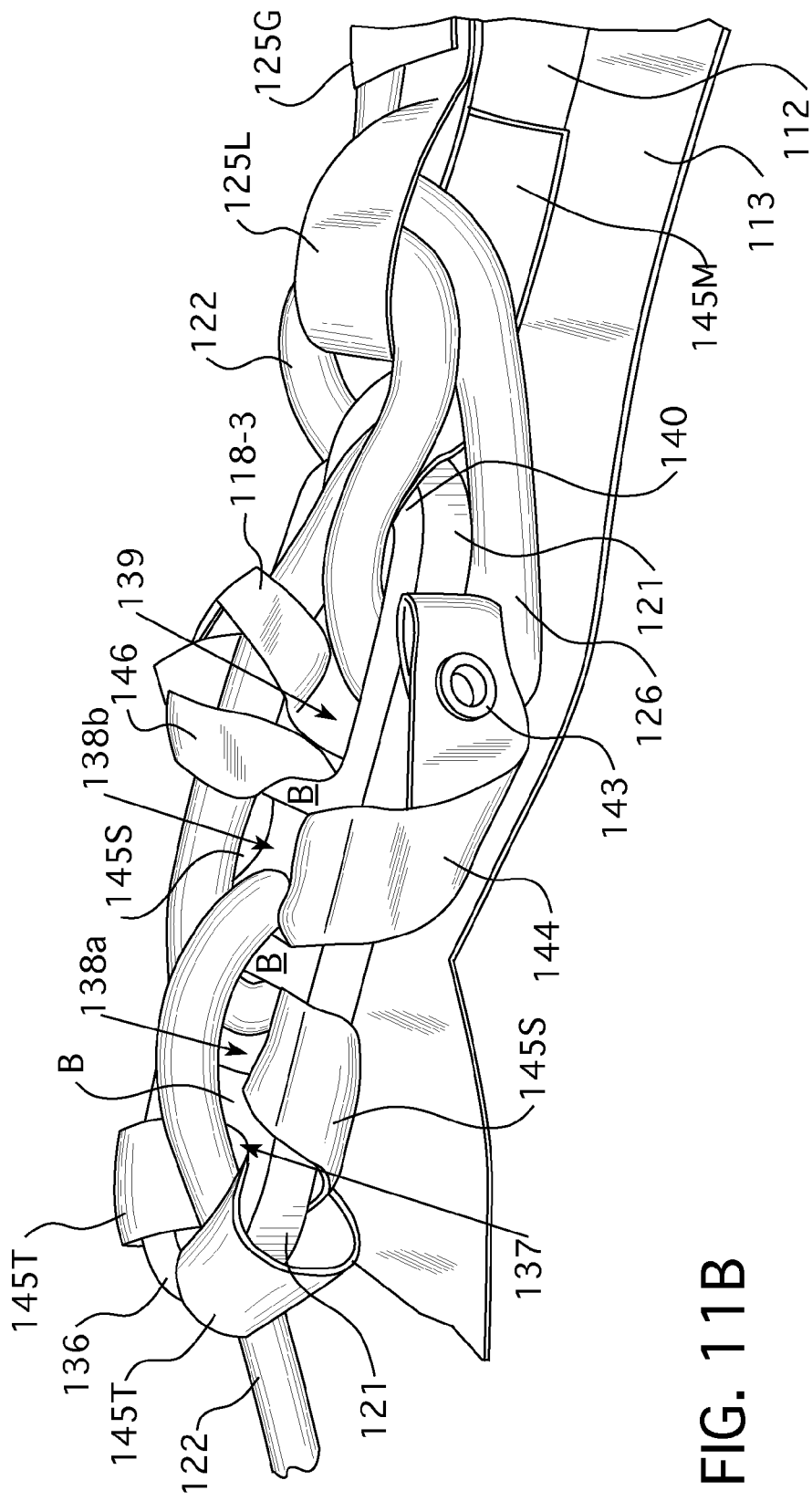
FIG. 11B is a left side perspective view showing the same rope threading from FIG. 11A but with an alternate rack embodiment, said alternate rack requiring additional Kevlar® wrapping about the rack's first, second and third apertures.
Figure 12A:
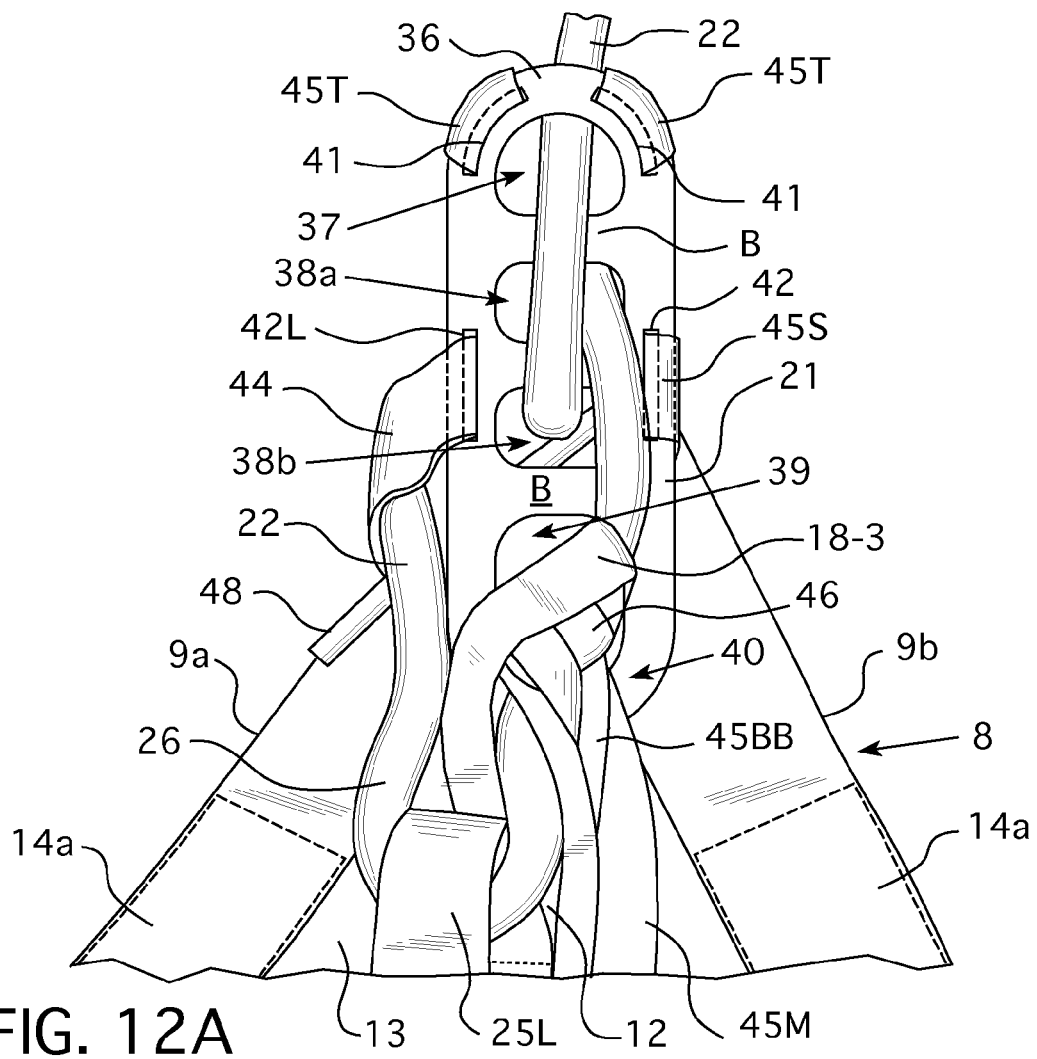
FIG. 12A is a top plan view of the rack with the nylon rope fully threaded through and the primary pull pin duly positioned there beneath.
Figure 12B:
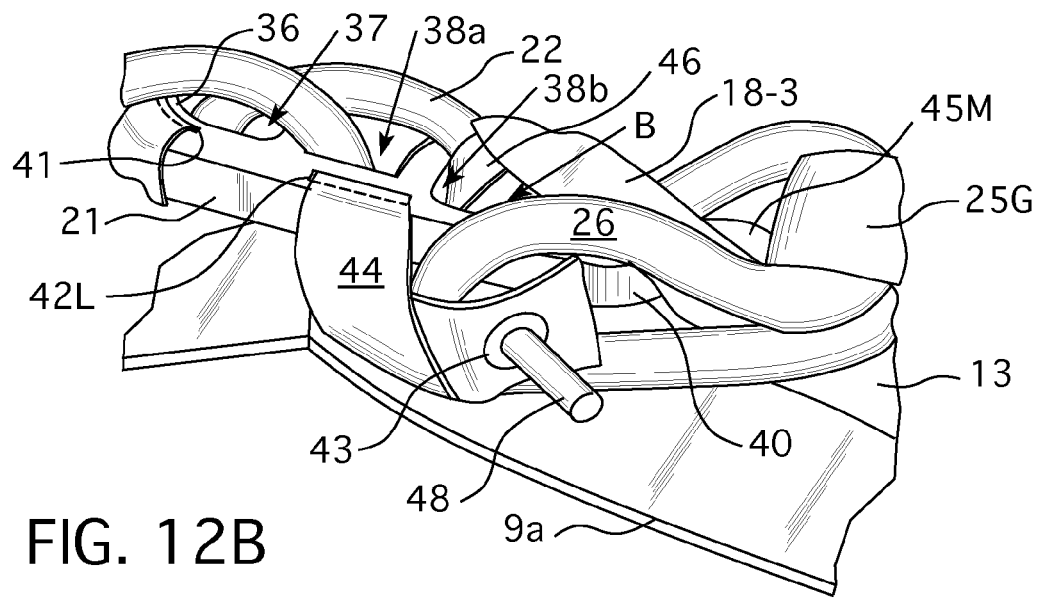
FIG. 12B is a left lower perspective view of the rack, rope and pin from FIG. 12A focusing on the looped rope, pin and grommet.
Figure 12C:
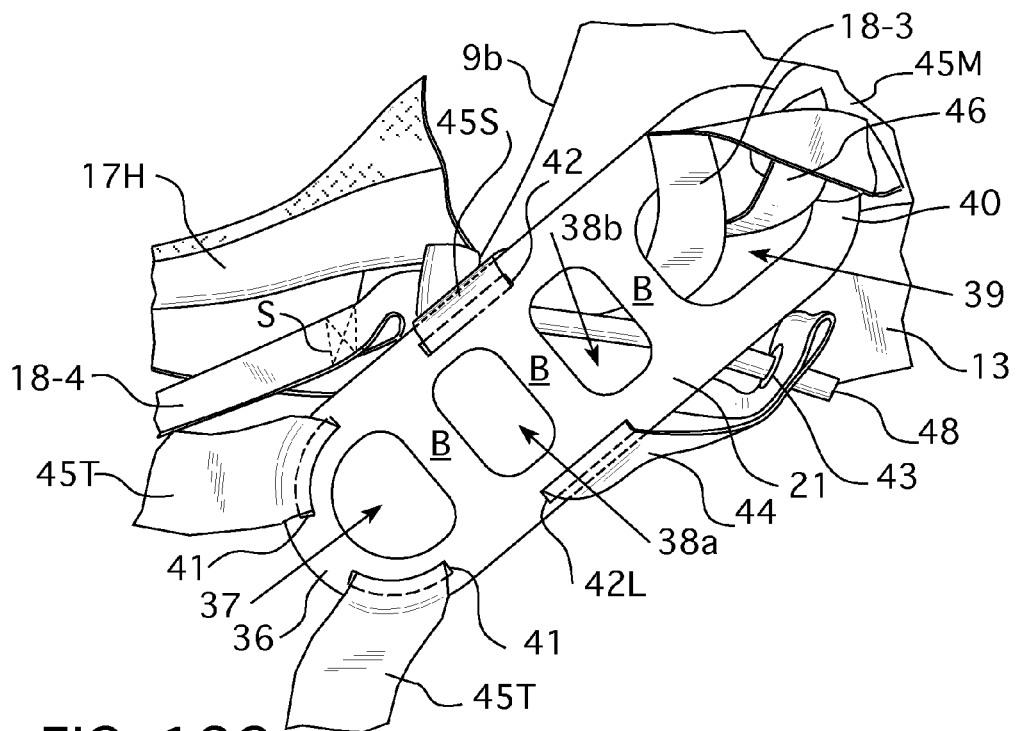
FIG. 12C is an alternate, angled perspective view of the rack and pin from FIG. 12A with the rope removed for better viewing.
Figure 12D:
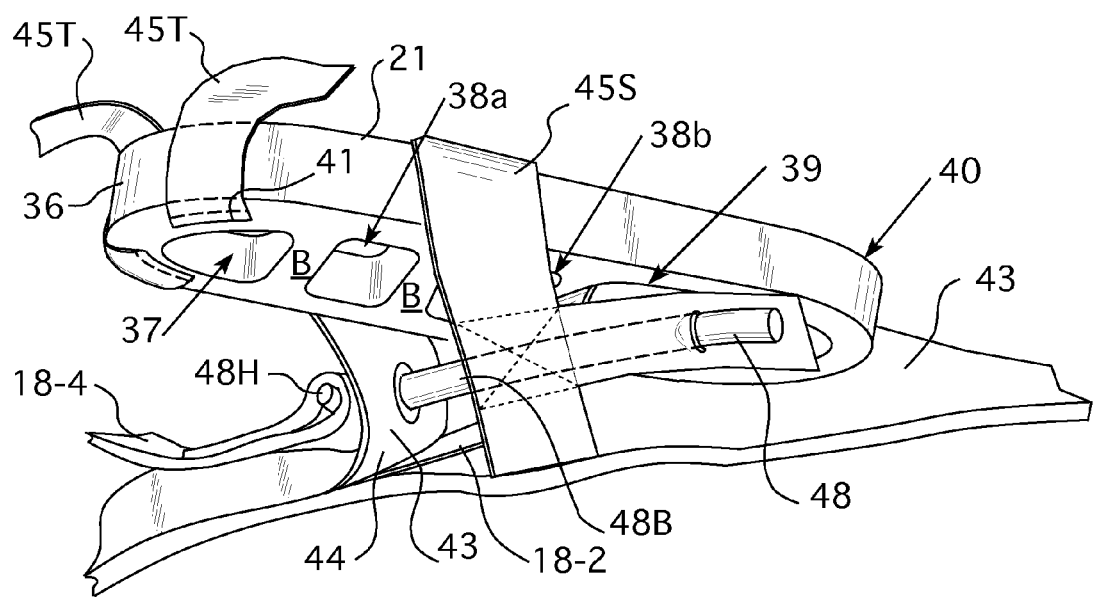
FIG. 12D is a lower left side perspective view of the rack and pin from FIGS. 12A and B, again with the rope removed.
Figure 13A:
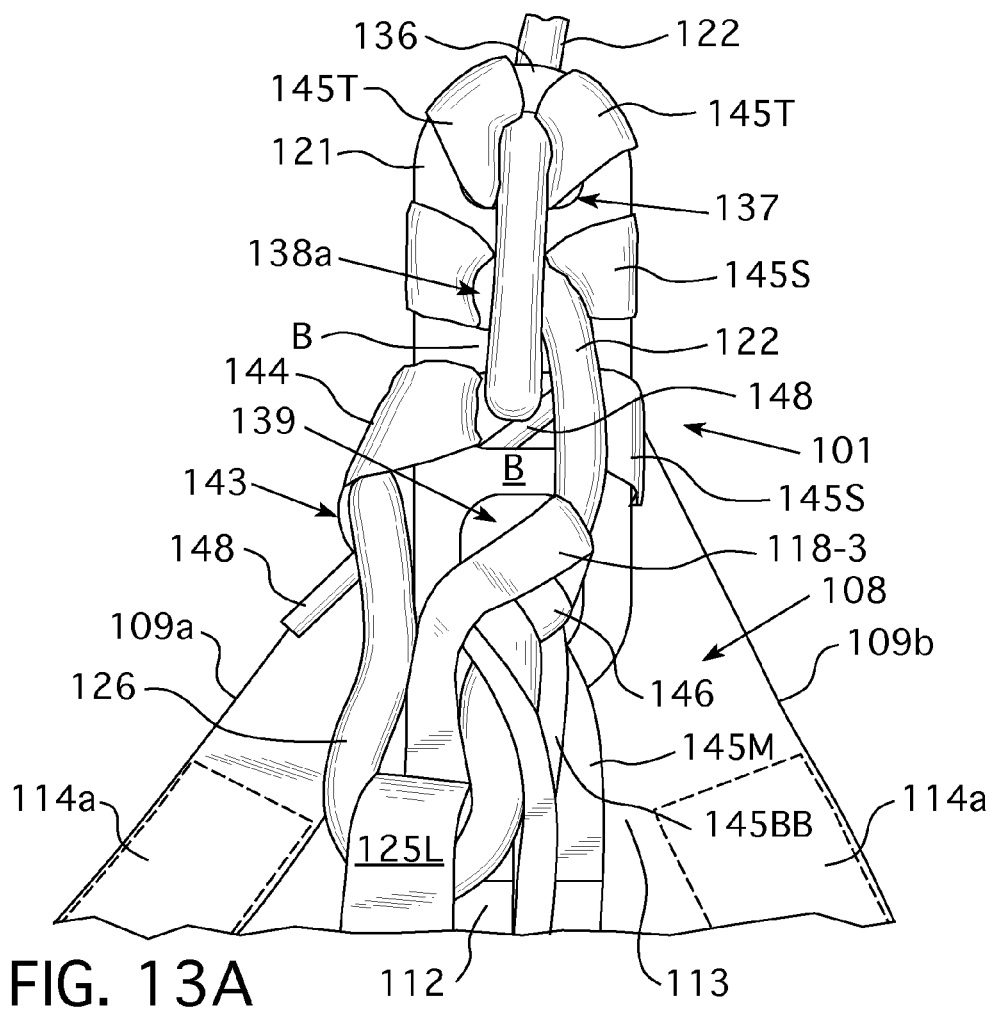
FIG. 13A is a top plan view of an alternate rack with the nylon rope fully threaded through and the primary pull pin duly positioned there beneath.
Figure 13B:
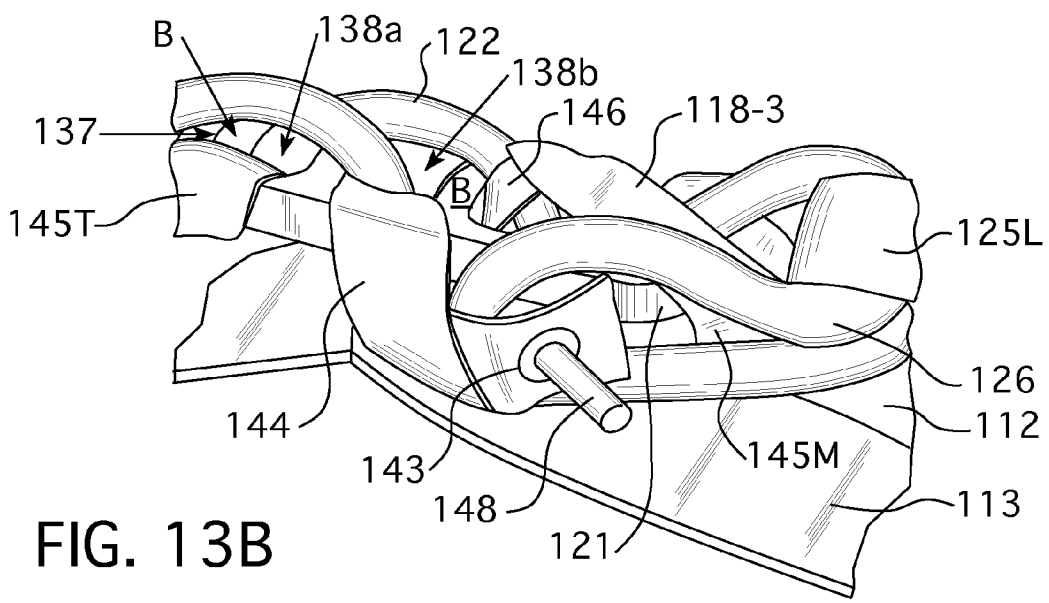
FIG. 13B is a left lower perspective view of the alternate rack, rope and pin from FIG. 13A focusing on the looped rope, pin and grommet.
Figure 13C:
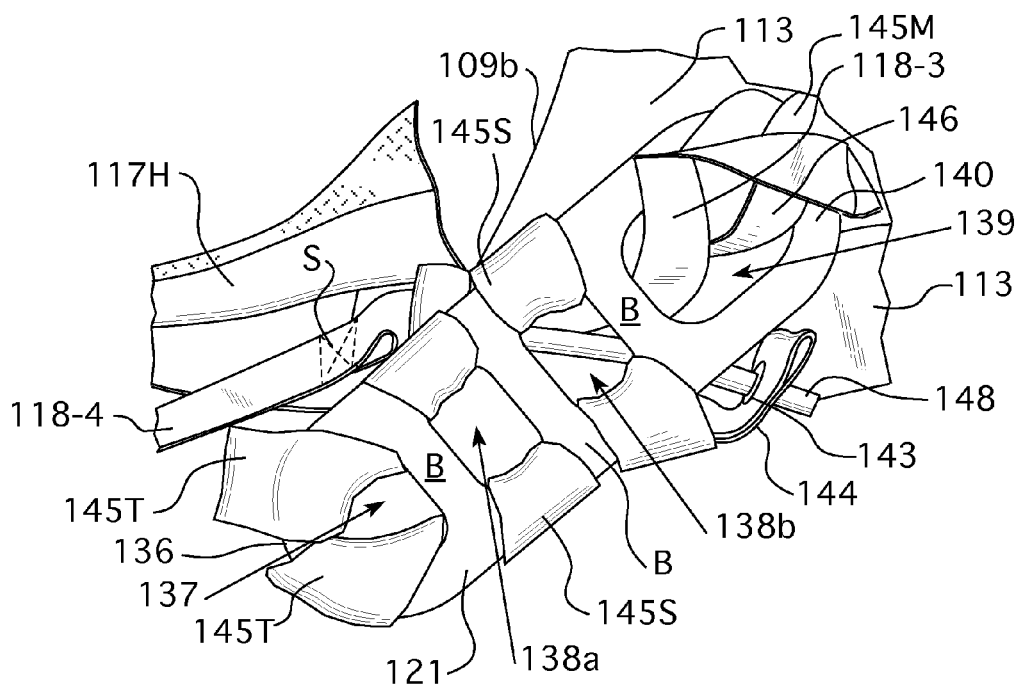
FIG. 13C is an alternate, angled perspective view of the alternate rack and pin from FIG. 13A with the rope removed for better viewing.
Figure 13D:
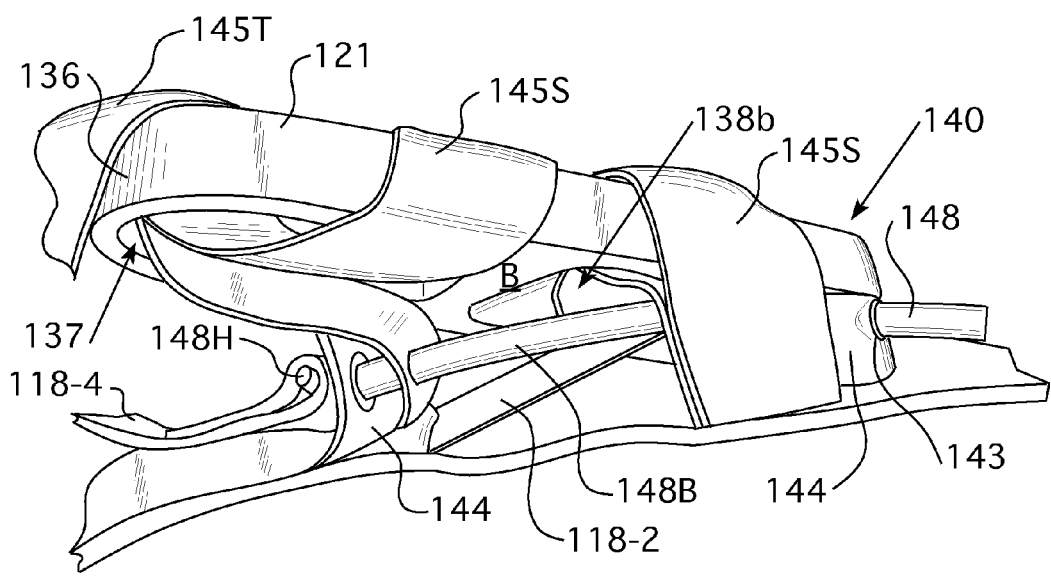
FIG. 13D is a lower left side perspective view of the alternate rack and pin from FIGS. 13A and B, again with the rope removed.

FIGS. 10A and B show in more detail the offset rope loop guide 25L attached to the left edge of spine brace 12 with its overlapping rope guide 25G. Also visible therein are a plurality of elastic loop fasteners 24 joined in a spaced relationship along triangular legs 9a and 9b. The twist from SBS 18-2 of BHS 18H is situated above rope loop guide 25L with the rope removed from FIG. 10A for greater visibility of underlying components. In FIG. 10B, rope 22 is extended through rope guide 25G, then through rope loop guide 25L, then folded back onto itself and made into hairpin loop 26. The remainder of nylon rope 22 then passes into and through rack 21 in a preferred pattern/path described below. Once the initial hairpin loop 26 is formed, it is flipped upwards and a pull pin 48 inserted through same and eventually into designated brake grommet 43.

In FIGS. 11A and 12A through D, there is shown a preferred method for threading rope 22 through CDS rack 21 and the remainder of upper harness "hardware". Starting at the right side of FIG. 11A, rope 22 is bent into a hairpin loop 26 before primary pull pin (not shown) would be inserted through grommet 43 on pin strap 44. With SBS 18-2 duly twisted around rope 22, both elements are passed over lowest most rack aperture 39. In actuality, a bend in rope 22 is pulled into lowest aperture 39 with the tightening of SBS 18-2. But rope 22 re-emerges (i.e., comes right back out) with slack given to the uppermost end of BHS 18H, said slack extending through SBS 18-2, and eventually to KLFB strap 18-3.

Then while passing over the exterior of rack 21, threaded rope 22 skips over second intermediate aperture 38b and into and through first intermediate aperture 38a. When looped about the bridge B between first and second intermediate apertures 38a and b, rope 22 proceeds outwardly, from behind the rack 21, passing through second intermediate aperture 38b, then upwardly skipping over the previously entered, first intermediate aperture 38a. Rope 22 then proceeds through upper aperture 37 and out past the underside of upper curve 36. FIGS. 12A through D show the same purposeful directional threading for affecting proper torque cancellation with this rack 21 and SBS 18-2 combination.

It should be noted that KLFB strap 18-3, near an end of BHS 18H, is purposefully situated closest to where rope 22 enters the CDS rack 21 since that is where the amount of force required to stop the pay-out of rope under a load is far less than would be required to stop a rope payout further "upstream". In theory, the point of least force, and hence the greatest frictional force exertion on rope 22 by KLFB strap 18-3 occurs approximately at the location of lowermost aperture 39 of rack 21.

FIGS. 11B and 13A through D depict the same preferred threading pattern of rope 122 through the alternate configuration of rack 121 with all parts correspondingly numbered in the next hundred series. FIG. 14 is a top view closeup (for either rack design) showing the rope 22 at the initial stages of interweaving between elastic loop fasteners 24, from the top to bottom of rear body panel 8.

In normal operation, the wearer of harness 1 would first peel back cover 17H in his/her right shoulder strap 2R after their fall has been arrested and it is determined that a full self-recovery is not possible. Removal of that cover 17H exposes the BHS 18H within harness compartment 16. While firmly holding BHS 18H, the wearer pulls primary pin 48. Then, by releasing slightly on the slack on BHS 18H, the wearer lets rope 22 gradually begin to pay out into and then through rack 21 resulting in the wearer's slow and controlled descent to safety.

FIGS. 15A through 16C focus on the reserve suspension relief strap (or RSRS) 27 folded back and forth onto itself (FIG. 15A) before being held in place, beneath a plurality of cross-straps 28 on triangular base 10 of rear body panel 8. At least one end 44 of this RSRS 27 is permanently secured either to triangular base 10, the underlying structure of waist belt 3, or both. In the accompanying FIGURES, the right side of will be extracted through slit 29 in outer cover 15 before the fully freed end of that RSRS 27 is affixed to the opposite lower loop 31L to harness 1 (FIG. 15B). It is to be understood that the reverse configuration can be conceived and mostly arranged by making and assembling mirror images of the preceding components.

Figure 15E:
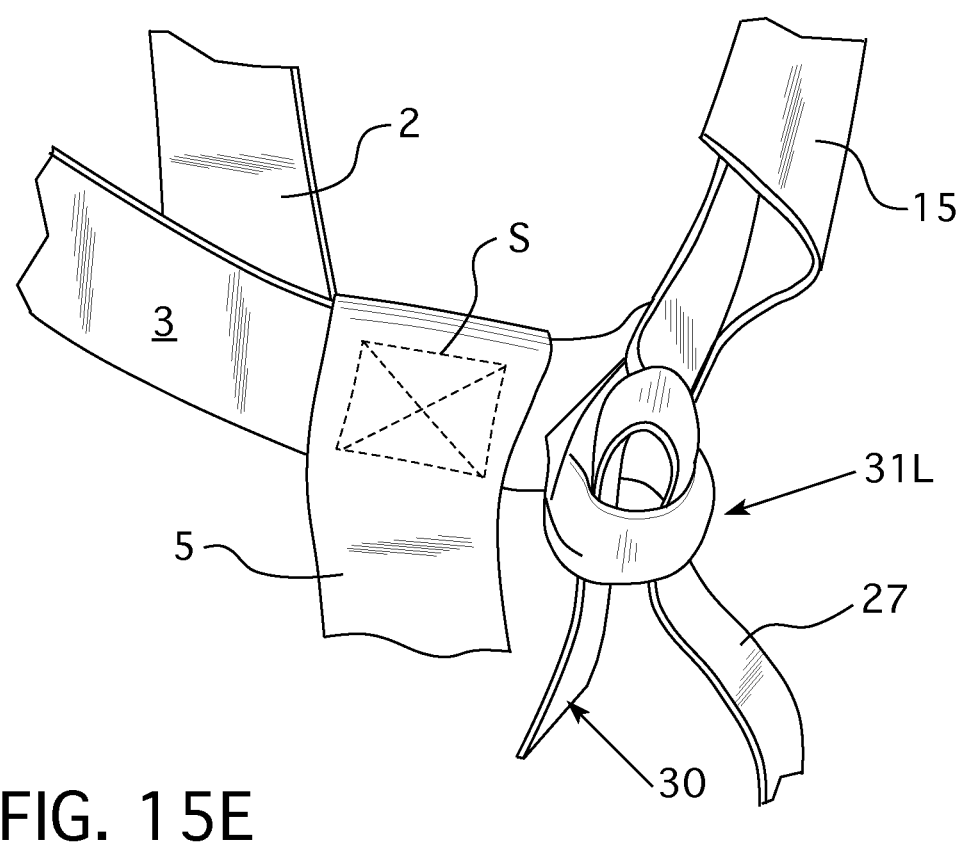
FIG. 15E is a right side close up showing the reserve suspension relief strap connected to a left waist loop at the opposite end of deployment on the front of the harness wearer.

Should the CDS harness suffer a complete breakdown, this invention already includes the type of backup that may soon be federally mandated for most hunter safety equipment. The general arrangement for RSRS 27 should enable an individual who, after a fall arrest and complete controlled descent system failure, revert to this integral back up means for periodically shifting weight from his/her legs by sitting or standing on the strap extracted from harness 1. In that rare instance, the harness wearer would reach down to the right lower base of outer cover 15 for pulling more and more of the RSRS 27 out through slot 29 from its enclosed holding area (See especially, FIGS. 15C and D). Once fully extracted, the freed end to RSRS 27 can be tied off by the wearer to lower loop 31L on waist belt 3, nearer the harness wearer's left hip (FIG. 15E). The resulting arrangement would create the swing 49 (FIG. 16A) on which the harness wearer may possibly sit for short periods of time and/or alternate resting one foot (FIG. 16B) or both feet (FIG. 16C) thereby lessening the pressures of a prolonged suspension with no leg support after a very short time of which severe harm, even death, may result.

The typical length of rope 22 can be as long as may be contained compactly in the rear body panel 8 of this CDS. But generally, a length of approximately 30' provides sufficient length for most situations when also taking into account the wearer's height. Even if the amount of rope was short by just a few feet, one's safety would still greatly enhanced if he/she were suspended several feet up when the end of rope 22 was reached. In that case, the wearer might consider cutting themselves free from the harness proper and dropping the remaining several feet, as compared to the original predicament of being suspended 30 feet or higher, with no safe, easy way to descend. Alternately, if one needed to get out of a harness while just a few feet above ground, the wearer could fully deploy his/her reserve suspension relief strap RSRS 27, stand on that strap and then unbuckle their waist 3, upper chest 4 and upper thigh straps 5 before climbing fully out of harness 1.

Compactness is an important element if people are to be motivated to actually carry the CDS with them and use it when they go to hunt or work at elevated locations off the ground. A major benefit of this geometry, and other similar geometries shown elsewhere herein, is that the configuration allows for a controlled adjustment of the frictional braking forces to be applied by the harness wearer after his/her fall arrest. This phenomenon results in the novel capability of providing self-compensation for users of different body weights, to provide relatively similar rates of descent for such users within a nominally acceptable range, without resorting to any mechanical, moving parts, adjustment mechanisms, or elaborate assemblies with centrifugal brakes, clutches or the like. The rationale and physics behind this phenomenon arise from the fact that heavier weights tend to generate more frictional drag, which keeps heavy users from descending at excessively fast or dangerous rates, while the body weights of lighter harness users imparts less frictional drag, permitting rope 22 to be withdrawn more easily, thereby keeping the descent rate of light-weight wearers from being too slow.

Figure 17A:
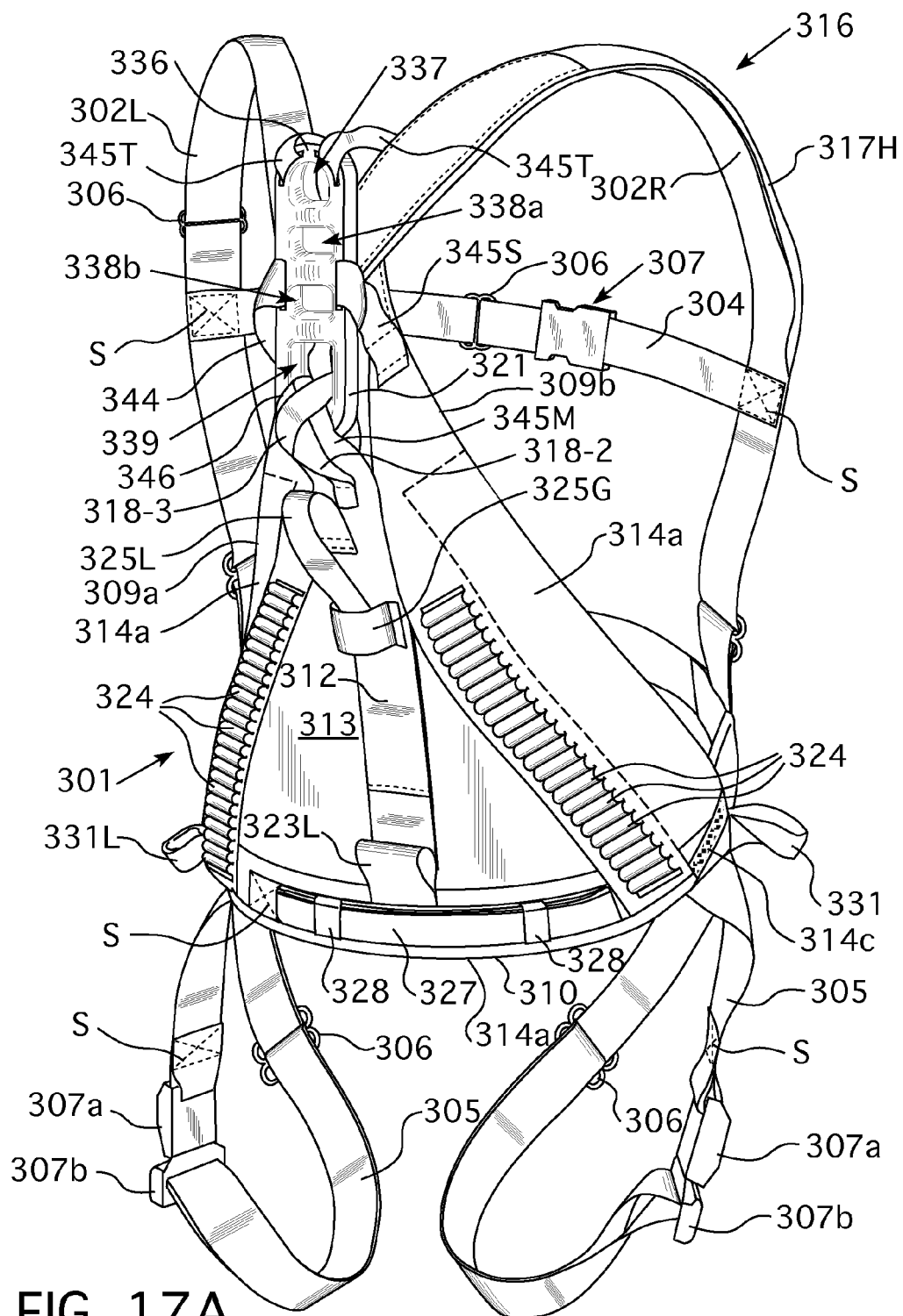
FIG. 17A is a right rear perspective schematic showing the latest improved CDS system with the lighter, interwoven rope of this embodiment removed.

The latest improvement to the original CDS harness above is shown in FIGS. 17A and B. Therein, common elements to the original CDS harness are commonly numbered though in the next hundred series, in this case, the 300 series. Accordingly, these two views show a harness 301 with shoulder straps 302L and R, waist strap 303, chest strap 304 and pair of adjustable upper thigh straps 305. Many of these straps include at least one adjustable slide buckle 306 with matching fastener/connectors 307a and b.

Figure 17B:
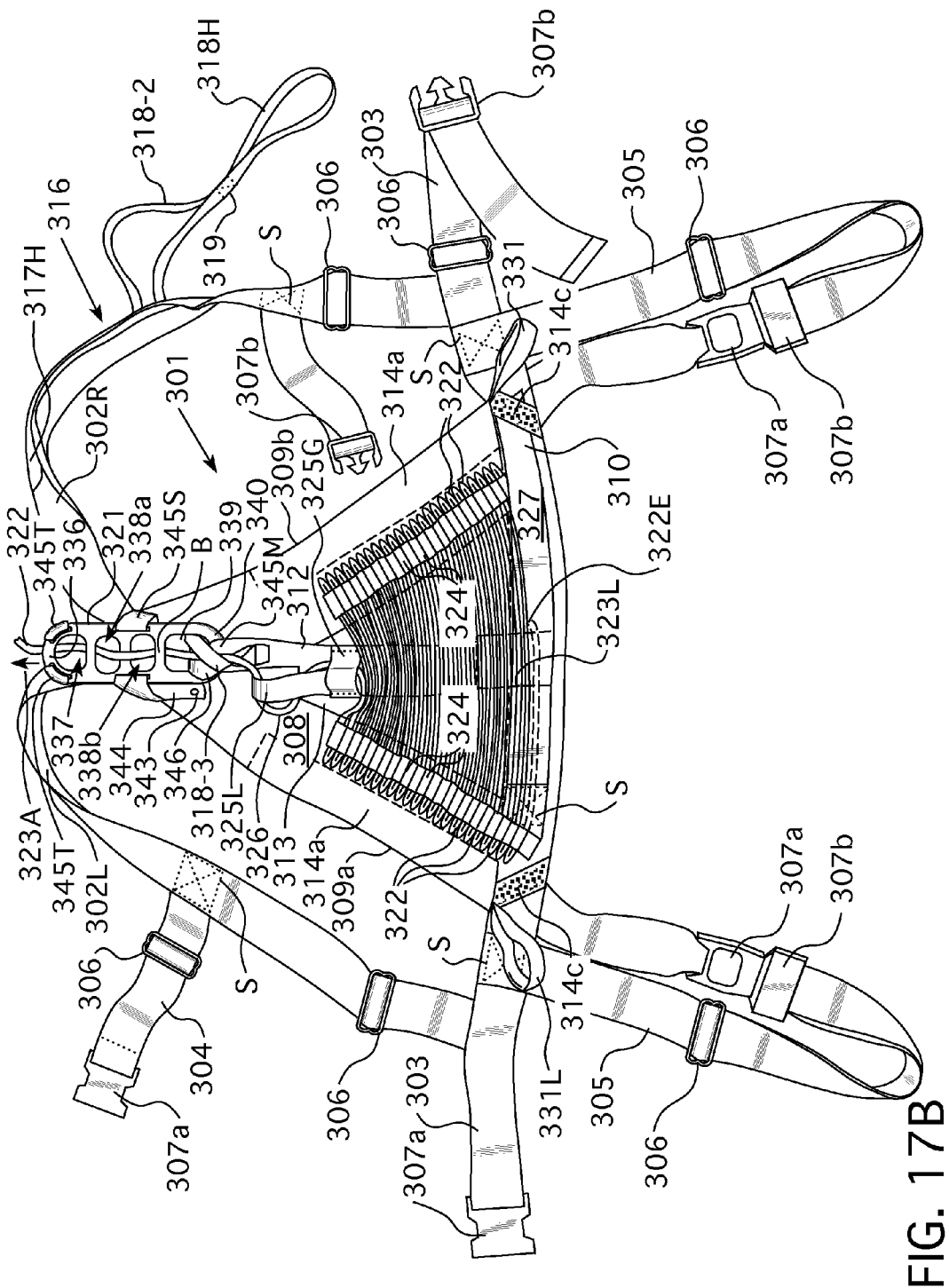
FIG. 17B is a top plan view of the improved CDS harness from FIG. 17A with the lighter, rope interwoven thereon but with the outer cover removed for better visibility.

On the rear body panel 308 of this latest improvement, there are a plurality of elastic loop fasteners 324 extending down and along both triangular legs 309a and b. Because a thinner, narrower rope (element 322 in FIG. 17B) is interwoven on this improvement, there are several more fasteners required in this version versus the earlier, original harness. Particularly, the original harness had less than 15, and preferably about 10-12 loops for holding a standard rope/line for a one panel harness that effects self-recoveries of about 30 feet or less. With the present improvement, however, each triangular leg 309 of this rear panel 308 would include about 20 or more, preferably about 24-28 loops for holding the thinner, composite product line 322 that, once installed between such loops effects one panel self recoveries for about 75 feet or so. Particulars for the one preferred embodiment of line/rope 322 are mentioned above. It should be understood, however, that still other composite lines similar in weight, thickness and overall performance to Technora's Canyon Extreme may be readily substituted therefor.

A triangular base 310 connects both legs at the bottom of rear panel 308, with an RSRS 327 and its securing straps 328 extending therealong. Still other features common to the earlier harness are included in FIGS. 17A and B. They are correspondingly numbered as their earlier counterparts, though.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A wearer controlled descent system having an extended recovery range of up to eighty feet with one internal panel, said controlled descent system comprising a harness having:
   an adjustable belt that is capable of extending around a wearer's upper chest;
   an adjustable waist belt that is capable of extending around a wearer's waist;
   a pair of adjustable straps that are capable of wrapping about a wearer's upper thighs;
   a pair of shoulder straps that are capable of extending from said waist belt over a wearer's shoulders and criss-crossing on a wearer's back, at least one of said shoulder straps having a compartment in which a secondary braking strap and a primary release are stored, said pair of shoulder straps defining a triangular back panel made from fabric, each of said back panel shoulder straps having a plurality of elastic loops spaced and fastened there along;
   a spine brace for traversing the pair of shoulder straps;
   an elongated section of composite rope having a tensile strength of at least 5000 pounds, said elongated rope intended for winding back and forth alternatingly between the pair of shoulder straps, from side-to-side and from top to bottom of said pair of shoulder straps for being held in place by the elastic loops of said pair of shoulder straps until needed to effect a controlled descent by the wearer;
   a connector for attaching an end of said elongated rope to an elevated structure;
   a rack having a plurality of first apertures through which said elongated rope is threaded in a predetermined pattern, at least one of said apertures being wrapped with a friction inducing material, said rack being connected to said spine brace; and
   a fabric cover for said back panel.

2. The wearer controlled descent system of claim 1, wherein said primary release includes a pull pin and grommet and said secondary braking strap includes a handle for the wearer to manually pull on for releasing pressure on the rope causing the rope to unwind from between the elastic loops of said shoulder straps.

3. The wearer controlled descent system of claim 1, wherein said plurality of apertures in said rack includes at least two intermediate apertures, an upper aperture and a lower aperture with fixed crossbars extending between adjacent apertures of said plurality of apertures, said rope being adapted for threading into and out of said apertures and wrapping about one or more of said crossbars.

4. The wearer controlled descent system of claim 3, wherein said rack has additional apertures for securing said rack to said back panel without having to thread the rope through said additional apertures.

5. The wearer controlled descent system of claim 1 which further includes a rope loop guide attached at an offset to said spine brace.

6. The wearer controlled descent system of claim 1 which weighs less than 10 pounds.

7. The wearer controlled descent system of claim 6 which weighs 6 pounds or less.

8. The wearer controlled descent system of claim 1 which includes one or more additional panels for elongated composite rope for positioning outside of and connecting to said back panel for extending the range of said system to nearly 200 feet.

9. The wearer controlled descent system of claim 1, wherein the composite rope is a braided aramid product having a diameter of less than 10 mm.

10. The wearer controlled descent system of claim 1 which further includes a reserve suspension relief strap affixed at one end to a base of the back panel.

11. A wearer controlled descent system having a recovery range of up to two hundred feet, said controlled descent system comprising a harness having:
- an adjustable belt that is capable of extending around a wearer's upper chest;
- an adjustable belt that is capable of extending around a wearer's waist;
- a pair of adjustable straps that are capable of wrapping about a wearer's upper thighs;
- a pair of shoulder straps that are capable of extending from said waist belt over a wearer's shoulders and criss-crossing a wearer's back, at least one of said pair of shoulder straps having a compartment in which a secondary braking strap and a primary release are stored;
- said pair of shoulder straps defining a triangularly-shaped, back panel, a lower end of each of said pair of shoulder straps having at least twenty elastic loops extending along said pair of shoulder straps;
- a spine brace for traversing and attaching to the back panel;
- one or more internal panels for positioning outside of and connecting to said back panel, each of said internal panels being triangularly-shaped having a plurality of elastic loops extending from top to bottom and from side to side;
- an elongated section of composite rope having a tensile strength of at least 5000 pounds, said elongated rope intended for winding back and forth, from top to bottom and alternatingly from side-to-side, first starting from said internal panels, then continuing to said back panel with said elongated rope being held in the elastic loops of said internal panels and of said back panel until being withdrawn from said elastic loops of said internal panels and of said back panel as needed during a wearer's controlled descent;
- a connector for attaching one end of said elongated rope to an elevated structure;
- a rack having a plurality of first apertures through which the elongated rope is threaded in a predetermined pattern, at least one of said apertures being partially wrapped with a friction-inducing material, said rack being connected to said spine brace; and
- a removable cover for said back panel.

12. The wearer controlled descent system of claim 11, wherein said primary release includes a pull pin and said secondary braking strap includes a handle for the wearer to manually pull on for releasing pressure on the rope and causing the rope to unwind from between the elastic loops of said shoulder straps.

13. The wearer controlled descent system of claim 12, wherein after said releasing pressure occurs, said rope first unwinds from said internal panels before unwinding from said back panel.

14. The wearer controlled descent system of claim 11, wherein the composite rope is a braided aramid product having a diameter of less than 10 mm.

15. The wearer controlled descent system of claim 11 which further includes a rope loop guide attached at an offset to said spine brace.

16. The wearer controlled descent system of claim 11, wherein said plurality of apertures in said rack includes at least two intermediate apertures and an upper and lower aperture with fixed crossbars extending between adjacent apertures of said plurality of apertures.

17. The wearer controlled descent system of claim 11 which weighs less than 10 pounds.

18. The wearer controlled descent system of claim 17 which weighs 6 pounds or less.

* * * * *